(12) United States Patent
Yamamoto et al.

(10) Patent No.: US 6,795,383 B1
(45) Date of Patent: Sep. 21, 2004

(54) OPTICAL DISK AND APPARATUS AND METHOD OF RECORDING AND REPRODUCING DATA THEREOF

(75) Inventors: Masaya Yamamoto, Osaka (JP); Tomoyuki Okada, Osaka (JP); Yasushi Uesaka, Hyogo (JP); Kazuhiro Tsuga, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 687 days.

(21) Appl. No.: 09/585,393

(22) Filed: Jun. 2, 2000

(30) Foreign Application Priority Data

Jun. 2, 1999 (JP) .......................... 11-154995
May 31, 2000 (JP) ........................ 2000-161793

(51) Int. Cl.[7] .......................... G11B 7/005
(52) U.S. Cl. .................. 369/47.16; 369/47.24; 369/59.13; 369/275.3
(58) Field of Search ............... 369/47.13, 47.16, 369/47.35, 47.24, 59.25, 59.13, 275.3; 386/54, 60, 65, 96–99, 101, 105, 125–126; 700/94

(56) References Cited

U.S. PATENT DOCUMENTS

| | | | |
|---|---|---|---|
| 5,371,605 A | | 12/1994 | Masuda et al. |
| 5,485,279 A | * | 1/1996 | Yonemitsu et al. ..... 375/240.14 |
| 5,754,233 A | * | 5/1998 | Takashima ............... 348/390.1 |
| 6,078,727 A | * | 6/2000 | Saeki et al. ................. 386/125 |
| 6,181,870 B1 | * | 1/2001 | Okada et al. ................. 386/95 |
| 6,222,806 B1 | * | 4/2001 | Mori et al. ............... 369/53.32 |
| 6,222,983 B1 | * | 4/2001 | Heo ............................. 386/96 |
| 6,266,483 B1 | * | 7/2001 | Okada et al. ............... 386/128 |
| 6,301,428 B1 | * | 10/2001 | Linzer .......................... 386/52 |
| 6,597,858 B1 | * | 7/2003 | Linzer .......................... 386/52 |

FOREIGN PATENT DOCUMENTS

| | | |
|---|---|---|
| EP | 0859523 A2 | 8/1998 |
| EP | 0867877 A2 | 9/1998 |
| EP | 0903738 A2 | 3/1999 |
| EP | 0903744 | 3/1999 |
| EP | 0910082 A2 | 4/1999 |
| EP | 0994480 | 4/2000 |
| JP | 1-245326 | 9/1989 |
| JP | 5-36250 | 2/1993 |
| JP | 10-162561 | 6/1998 |
| JP | 10-228728 | 8/1998 |
| JP | 11-66827 | 3/1999 |
| JP | 11-96730 | 4/1999 |
| JP | 11-155130 | 6/1999 |

OTHER PUBLICATIONS

IEEE Signal Processing Magazine, vol. 14, No. 5, Sep. 1997, No11,P. "MPEG Digital Audio Coding", pp. 59–81.

* cited by examiner

*Primary Examiner*—W. R. Young
(74) *Attorney, Agent, or Firm*—Wenderoth, Lind & Ponack, L.L.P.

(57) ABSTRACT

An optical disc, as an information recording medium for storing map audio object recorded on the optical disc in a constant bit rate format or a variable bit rate format and a recording position on the disc, can reduce a size of the map information. The map information stored in the optical disc records a playback duration for only first and last units of a plurality of audio object units (AOBU) comprised in an audio object (AOB) for each AOB when audio data in the variable bit rate mode is to be recorded, and records the sizes and playback duration of the AOBU for the last one of AOBUs comprised in AOB and for any one of the AOBUs except for the last AOBU.

16 Claims, 47 Drawing Sheets

| VERN | b15 | b14 | b13 | b12 | b11 | b10 | b9 | b8 |
|------|-----|-----|-----|-----|-----|-----|----|----|
| | b7 | b6 | b5 | b4 | b3 | b2 | b1 | b0 |
| | | | | reserved | | | | |
| | | | | Book version | | | | |

Fig.20A

| TM_ZONE | b15 | b14 | b13 | b12 | b11 | b10 | b9 | b8 |
|---------|-----|-----|-----|-----|-----|-----|----|----|
| | b7 | b6 | b5 | b4 | b3 | b2 | b1 | b0 |
| | | TZ_TY | | | | TZ_OFFSET[11..8] | | |
| | | | | TZ_OFFSET[7..0] | | | | |

| b7 | b6 | b5 | b4 | b3 | b2 | b1 | b0 |
|----|----|----|----|----|----|----|----|
| PL_TY | | | | | | | |
| PL_TY1 | | | | reserved | | | |

Fig.23B

| b39 | b38 | b37 | b36 | b35 | b34 | b33 | b32 |
|-----|-----|-----|-----|-----|-----|-----|-----|
| PL_CREATE_TM | | | | | | | |
| b31 | b30 | b29 | b28 | b27 | b26 | b25 | b24 |
| | | | Year[13..6] | | | | |
| b23 | b22 | b21 | b20 | b19 | b18 | b17 | b16 |
| Month[1..0] | | Year[5..0] | | | | | Month[3..2] |
| b15 | b14 | b13 | b12 | b11 | b10 | b9 | b8 |
| Hour[3..0] | | | | Day[4..0] | | | Hour[4] |
| b7 | b6 | b5 | b4 | b3 | b2 | b1 | b0 |
| Minute[1..0] | | Second[5..0] | | | | | Minute[5..2] |

Fig. 24

PTM describing format

| b47 | b46 | b45 | b44 | b43 | b42 | b41 | b40 |
|-----|-----|-----|-----|-----|-----|-----|-----|
| b39 | b38 | b37 | b36 | b35 | b34 | b33 | b32 |
| PTM_base[31..24] | | | | | | | |
| b31 | b30 | b29 | b28 | b27 | b26 | b25 | b24 |
| PTM_base[23..16] | | | | | | | |
| b23 | b22 | b21 | b20 | b19 | b18 | b17 | b16 |
| PTM_base[15..8] | | | | | | | |
| b15 | b14 | b13 | b12 | b11 | b10 | b9 | b8 |
| PTM_base[7..0] | | | | | | | |
| b7 | b6 | b5 | b4 | b3 | b2 | b1 | b0 |
| PTM_extension[15..8] | | | | | | | |
| | | | | | | | |
| PTM_extension[7..0] | | | | | | | |

Fig.26A

A_ATR

| b23 | b22 | b21 | b20 | b19 | b18 | b17 | b16 |
|---|---|---|---|---|---|---|---|
| | Audio coding mode | | | reserved | | | |
| b15 | b14 | b13 | b12 | b11 | b10 | b9 | b8 |
| Quantia | | fs | | | | | |
| b7 | b6 | b5 | b4 | b3 | b2 | b1 | b0 |
| | | | Bitrate | | Number of Audio channels | | |

Fig.26B

TXT_ATR

| b15 | b14 | b13 | b12 | b11 | b10 | b9 | b8 |
|---|---|---|---|---|---|---|---|
| | | | reserved | | | | |
| b7 | b6 | b5 | b4 | b3 | b2 | b1 | b0 |
| | | | CHRS | | | validity | |

Fig.28

| AOB_TY | b15 | b14 | b13 | b12 | b11 | b10 | b9 | b8 |
|---|---|---|---|---|---|---|---|---|
| | TE | | | | reserved | | | |
| | b7 | b6 | b5 | b4 | b3 | b2 | b1 | b0 |
| MT_FLG | | | | reserved | | | | |

Fig.30

| AOBU_ENT | | | | | | | |
|---|---|---|---|---|---|---|---|
| b15 | b14 | b13 | b12 | b11 | b10 | b9 | b8 |
| | | | | | | AOBU_SZ(upper) | |
| b7 | b6 | b5 | b4 | b3 | b2 | b1 | b0 |
| | | reserved | | | | AOBU_SZ(lower) | |

| PG_TY | b7 | b6 | b5 | b4 | b3 | b2 | b1 | b0 |
|---|---|---|---|---|---|---|---|---|
| Protect | | | reserved | | | | | |

Fig.35

| C_TY | | b7 | b6 | b5 | b4 | b3 | b2 | b1 | b0 |
|---|---|---|---|---|---|---|---|---|---|
| | | | C_TY1 | | reserved | | | | |

*Fig.36*

| V_ATR | | | | | | | |
|---|---|---|---|---|---|---|---|
| b15 | b14 | b13 | b12 | b11 | b10 | b9 | b8 |
| Video compression mode | | TV system | | Aspect ratio | | reserved | |
| b7 | b6 | b5 | b4 | b3 | b2 | b1 | b0 |
| reserved | | Video resolution | | | | reserved | |

Fig.38A

| ASVOB_ENT | 2bytes |
|---|---|
| ASVOB_ENT_TY | 1byte |
| ASVOB_SZ | 1byte |

Fig.38B

| ASVOB_ENT_TY | b7 | b6 | b5 | b4 | b3 | b2 | b1 | b0 |
|---|---|---|---|---|---|---|---|---|
| | reserved | | TE | reserved | | | | |

*Fig.40*

| ASV_DMOD | | | | | | | |
|---|---|---|---|---|---|---|---|
| b7 | b6 | b5 | b4 | b3 | b2 | b1 | b0 |
| reserved | | | Display Timing Mode | | | Display Timing Order | |

Fig.41A

| C_EPI (Type A1) | 135bytes |
|---|---|
| EP_TY | 1byte |
| EP_PTM | 6bytes |
| PRM_TXTI | 128bytes |

Fig.41B

| C_EPI (Type A2) | 7bytes |
|---|---|
| EP_TY | 1byte |
| EP_PTM | 6bytes |

Fig.41C

| C_EPI (Type B1) | 136bytes |
|---|---|
| EP_TY | 1byte |
| EP_PTM | 6bytes |
| IDXN | 1byte |
| PRM_TXTI | 128bytes |

Fig.41D

| C_EPI (Type B2) | 8bytes |
|---|---|
| EP_TY | 1byte |
| EP_PTM | 6bytes |
| IDXI | 1byte |

Fig.42A

| C_EPI(Type C1) | 141bytes |
|---|---|
| EP_TY | 1byte |
| EP_PTM | 6bytes |
| END_PTM | 6bytes |
| PRM_TXTI | 128bytes |

Fig.42B

| C_EPI (Type C2) | 13bytes |
|---|---|
| EP_TY | 1byte |
| EP_PTM | 6bytes |
| END_PTM | 6bytes |

Fig.42C

| C_EPI (Type D1) | 142bytes |
|---|---|
| EP_TY | 1byte |
| EP_PTM | 6bytes |
| ASVOB_ENTN | 1byte |
| S_EFFECT | 1byte |
| E_EFFECT | 1byte |
| MIN_DUR | 2bytes |
| MAX_DUR | 2bytes |
| PRI_TXT | 128bytes |

Fig.42D

| C_EPI(Type D2) | 14bytes |
|---|---|
| EP_TY | 1byte |
| EP_PTM | 6bytes |
| ASVOB_ENTN | 1byte |
| S_EFFECT | 1byte |
| E_EFFECT | 1byte |
| MAN_DUR | 2bytes |
| MIN_DUR | 2bytes |

Fig. 43

| EP_TY | b7 | b6 | b5 | b4 | b3 | b2 | b1 | b0 |
|---|---|---|---|---|---|---|---|---|
| | EP_TY1 | | EP_TY2 | | reserved | | | |

Fig.44A

| S_EFFECT | b7 | b6 | b5 | b4 | b3 | b2 | b1 | b0 |
|---|---|---|---|---|---|---|---|---|
| | | | Start Effect Mode | | | Start Effect Period | | |

Fig.44B

| E_EFFECT | b7 | b6 | b5 | b4 | b3 | b2 | b1 | b0 |
|---|---|---|---|---|---|---|---|---|
| | | | End Effect Mode | | | End Effect Period | | |

OPTICAL DISK AND APPARATUS AND METHOD OF RECORDING AND REPRODUCING DATA THEREOF

The present application is based on Japanese Patent Application Nos. 11-154995 and 2000-161793, the contents of which are incorporated herein by reference.

BACKGROUND OF THE INVENTION

1. Field of the Invention

The present invention relates to an optical disc capable of reading and writing data, and more particularly to an optical disc on which digital data including video data, still picture data and audio data are recorded. Moreover, the present invention relates to an apparatus and method of recording and reproducing data therefor.

2. Related Art

There is a DVD-RAM which is of phase change type and has a storage capacity of 4 GB or more as an optical disc capable of storing, reading and writing digital data including video and audio data.

Examples of the video digital data which can be recorded on the DVD-RAM are applied with a coding standard of an MPEG method. The MPEG method uses compression to code the video data at a variable bit rate (VBR).

The DVD-RAM is utilized as a home video recorder by compressing and recording video data by the MPEG method.

On the other hand, a home audio recorder for recording audio digital data, such as music, on the DVD-RAM is currently being developed.

Examples of recording methods of audio digital data which can be recorded on the DVD-RAM include LPCM (linear PCM), an audio compression standard 3 (AC 3) and a meridian lossless packing (MLP).

The LPCM is a non-compressive coding mode to be used in a CD, and typically codes audio information with 16 bit quantization. The DVD-RAM can record, for approximately nine hours, the audio data which are quantized at a sampling rate of 44.1 Khz in the LPCM. Although the LPCM is non-compressive and thus has an advantage that high tone quality can be obtained, it has a disadvantage that a rate of reading from the disc is high and a large recording capacity is required for the disc.

The AC3 compresses to code audio information at a constant bit rate (CBR). Since the AC3 serves to compress and code the audio information, it has an advantage that the rate of reading from the disc can be reduced and a other hand, the AC3 system has a disadvantage that the information is deteriorated during the compression, resulting in low tone quality than that in the linear pulse code modulation (LPCM).

The MLP system losslessly compresses and codes audio information at a variable bit rate (VBR). The lossless compression is a coding mode in which the tone quality is not deteriorated due to the compression. In deteriorating, the rate of reading from the disc is higher than that of the AC3 and can be more reduced than that of the LPCM.

In order to utilize the DVD-RAM as the home audio recorder, a data format and an apparatus capable of efficiently recording music information on a disc through the LPCM, the AC3 and the MLP and having high operability for a user when recording, editing and reproducing data are required as a data format of the optical disc and an apparatus thereof.

More specifically, the following three items are required for the data structure of the data format:

(1) To have path information in which a playback sequence having a combination of audio data having a constant bit rate (CBR) such as the LPCM and the AC3 and audio data having a variable bit rate (VBR) such as the MLP. This allows the user to reproduce, through the home audio recorder, various audio data in different coding modes which the user obtained from various data obtaining channels, without the user recognizing a difference in the coding mode.

(2) To have time map information for indirectly providing to a recording position on the disc of the audio data with reference to a time stamp. This can allow for easy modification of the information about the recording position of the audio data and a rapid editing work also in the home audio recorder having low hard performance when the recording position of the audio data on the disc is changed during an editing operation.

(3) To reduce the data size of the time map information in (2). This allows the time map information to be loaded into a memory in the home audio recorder on which a small capacity memory is mounted.

SUMMARY OF THE INVENTION

The present invention has been made to solve the above mentioned problems and has an object to provide an optical disc capable of-reducing the data size of time map information and an apparatus and method of recording and reproducing data for the optical disc.

In order to solve the above-mentioned problems, an recording medium for storing at least one audio object constant bit rate coding mode and management information for managing reproduction of the audio object, and has the following configuration.

In the optical disc, the audio object comprises a plurality of units each having a predetermined playback duration, each unit has the same playback duration except for the last one of all the units comprised in the audio object.

The management information includes path information which defines at least one reproducing interval, coding mode information indicative of coding mode of each audio object, and map information provided for each audio object. The map information converts the time stamp information specifying the reproducing interval of the audio object into an address on the optical disc storing the unit of the audio object to be reproduced at the time indicated by the time stamp information.

The map information comprises information about a data size of the unit. The information about the data size of the unit includes information about a data size of each unit when the coding mode of the corresponding audio object is the variable bit rate coding mode, or only information about a data size of a last one of the units included in the audio object and information about a data size of one of residual units except for the last unit when the coding mode of the corresponding audio object is the constant bit rate coding mode.

The map information may further comprise information about the playback duration of the unit. The information about the playback duration can include only playback duration information for a last one of the residual units except for the last unit. The information about the playback duration can included only playback duration information for one of the residual units except for the last unit.

The map information may comprise two table structures. The first table structure is referred when the coding mode of the corresponding audio object is the variable bit rate coding mode. The first table structure has information about a data size of the unit for each unit as the information about the data size of the unit. The second table structure is referred when the coding mode of the corresponding audio object is the constant bit coding mode. The second table structure has, as information about a data size of a unit, only information about a data size of a last one of the units included in the audio object and information about a data size of one of the residual units except for the last unit.

The variable bit rate coding mode may include at least one of AAC and MLP. The constant bit rate coding mode may include at least one of linear PCM and AC-3.

A data recording apparatus according to the above described optical disc; The apparatus comprises: a section for inputting audio data to be recorded and then deciding whether a coding mode of the input audio data is the variable bit rate coding mode or the constant bit rate coding mode; a section for creating the map information of the first table when the coding mode is the variable bit rate coding mode as a result of the decision, or creating the map information of the second table when the coding mode is the constant bit rate coding mode; and a section for recording the created map information in the optical disc together with the input audio object.

A data reproducing apparatus according to the invention is an apparatus for reproducing an audio object from the above described optical disc. The apparatus comprises: a section for specifying an audio object to be reproduced; a section for deciding whether a coding mode of the specified audio data is a variable bit rate coding mode or a constant bit rate coding mode; and a section for the unit comprised in the audio object to be reproduced from the map information with the selected table structure, obtaining a start address on the optical disc of the object reading and reproducing the audio object from the start address thus obtained.

In the data reproducing apparatus, the section for selecting a table structure can obtain the start address by the following method. When the decided coding mode is the variable bit rate coding mode, the method may comprise referring to the map information with the first table structure to obtain the data size for each unit, summing the data size thus obtained, and adding an offset address value of the audio object to be reproduced to the summed value. When the decided coding mode is the constant bit rate coding mode, the method may comprise referring to the map information with the second table structure to obtain the data size for one of the residual units, multiplying the obtained data size by the number of the units comprised in the audio object to be reproduced, and adding an offset address value of the audio object to be reproduced to the multiplied value.

A data recording method according to the audio data to be recorded and then deciding whether a coding mode of the input audio data is the variable bit rate coding mode or the constant bit coding mode; creating the map information of the first table when the coding mode is the variable bit rate coding mode as a result of the decision, or creating the map information of the second table when the coding mode is the constant bit rate coding mode; and recording the created map information in the optical disc together with the input audio object.

A data reproducing method according to the invention is a method for reproducing an audio object from the above described optical disc. The method comprises: specifying an audio object to be reproduced; deciding whether a coding mode of the specified audio data is a variable bit rate coding mode or a constant bit rate coding mode; and selecting a table structure of the map information in accordance with the decided coding mode, reading a size of the unit comprised in the audio object to be reproduced from the map information with the selected table structure, obtaining a start address on the optical disc of the object to be reproduced from the read size of the unit, and reading and reproducing the audio object from the start address thus obtained.

According to the present invention, by utilizing the fact that the playback duration of the object unit is constant, the playback duration of all the units are not recorded but the reproducing duration is recorded for only the first and last units in each object. Moreover, when the audio data are coded in a constant bit rate coding mode, utilizing the fact that the size of the unit in a pack is constant, the sizes of all the units are not recorded but the sizes are recorded for the first and last units in each object. Thus, the recording format of the time map position on the disc of the audio data with the time stamp is implemented for both of the constant bit rate coding mode and the variable bit rate coding mode. In the case of the variable bit rate coding mode, size of the time map information per recording time can be compressed to a half or less. In the case of the constant bit rate, the time map can be constructed with a constant size irrespective of the recording time. Consequently, the memory residence of the time map information can be carried out also in the home audio recorder having a small mounted memory.

DESCRIPTION OF THE DRAWINGS

FIG. 20A is a diagram illustrating VERN, and FIG. 20B is a diagram illustrating the format of TM_ZONE.

FIG. 23A is a diagram illustrating the format of PL_TY, and FIG. 23B is a diagram illustrating the PL_CREATE_TM.

FIG. 24 is a diagram illustrating a PTM recording format.

FIG. 26A is a diagram illustrating the format A_ATR, and FIG. 26B is a diagram illustrating the format of TXT_ATR.

FIG. 28 is a diagram illustrating the format of AOB_TY.

FIG. 30 is a diagram illustrating the structure of AOBU_ENT.

FIG. 33 is a diagram illustrating the format of PG_TY.

FIG. 35 is a diagram illustrating the format of C_TY.

FIG. 36 is a diagram illustrating the format of V_ATR.

FIG. 38A is a diagram illustrating the structure of ASVOB_ENT, and FIG. 38B is a diagram illustrating the format of ASVOB_ENT_TY.

FIG. 40 is a diagram illustrating the format of ASV_DMOD.

FIG. 41A is a diagram illustrating the structure of C_EPI of a type A1, FIG. 41B is a diagram illustrating the structure of C_EPI of a type A2, FIG. 41C is a diagram illustrating the structure of C_EPI of a type B1, and FIG. 41D is a diagram illustrating the structure of C_EPI of a type B2.

FIG. 42A is a diagram illustrating the structure of C_EPI of a type C1, FIG. 42B is a diagram illustrating the structure of C_EPI of a type C2, FIG. 42C is a diagram illustrating the structure of C_EPI of a type D1 and FIG. 42D is a diagram illustrating the structure of C_EPI of a type D2.

FIG. 43 is a diagram illustrating the format of EP_TY.

FIG. 44A is a diagram illustrating the format of S_EFFECT, and FIG. 44B is a diagram illustrating the format of E_EFFECT.

DETAILED DESCRIPTION OF THE PREFERRED EMBODIMENTS

An optical disc and an apparatus for recording and reproducing data for the optical disc according to the present invention is described below with reference to the accompanying drawings. In a first embodiment, description will be given to the structure of the optical disc and the apparatus for recording and reproducing data for the second embodiment, description will be given to an optical reproducing apparatus of the optical disc is applied according to the present invention.

First Embodiment
1.1 Physical Structure of Optical Disc

Figure 1:
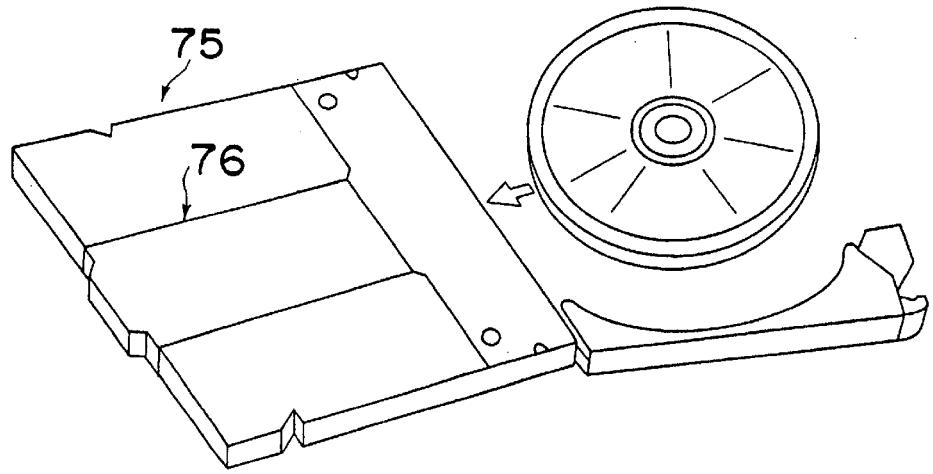
FIG. 1 is a view showing the outer appearance of a DVD-RAM disc and a cartridge for housing the disc.

FIG. 1 is a diagram illustrating the outer appearance of a DVD-RAM disc to be a data recordable optical disc. As shown in FIG. 1, the DVD-RAM is housed in a cartridge 75 and is mounted on a video data editing apparatus in this state. The cartridge 75 serves to protect the recording surface of the DVD-RAM. The DVD-RAM housed in the cartridge 75 can be accessed by opening a shutter 76.

Figure 2A:
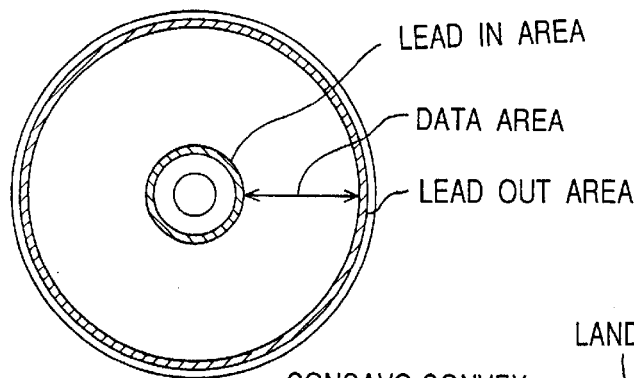
FIG. 2A is a view illustrating the recording region of the DVD-RAM disc.

FIG. 2A is a diagram showing the recording area of the DVD-RAM disc to be a data recordable optical disc. As shown in FIG. 2A, the DVD-RAM disc has a lead in area on the innermost periphery and a lead out area on the outermost periphery, and arranges a data area therebetween. The lead in area records a reference signal necessary for stabilizing a servo during the access of an optical pick-up, an identification signal with other media and the like. The lead out region also records the same reference signals as that in the lead in region. The data area is divided into sectors (2 k bytes) to be a minimum access unit.

Figure 2B:
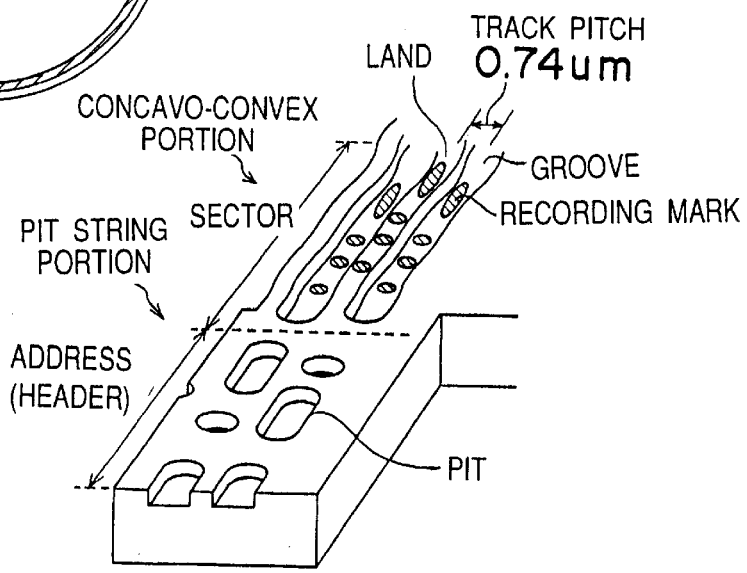
FIG. 2B is a view showing the state of the surface of the DVD-RAM disc.

FIG. 2B is a diagram showing the section and surface of a portion corresponding to the head portion of the sector in the DVD-RAM. As shown in FIG. 2B, one sector includes a pit string portion formed on a reflective film surface, such as a metallic thin film, and a concavo-convex portion.

The pit string portion includes pits of 0.4 $\mu$m to 1.87 $\mu$m which is marked to represent a sector address.

The concavo-convex portion includes a concave portion (hereinafter referred to as a "groove") and a convex portion (hereinafter referred to as a "land"). A recording mark which comprises a metallic thin film which can carry out phase change is attached to the surfaces of the land and the groove. The phase change implies that the state of the bonded metallic thin film is changed between a through the irradiation of an optical beam. Data can be written to the concavo-convex portion by utilizing the phase change. While only the land portion is used for recording in an MO (magneto optical) disc, data are recorded in the land portion and the groove portion in the DVD-RAM. By implementing data recording in the groove portion, a recording density can be increased over that in the MO disc. Error correcting information for the embodiment, the sector group (16 sectors) to which an ECC (Error Correcting Code) is given will be referred to as an ECC block.

Moreover, the DVD-RAM has a data area divided into a plurality of zones in order to implement rotation control referred to as a ZCLV (Zone Constant Linear Velocity) during recording and reproduction.

Figure 3A:
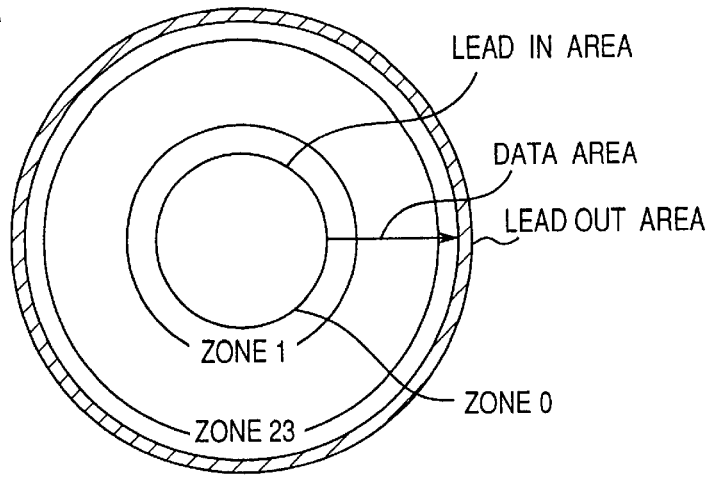
FIG. 3A is a view illustrating zones of the DVD-RAM disc.

FIG. 3A is a diagram showing a plurality of zones provided concentrically on the DVD-RAM. As shown in FIG. 3A, the DVD-RAM is divided into 24 zones from zone 0 to zone 23. The zone implies a group of tracks to be accessed at the same angular velocity. In the present embodiment, one zone includes 1888 tracks. The rotational angular velocity of the DVD-RAM is set for each zone such that it is increased toward the zone on the inner peripheral side, and is maintained to be constant while the optical pick up accesses within one zone. Consequently, the recording density of the DVD-RAM can be increased and the rotation control can easily be carried out during the recording and the reproduction.

Figure 3B:
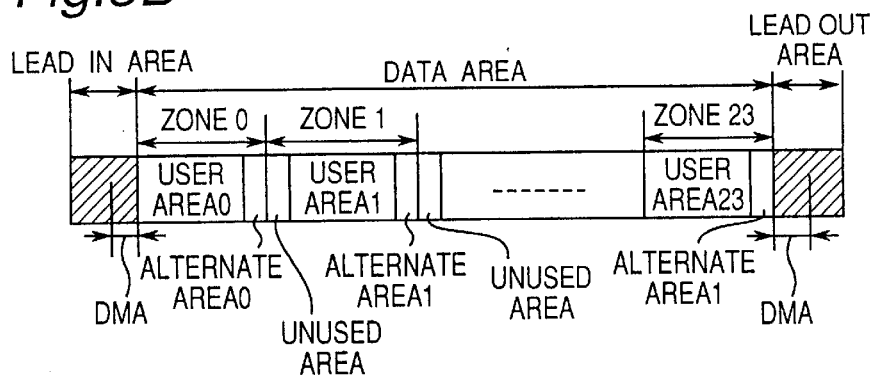
FIG. 3B is a diagram illustrating diagram showing the relationship of a lead in region, a lead out region and a zone.

FIG. 3B is a diagram illustrating the linear transverse arrangement of the lead in area, the lead out area and zones 0 to 23 which are shown concentrically in FIG. 3A. The lead in area and the lead out area have a defect management area (DMA) therein. The defect management area records position information indicative of the position of a sector having a defect and alternate position information indicative of an alternate area where a sector substitutes for the defective sector is present.

Each zone has a user area therein and an alternate area and an unused area in the boundary portion of the zone. The user area implies an area which can be utilized as a recording area by a file system. The alternate area is alternately used if there is a defective sector. The unused area is not used for data recording. The unused area is provided for approximately two tracks. The unused area is provided for the following reason. Although a sector address is recorded in the same position as that of the adjacent track in the zone, in the ZCLV, the recording position of the sector address is different from that of the adjacent track on a zone boundary. Therefore, it is necessary to prevent the sector address from being distinguished erroneously.

Thus, a sector which is not used for the data recording is present in the zone boundary. For this reason, in the DVD-P-AM a logical sector number (LSN) is allocated to the physical sector of a user area in order from the inner periphery to indicate continuously only the sectors to be used for the data recording.

1.2 Logical Structure of Optical Disc

Figure 3C:
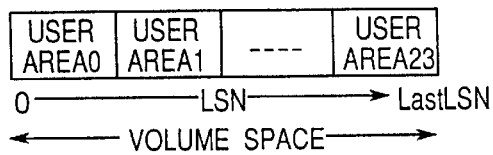
FIG. 3C is a diagram illustrating the relationship between the volume space of the DVD-RAM and a logical sector number (LSN)
Figure 3D:
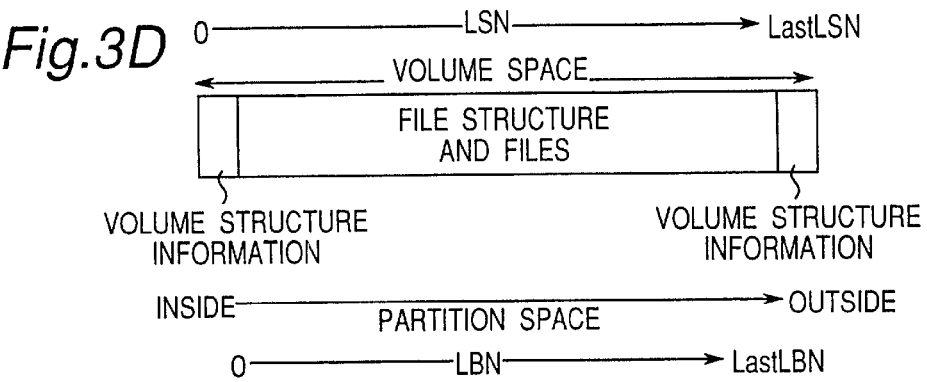
FIG. 3D is a diagram illustrating the volume space of the DVD-RAM.

An area for recording user data, as shown in FIG. 3C, which comprises sectors to which the logical sector (space).

Digital data are managed and recorded in the volume area through a file system in accordance with an ISO/IEC 13346 standard. Management information composing the file system, referred to as volume structure information, is recorded in the head of the volume area. The file system is index information for grouping and managing a plurality of sectors on the disc. A plurality of sectors is managed as a file, and a plurality of files are grouped and managed as a directory. A sector group continuously arranged on the disc in the sectors storing data composing while the data composing the file are continuously recorded on the disc in an extension unit, they are discretely recorded on the disc as the whole file.

Figure 4:
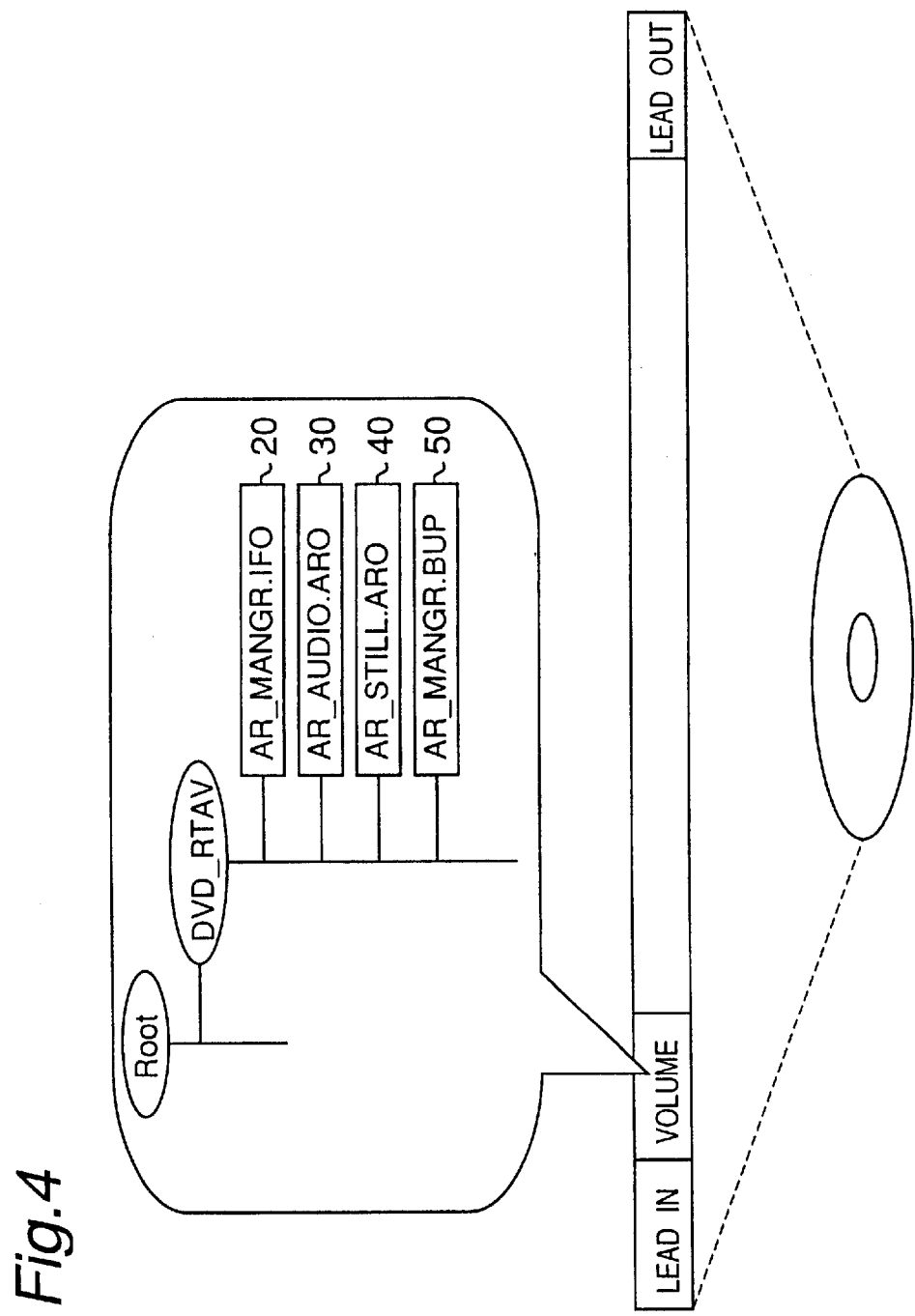
FIG. 4 is a diagram showing a logical structure in the DVD-RAM disc according to the present invention.

In the present embodiment, the optical disc has a directory file structure shown in FIG. 4. The data to be recorded are placed in a DVD_RTAV directory provided under a ROOT directory as shown in FIG. 4.

The file is roughly divided into a management information file and an AV file.

The AV file includes an AR_AUDIO.ARO file 30 for recording audio data and an AR_STILL.ARO file 40 for recording still picture data to be displayed simultaneously with the reproduction of the audio data.

An AR_MANGR.IFO file 20 is recorded as the management information file. The file 20 stores management information for controlling the reproduction of the AV file. Moreover, an AR_MANGR.BUP file 50 having the same contents is recorded for the case in which any error is generated on the file 20 to disable data reading.

Figure 5:
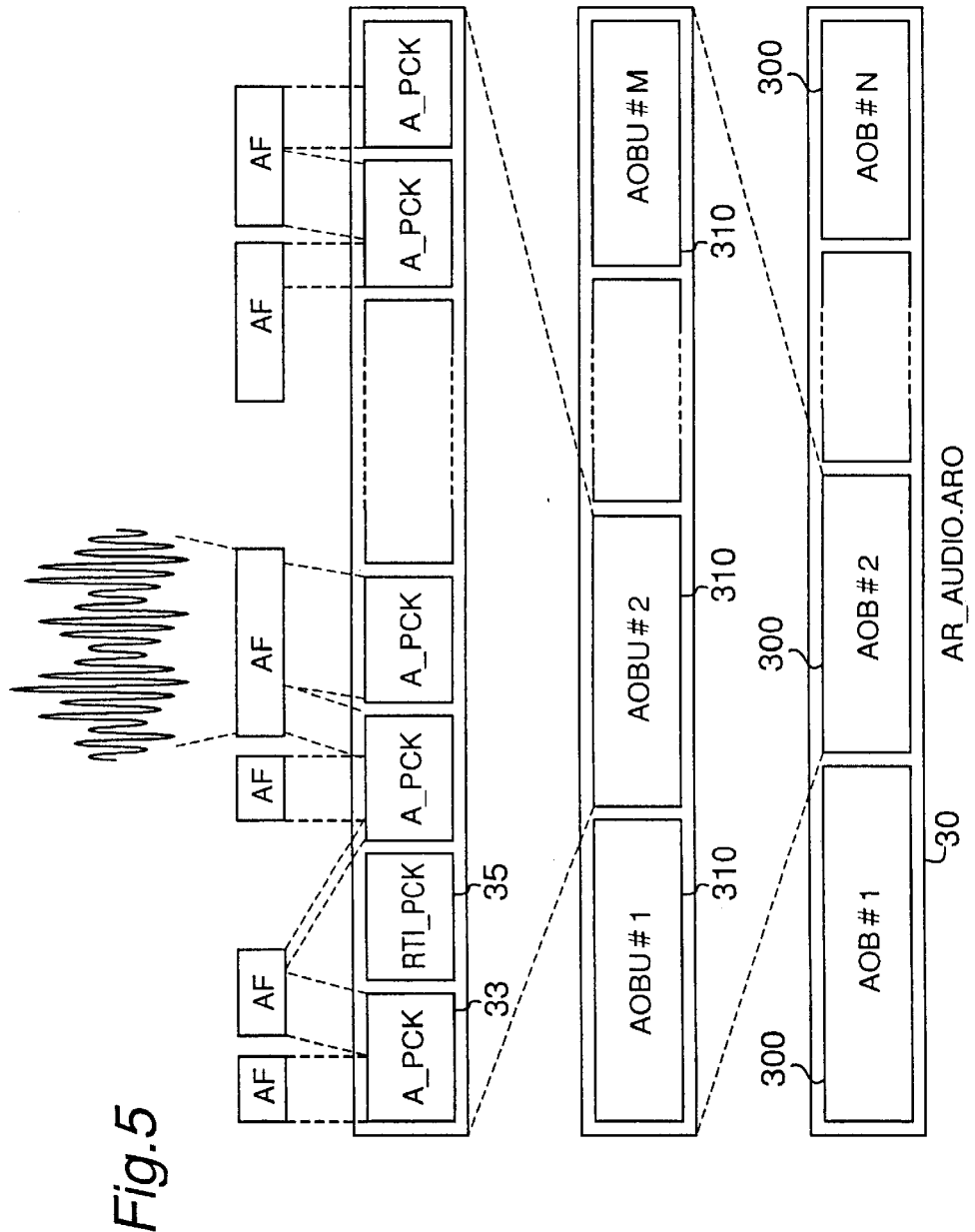
FIG. 5 is a diagram showing the structure of an AV file for audio (AR_AUDIO.ARO).

FIG. 5 is a diagram showing the structure of the AR_AUDIO.ARO file 30 in which the audio data are recorded. As shown in FIG. 5, a plurality of AOBs (Audio Objects) 300 having audio information are arranged in the AR_ARDIO.ARO file 30 in order of sound recording. The audio information stored in the AOB (300) includes data in LPCM format and data in AC3 format with a constant bit rate (CBR), and data in MLP format with a variable bit rate (VBR), for example.

The AOB (300) has a data structure referred to as a program stream of the MPEG format, and has such a structure that an audio elementary stream having audio information and a text elementary stream having real time text information are divided into pack structures 33 and 35 each having a size of 2 KB which are multiplexed with each other.

Figure 6:
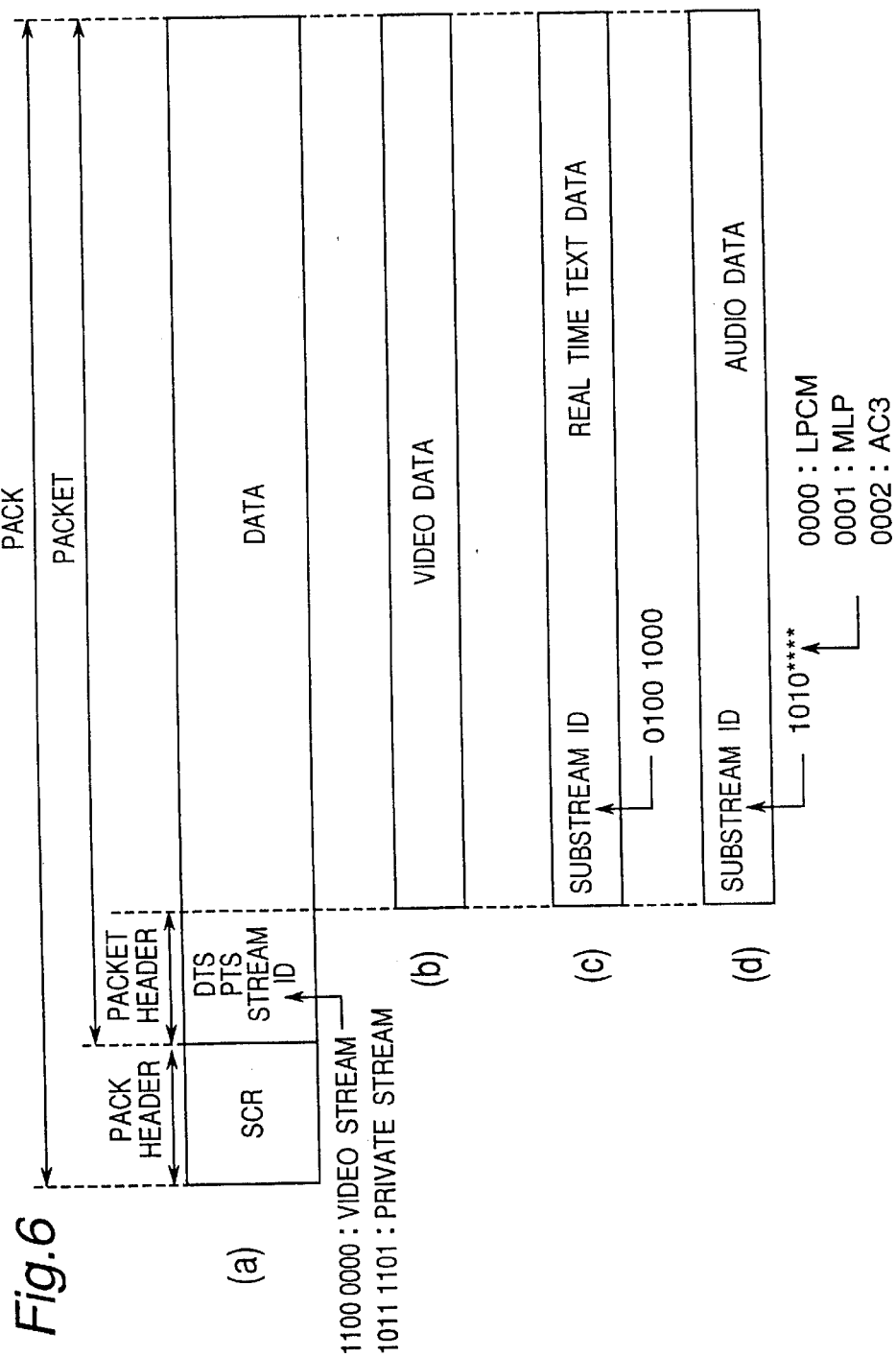
FIG. 6 is a diagram showing the structure of a pack packet of an MPEG method.

FIG. 6 shows a pack packet structure of the MPEG system.

A packet is a unit in which video data and audio data are multiplexed and indicates a minimum unit to transfer. As shown in FIG. 6, a pack header includes a SCR (System Clock Reference). The SCR indicates an input timing at which the pack is input to a system decoder. More specifically, a rate of transfer to the system decoder of the data is defined by the SCR.

The packet header stores a DTS, a PTS and a stream ID.

The DTS (Decode time stamp) indicates a timing in which the pack is decoded by a decoder. The PTS video output. The stream ID indicates an identification code for the elementary stream in a program stream. In the case of a video elementary stream, "11000000" is given. In the case of the AOB, each of the audio elementary stream and the text elementary stream is a private stream to which "10111101" is given.

As shown in FIG. 6, in the case in which the data are of an audio data type or a real time text data type, a substream ID is stored on the head of the data because both of them are the private streams. In the case of the real time text data, "01001000" is stored in the substream ID. In the case of the audio data, "1010" is stored on the first bits of the substream ID and an identification code of a coding type of the audio is stored in low order four bits. "0000" is stored when the coding type is the LPCM, "0001" is stored when the coding type is the MPL, and "0002" is stored when the coding type is the AC3.

The pack 33 for storing the audio elementary stream will be referred to as "A_PCK (audio pack)" and the pack 35 for storing the text elementary referred to as "RTI_PCK (real time information pack")" as shown in FIG. 5.

The AOB (300) includes a plurality of partial which a plurality of A_PCKs (33) included therein has a predetermined playback time of one second or less. The last one of the AOBUs (310) included in the AOB (300) does not always have the same playback time as that of other AOBUs.

In general, the number of bits of the A_PCK (33) which can be stored is not coincident with that of bits of an audio frame to be the minimum unit of the audio information. Therefore, one audio frame might be divided into a plurality of A_PCKs to be recorded. The boundary of the AOBU should be coincident with that of the audio frame. The reason is because division and coupling should easily be carried out on the boundary of the AOBU during editing or the like. Therefore, padding is inserted in a part of the AOBU.

RTI_PCK(35) is used for recording words and information to be displayed in synchronization with the playbacked music.

Figure 7:
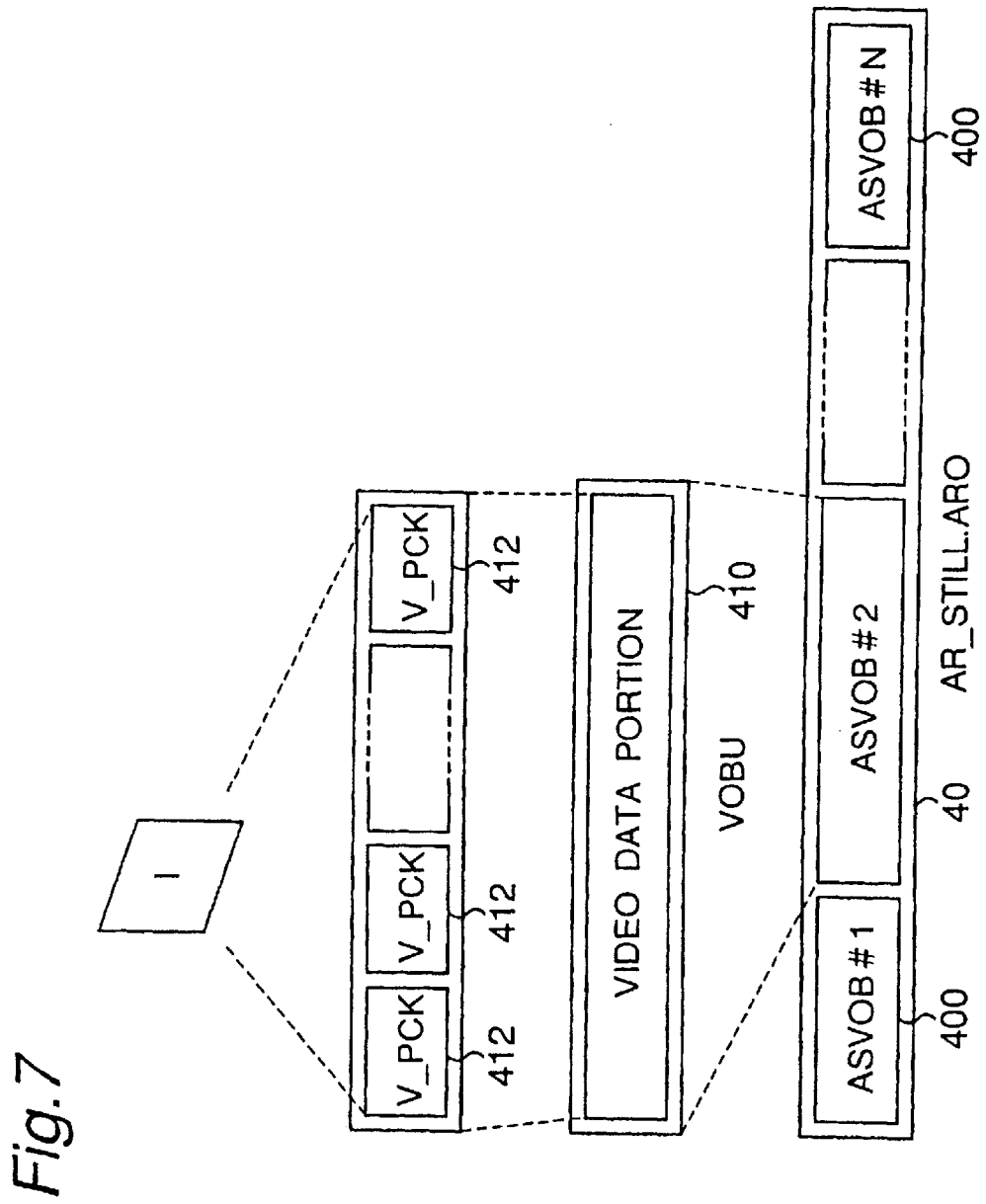
FIG. 7 is a diagram showing the structure of an AV file for a still picture (AR_STILL.ARO) simultaneously reproduced during audio reproduction.

FIG. 7 is a diagram showing the structure of an AR_STILL.ARO file 40 for recording still picture data to be displayed simultaneously with audio data reproduction.

As shown in FIG. 7, an ASVOB (Audio Still Video Object) 400 to be an MPEG program stream for the still picture to be displayed simultaneously with audio is arranged in the AR_STILL.ARO file 40 in order of recording.

The ASVOB (400) comprises one VOBU (Video object Unit) 410, and the VOBU (410) comprises a plurality of V_PCKs (412). The VOBU (410) stores a GOP (Group of Pictures) defined by an MPEG standard, and particularly includes only one I-picture.

1.3 Relationship Between AV Data and Management Information

Figure 8:
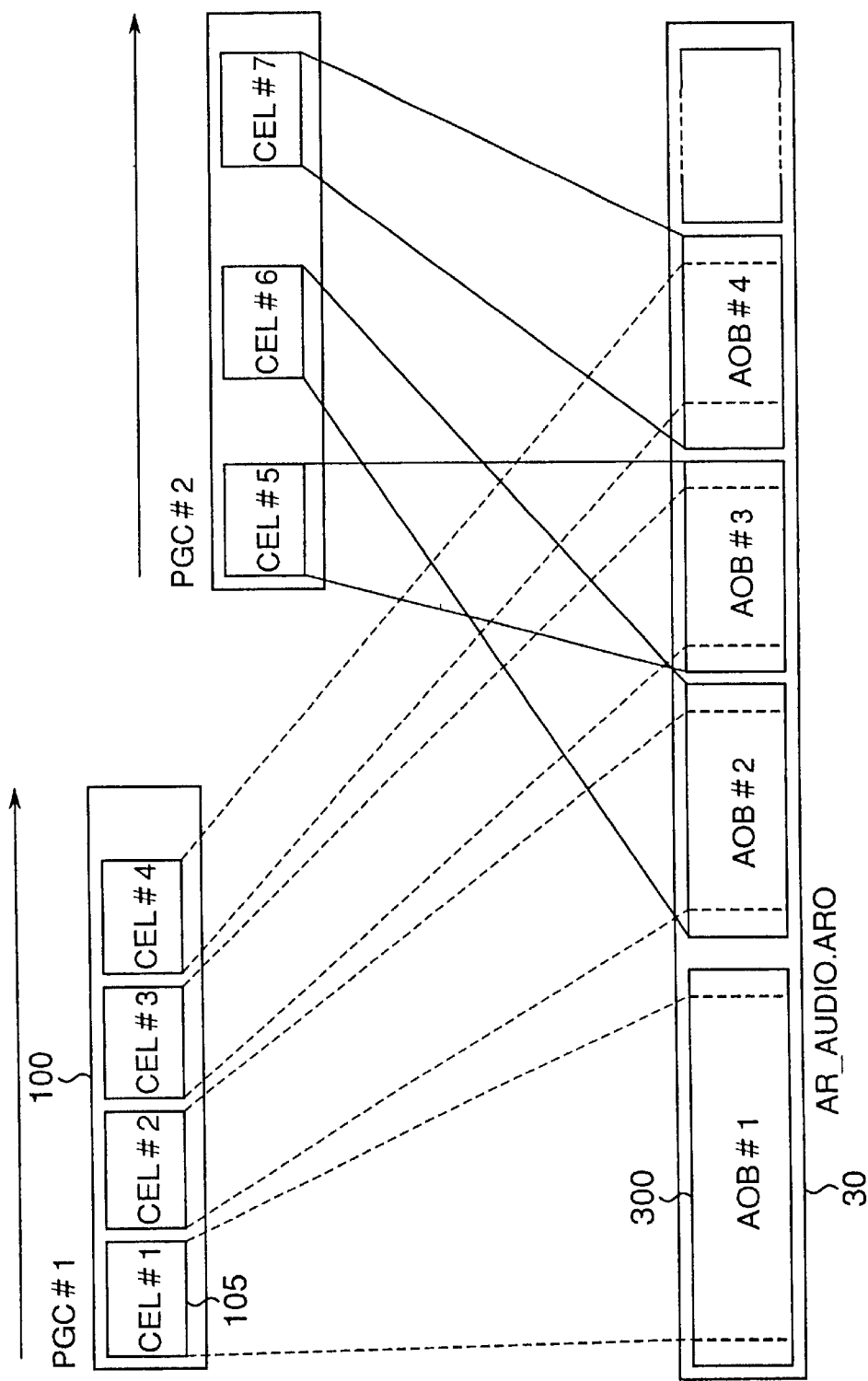
FIG. 8 is a diagram showing the relationship between the AV file for audio (AR_STILL.ARO) and management information (PGC).
Figure 9:
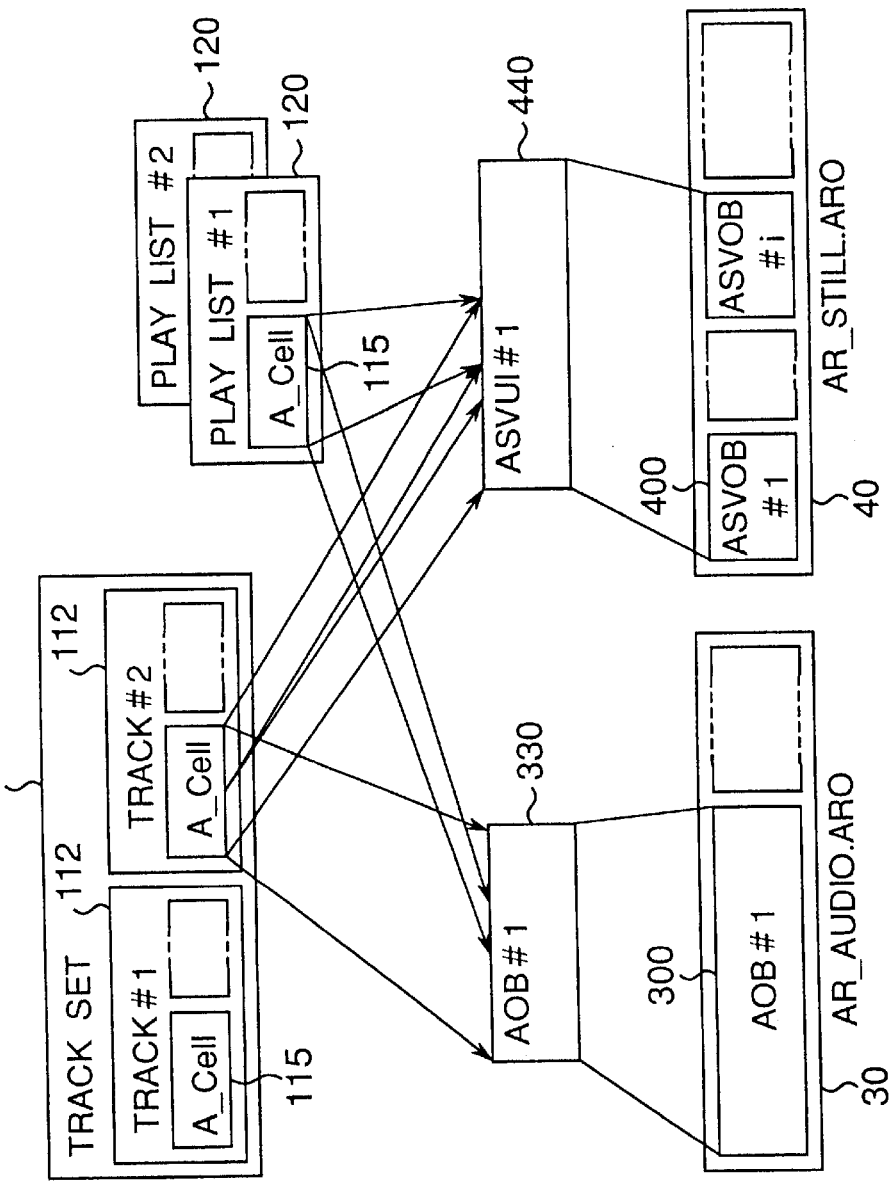
FIG. 9 is a diagram showing the relationship among an audio related AV file (AR_STILL.ARO, AR_STILL.ARO) and management information (PGC, AOBI, ASVUI).

Next, the relationship among the AOB (300) stored in the AR_AUDIO.ARO (30), the ASVOB (400) stored in the AR_STILL.ARO (40) and the management information stored in the AR_MANGR.IFO (20) is described with reference to FIGS. 8 and 9.

The management information of the AR_MANGR.IFO (20) includes path information defining a playback sequence which comprises at least one AOB, and map information for converting the playback interval of the AOB indicated by the path information into a recording address on the disc.

1.3.1 Path Information defining Reproduction Order

The playback sequence (audio sequence) indicated by the path information is defined with a sequence of cells (Cells) indicative of a partial or full interval of the AOB. As shown in FIG. 8, the path information defining the sequence is defined as PGC (Program Chain) 100 in the DVD. In different PGCs, the various playback sequences for the same AOB group can be defined. In an example shown in FIG. 8, PGC#1 denotes a reproduction path having a playback sequence of AOB#1→AOB#2→AOB#3→AOB#4. PGC#2 denotes a reproduction path having a playback sequence of AOB#3→AOB#2→AOB#4. Moreover, the PGC#1 denotes an audio sequence comprising the partial interval of each AOB and the PGC#2 denotes an audio sequence comprising the full interval of each AOB.

Each cell 105 included in the PGC specifies the interval of the AOB based on time stamp information indicative of a time to reproduce audio data. More specifically, each interval of the AOB is addressed by the DVD based on a reproduction running time from the head of the AOB.

The information indicative of the audio sequence includes original PGC and user defined PGC. As shown in FIG. 9, an original PGC (110) defines the interval of all the AOBs (300) capable of being reproduced in the disc with the cell 115. The original PGC (110) is also referred to as a track set (Track Set) and has a lower structure referred to as a track (Track) 112 obtained by logically binding up a plurality of cells. The Track described above does not imply the physical structure of a disc, but one music (song). One music is named in accordance with a custom in the music industry referred to as a "track".

On the other hand, the user defined PGC (120) defines an audio sequence including an interval designated by a user out of the interval of the AOB (300) referred by the original PGC (110). The cell in the user defined PGC (120) includes a part or whole cell of the original PGC (110), but does not include the interval of the AOB which is not referred by the cell of the original PGC (110).

Moreover, the user defined PGC (120) is also referred to as a play list (Play List), and does not have a data structure in which a cell is referred to via a track differently from the original PGC. A plurality of user defined PGCs (120) may be present. Furthermore, the cell picture data to be displayed simultaneously with the audio data. As described above, the still picture data are stored in the ASVOB (400) of the AR_STILL.ARO file 40 in a format of an I picture of the MPEG, and each cell indicates the same.

1.3.2 Map Information

Map information converts a time stamp of the cell (115) of the user defined PGC (120) or the original PGC (110) into a sector address on a disc.

Figure 10:
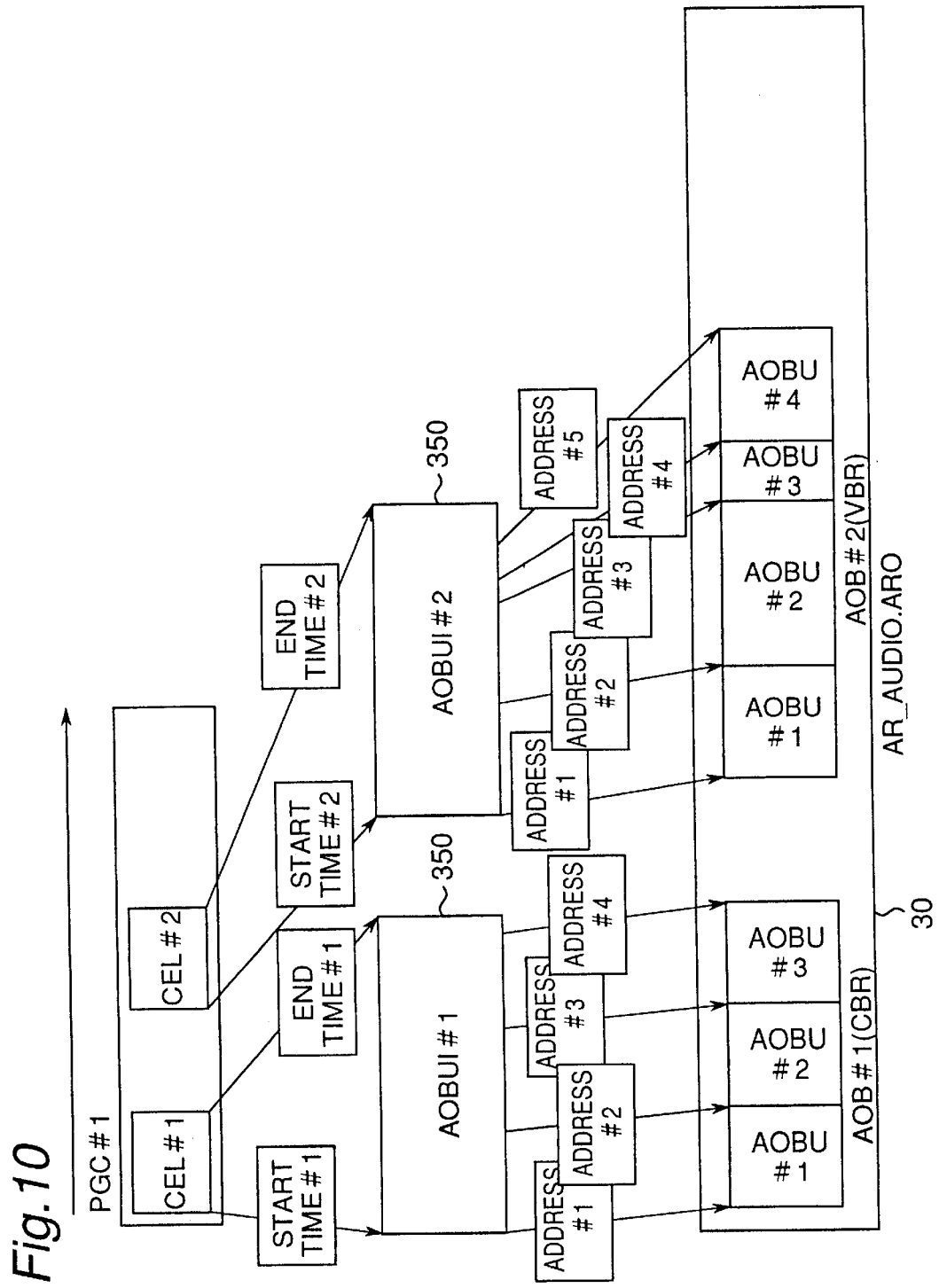
FIG. 10 is a diagram illustrating a conversion from the display time of an audio object into the address of the audio object unit using map information (AOBI, ASVUI).

Management information including AOBUI (AOB Unit INFORMATION) 350 is present as management information for each AOB as shown in FIG. 10. The AOBUI (350) is map information including information for converting the time stamp information indicative of the interval of the AOB into the sector address on the disc.

Figure 11:
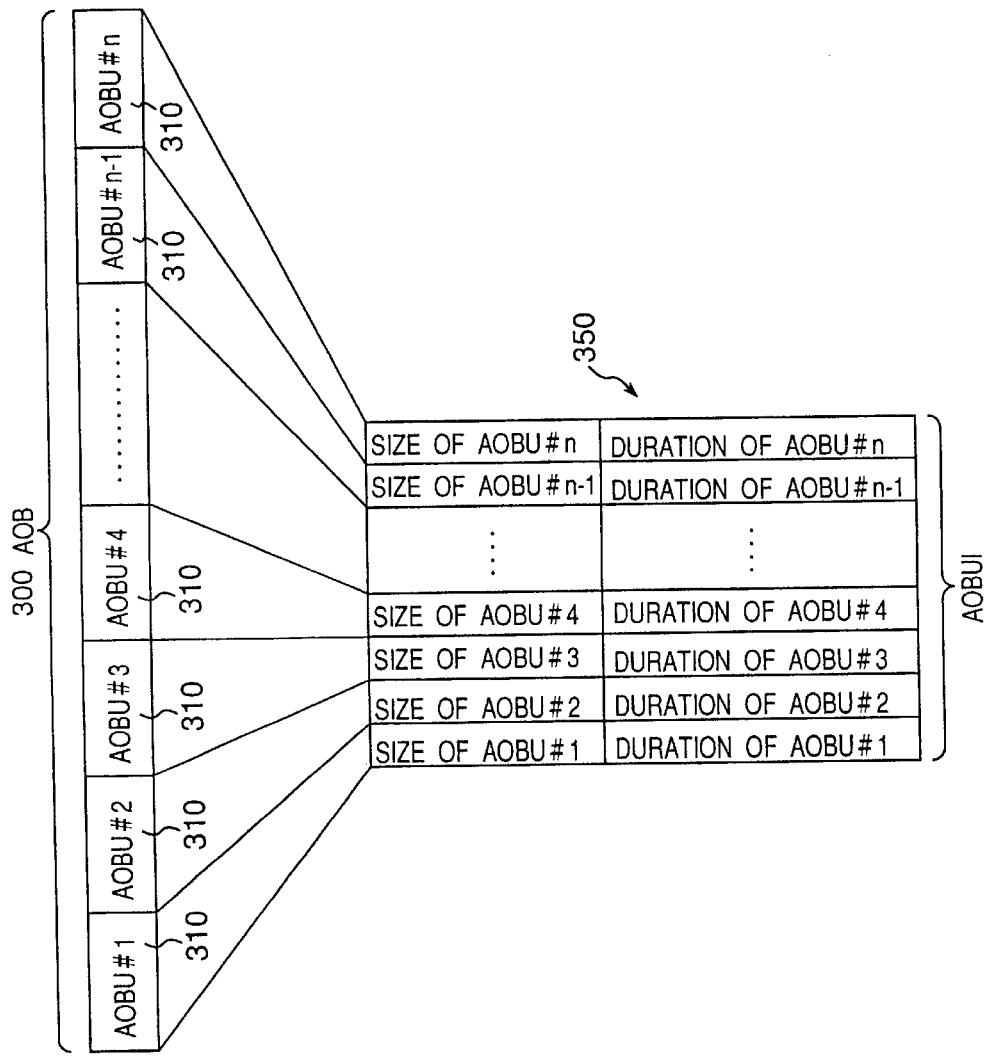
FIG. 11 is a diagram showing the relationship between AOBU and AOBUI (map information) having information about the size and playback time length of the AOBU for each AOBU.

Next, a processing of converting the time stamp information into the sector address is described with reference to FIG. 11. FIG. 11 is a diagram showing the relationship between the AOB (300) and the AOBUI (350) to be the map information. For simplicity of explanation, the map information has an ad hoc data structure in FIG. 11.

As described above, the AOB (300) comprises a plurality of AOBUs (310). The size of the AOBU (310) is constant when the coding mode of the AOB has a constant bit rate (CBR), or variable when the coding mode of the AOB has a variable bit rate (VBR). For this reason, it is playback time length (duration) in order to convert the time stamp indicative of each interval of the AOB (300) into an actual sector address.

The playback duration is described by a value based on a index with one second corresponding to 90,000. For example, 0.8 second is represented as 72,000.

Each AOBU (310) has the same playback duration except for the last one of the AOBUs included in the AOB (300). Therefore, the same values are actually stored as the playback duration for AOBUs ranging from AOBU#1 to AOBU#n-1 shown in FIG. 5, respectively.

As an example of a processing related to conversion from the time stamp information to an address, a time search processing is described. The time search is a function of starting reproduction or playback of audio data at a specific time in one music. In order to implement such a function, it is necessary to convert a designated specific time stamp information into an address. To do so, the designated time information is first divided by playback duration information indicated as "the playback duration of the AOBU#1". One is added to the quotient thus obtained, and a value thus obtained by the addition is the AOBU including a time stamp corresponding to a specific time. Number of the AOBU is set to i. The address of the AOBU can be obtained by summing sizes from a first AOBU to an (i-1) th AOBU. A value thus obtained is an address to be required. In order to convert the address information thus obtained to the final sector address, furthermore, it is necessary to add offset information in the AR_AUDIO.ARO file 30 of the corresponding AOB. The offset information is stored as the management information for each AOB in the AR_MANGR.IFO file 20.

The AOBU has a maximum playback period of one second. Therefore, it is apparent that the precision of mentioned method. The time search for each audio frame in the specified AOBU can increase the precision. The playback duration each audio frame is defined in accordance with the coding mode used for the audio coding. For example, it is 32 msec in the AC 3 system. By utilizing this, the time search can also be carried out with the precision of the audio frame.

As described above, the AOBUI (350) comprises the information. Consequently, it is possible to interval of the AOB (300) indicated by a time sector address on the disc.

However, if these two information for all AOBUs are recorded, the size of the AOBUI to be the map information is greatly increased. In other words, the playback duration information requires at least three bytes for storing a value of about 90000. Moreover, the size of the AOBU depends on the bit rate of the AOB. In the case of the LPCM having tone quality of CD, the size of one AOBU is 96, and becomes about 600 with the maximum bit rate permitted by the DVD disc. At least two bytes are required for storing this information. Therefore at least five bytes are required for each AOBU. This implies that information having 18 Kbytes (=3600 sec×5 bytes) per hour at a minimum should be stored as the AOBUI in the case where the playback duration of each AOBU is one second. On the other hand, when audio data having an AC3 format having 192 Kbps, for example, are stored in the DVD-RAM media having 4.7 GB, a recording time length thereof exceeds 50 hours. If such data are to be stored, the size of the AOBUI exceeds 1 MB. However, it is hard for a home audio recorder to have such a big memory size as to implement and to load an AOBUI into the memory.

According to the present invention, the size of each AOBU is constant except for the last one of the AOBUs composing the AOBU. By utilizing this fact, it is not necessary to record all the playback duration of AOBU for each AOBU, but it is sufficient to record only the playback duration of a first one of the AOBUs composing the AOB and the playback duration of the last AOBU. In the case of the AOB having a variable bit rate, however, the size of the AOBU is required for all the AOBUs.

Figure 12:
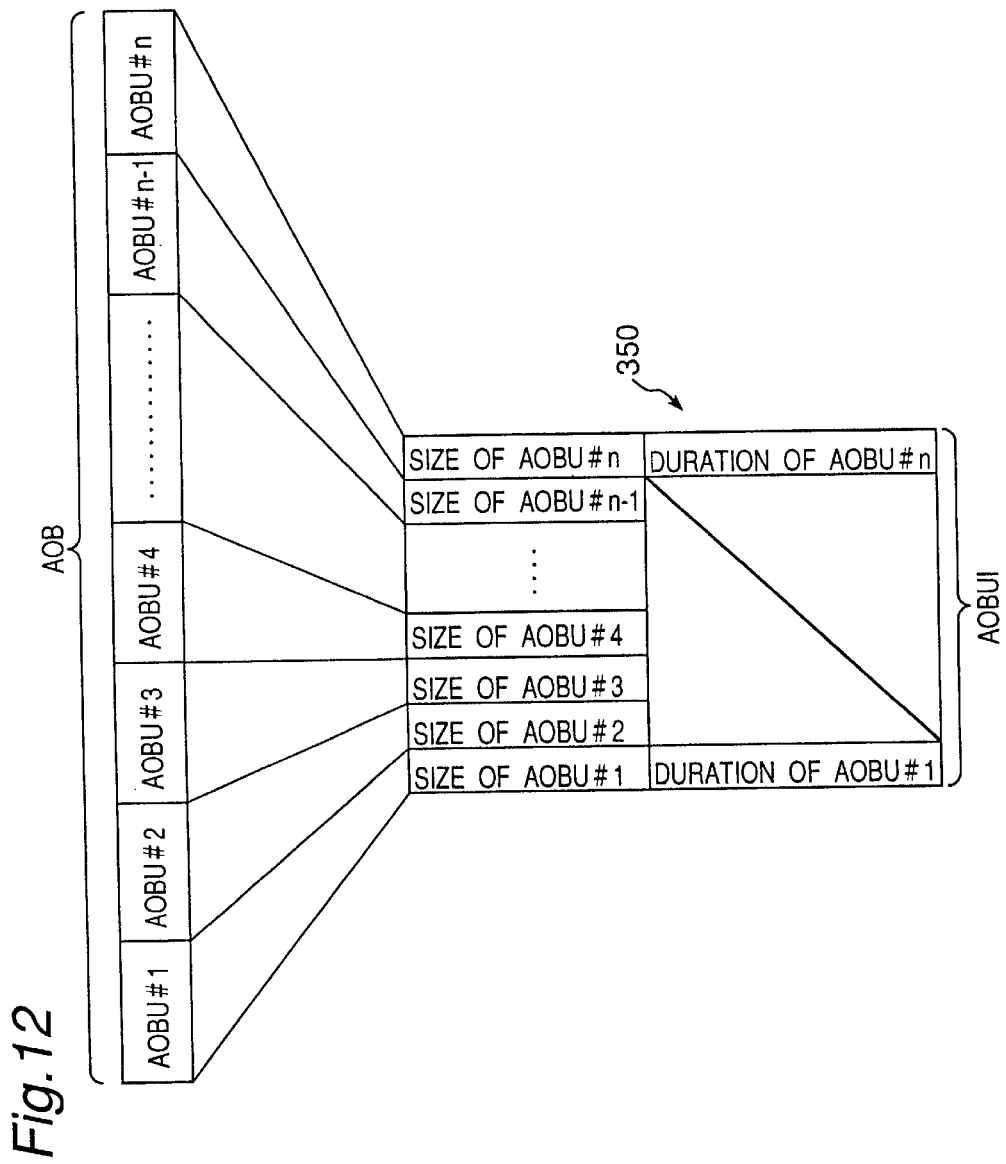
FIG. 12 is a diagram showing the structures of the AOBU and the AOBUI, which are suitable for a variable bit rate format, having the size information of the AOBU for all the AOBU and information about the playback time length for only the first and last AOBU.

FIG. 12 shows the structure of the modified AOBUI. In the modified AOBUI, the playback duration of the AOBU is described for only playback duration for the last (nth) AOBU of the AOB and playback duration for the first AOBU. Consequently, the size of the AOBUI becomes at least 6 bytes+2 bytes×(the number of AOBUs). Thus, even if music data exceeding 50 hours are recorded, the size of the AOBUI can be held down to approximately 360 KB. The value of common playback duration in other AOBUs except for the last AOBU is stored in the entry of the head AOBU. Moreover, since all other AOBUs except for the last AOBU have the same playback duration, a playback duration for any of other AOBUs except for the last AOBU may be used in place of the first AOBU.

Furthermore, it is possible to further reduce the size of the AOBUI in the coding mode having a constant bit rate, such as an LPCM format or an AC3 format. In the case of the constant bit rate, the number of bytes with a specific playback duration is always constant. This means that the size of each AOBU except for the last AOBU is constant. By utilizing this fact, it is not necessary to rate, and it is sufficient to record only the size of the AOBU (for example, the first AOBU) except for the last AOBU and the size of the last AOBU.

Figure 13:
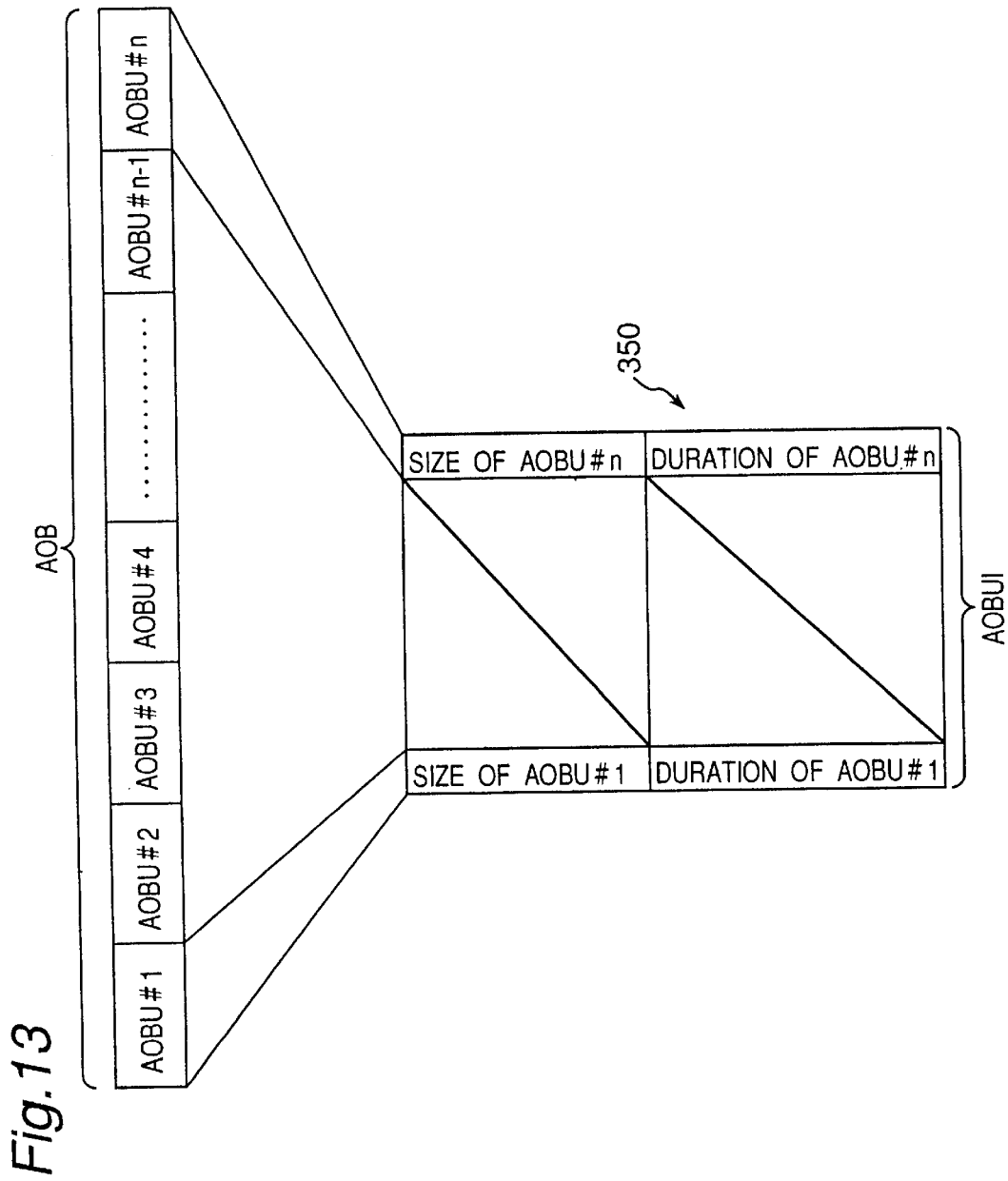
FIG. 13 is a diagram showing the structures of the AOBU and the AOBUI, which are suitable for a constant bit rate format, having the information about the size and last AOBU.

FIG. 13 shows the structure of the AOBUI thus modified. Consequently, the size of the AOBUI is sufficient be approximately 10 bytes at most irrespective of the playback duration of the AOB. Accordingly, in the case of the coding mode having the constant bit rate, a very great memory size is not required to allow AOBUI to reside at the memory. In the case of the constant bit rate, moreover, it is not necessary to carry out a processing to sum up all the sizes of the AOBUs when the time stamp information is converted into the sector address, and it is sufficient to calculate a product of the size of the first AOBU and the number of the AOBUs. Thus, there is also an advantage that a time and labor for an arithmetic processing can be omitted.

More specifically, the AOBUI to be the map information is constituted to have only the playback duration of the last AOBU, the playback duration and size of each of the AOBUs other than the last AOBU in the case in which the AOB to be designated uses the coding mode having the constant bit rate (CBR), such as the LPCM format and the AC3 format. On the other hand, in the case in which the AOB to be designated has the variable bit rate (VBR) of the MLP format, the AOBUI is constituted to have a playback duration common to each of the AOBUs except for the last AOBU and the sizes of all the AOBUs. For the playback, duration of the AOB, the map information may have only the playback duration for one of the AOBUs other than the last AOBU.

Next, the data structure of the AOBUI according to the present invention is described in detail with reference to FIGS. 29 and 30. As described above, AOBUI stores information necessary for converting the time stamp indicative of each interval of the AOB into the sector address of the disc.

Figure 29:
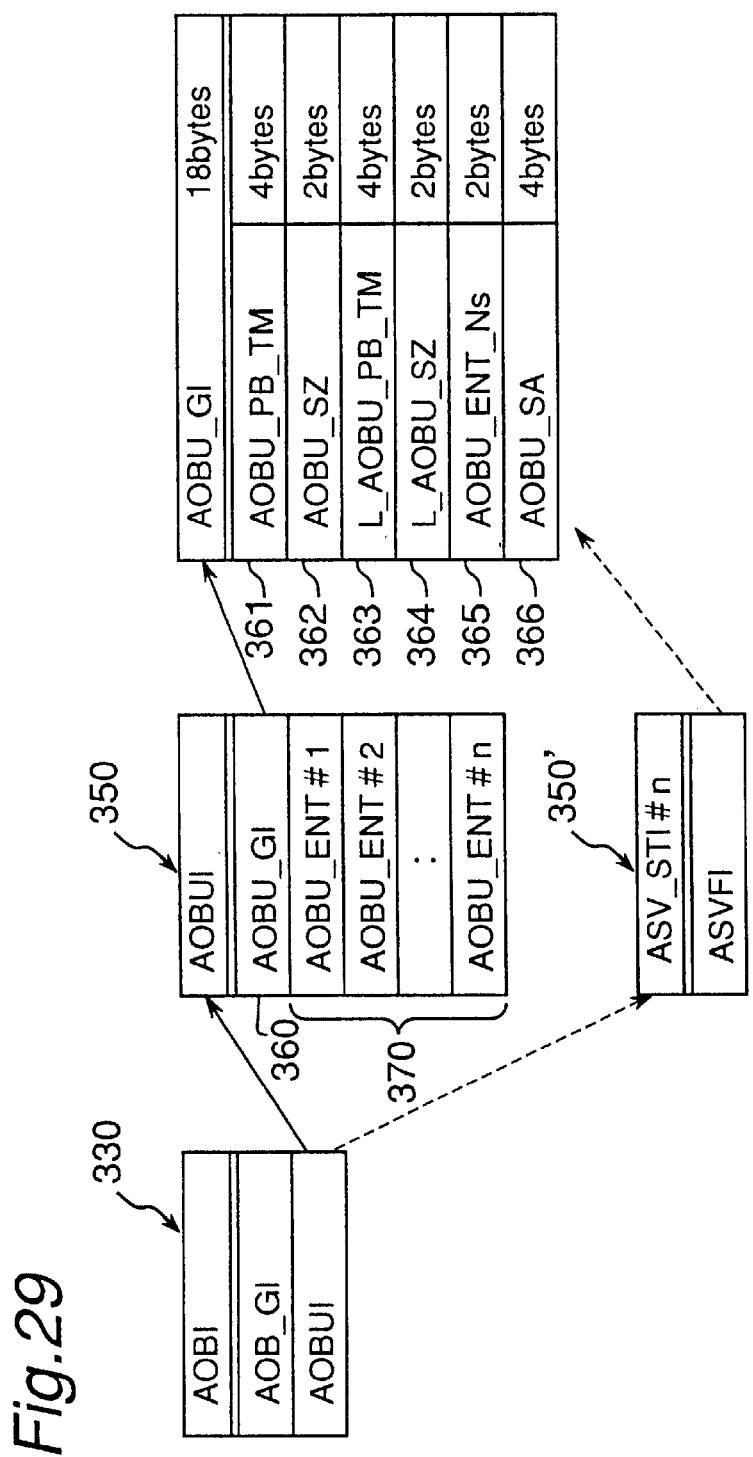
FIG. 29 is a diagram illustrating the structure of AOBUI.
Figure 31:
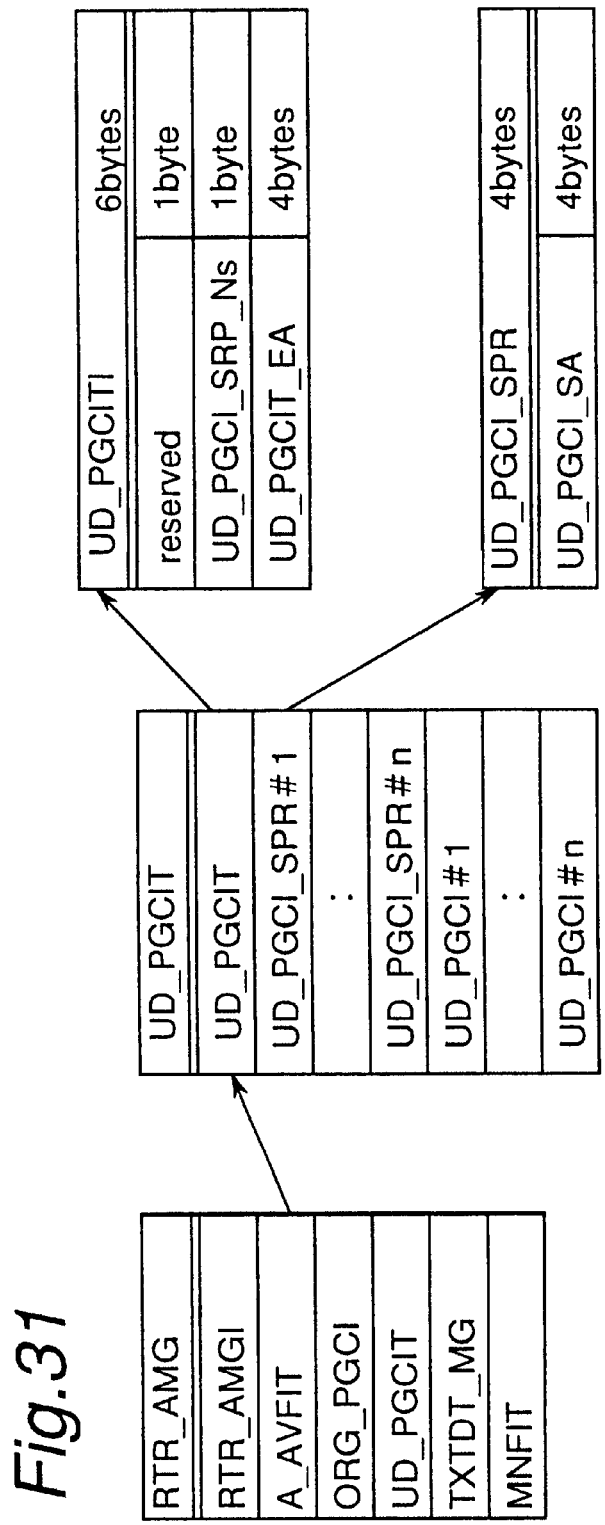
FIG. 31 is a diagram illustrating the structure of UD_PGCIT.
Figure 32:
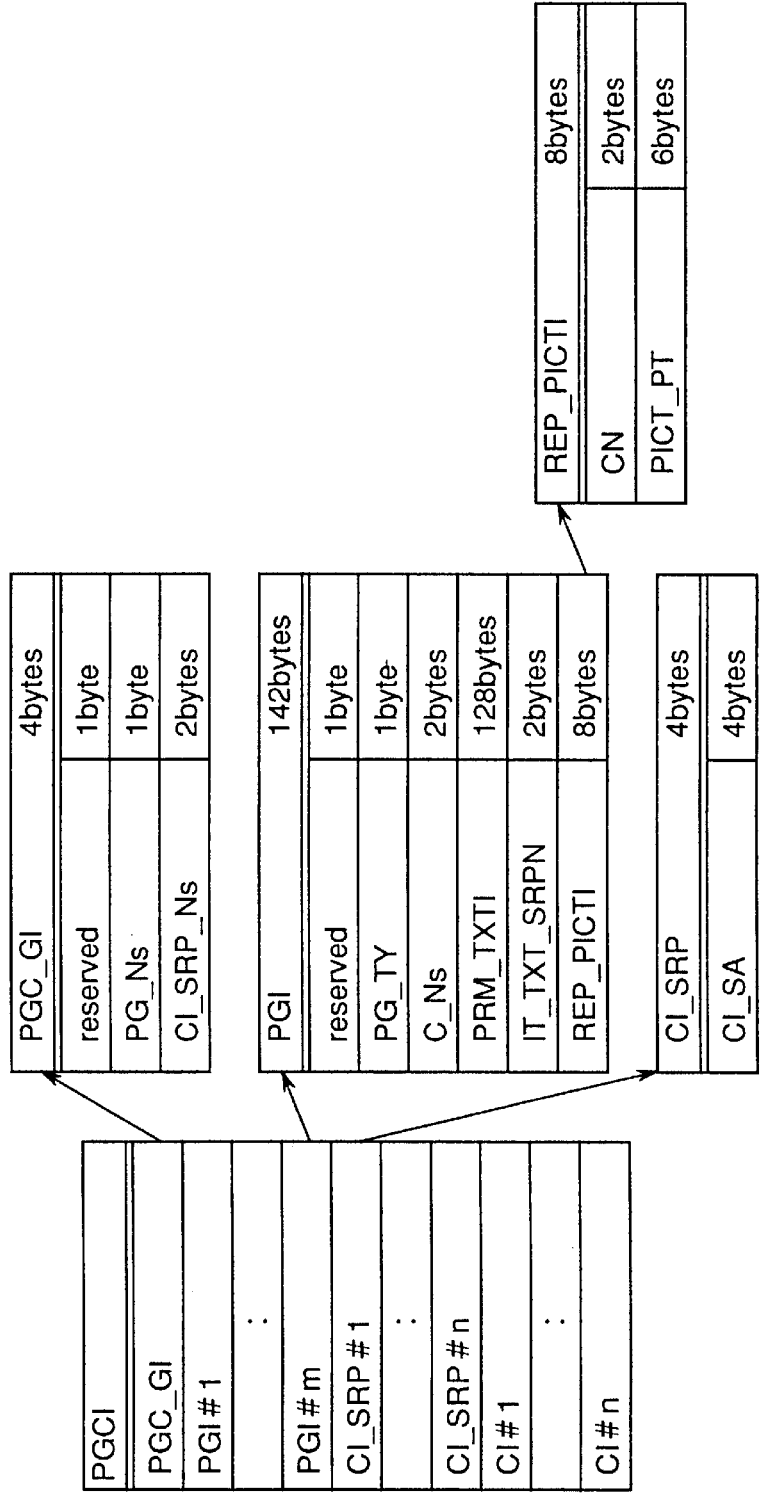
FIG. 32 is a diagram illustrating the structure PGCI.
Figure 34:
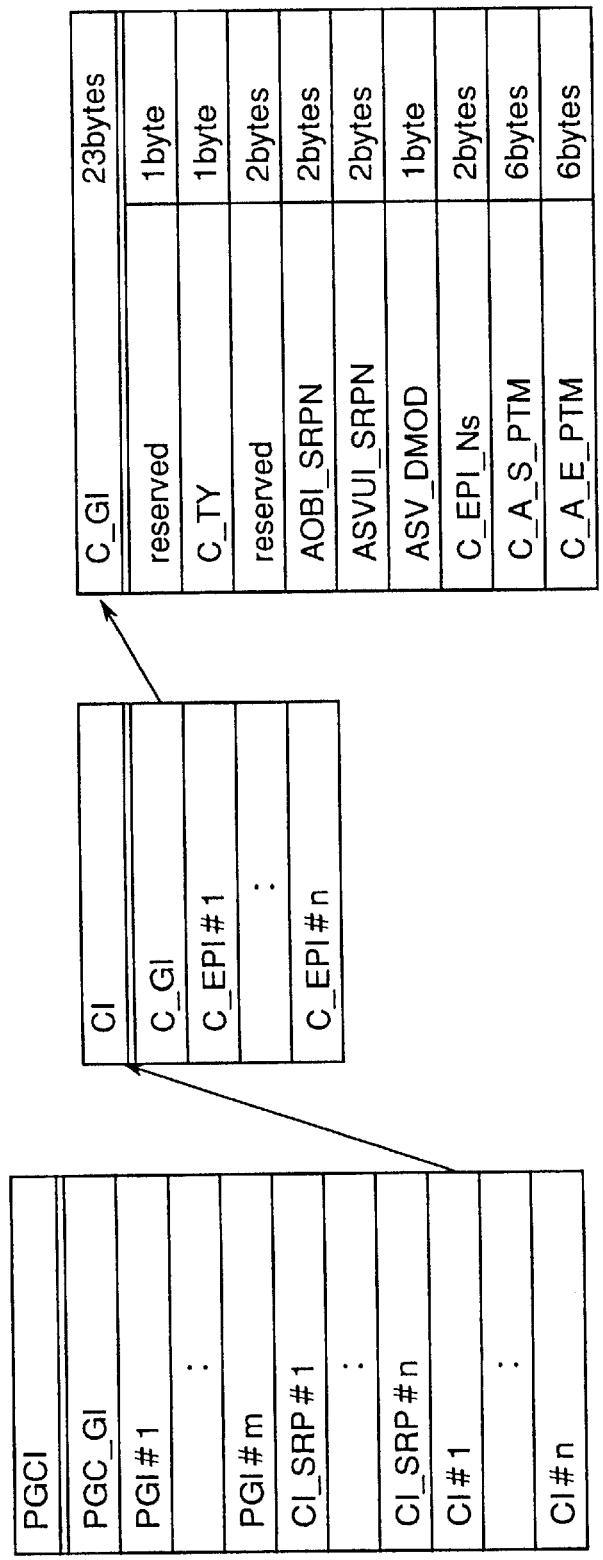
FIG. 34 is a diagram illustrating the structure of CI.
Figure 37:
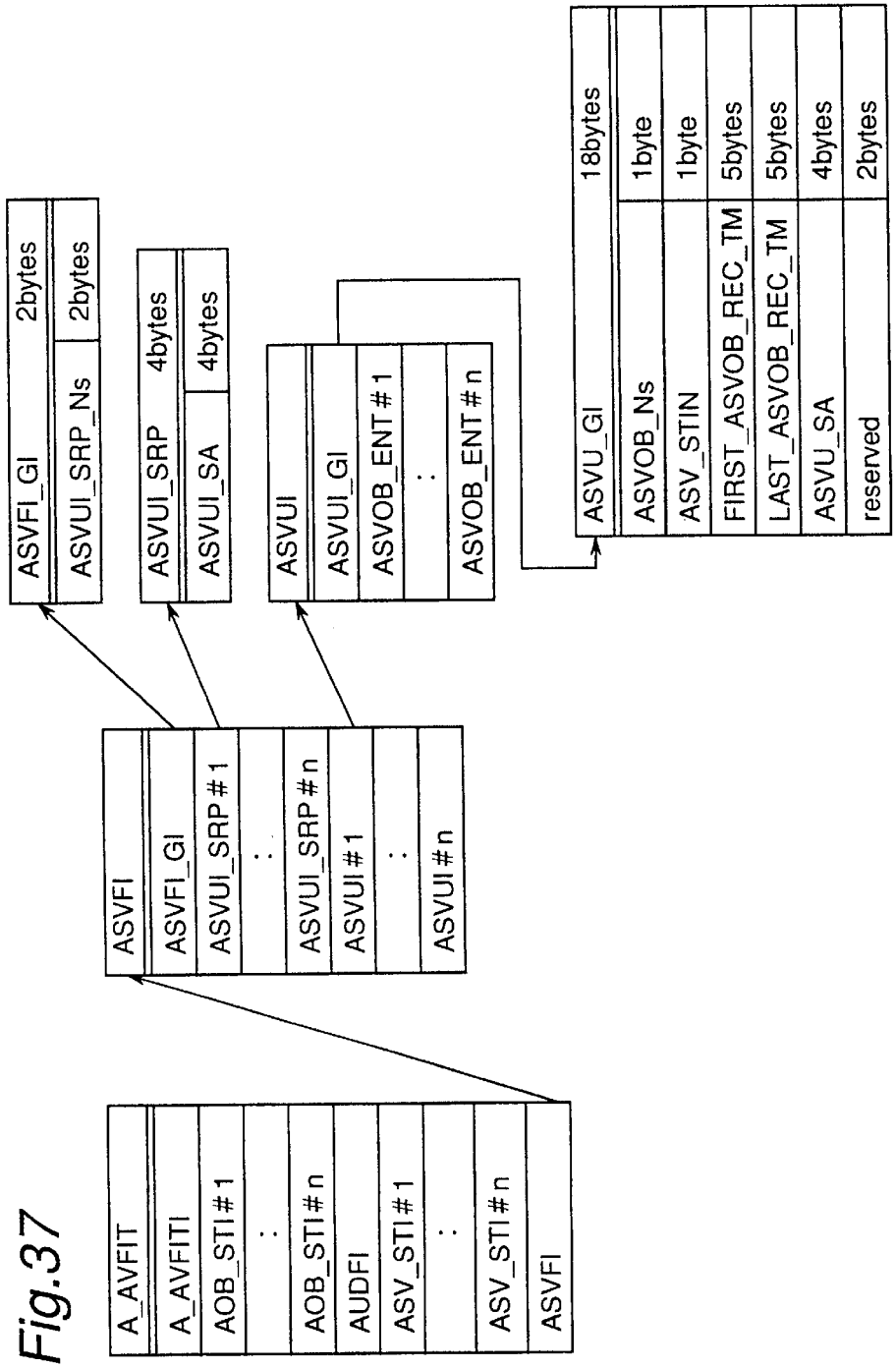
FIG. 37 is a diagram illustrating the structure of ASVFI.
Figure 39:
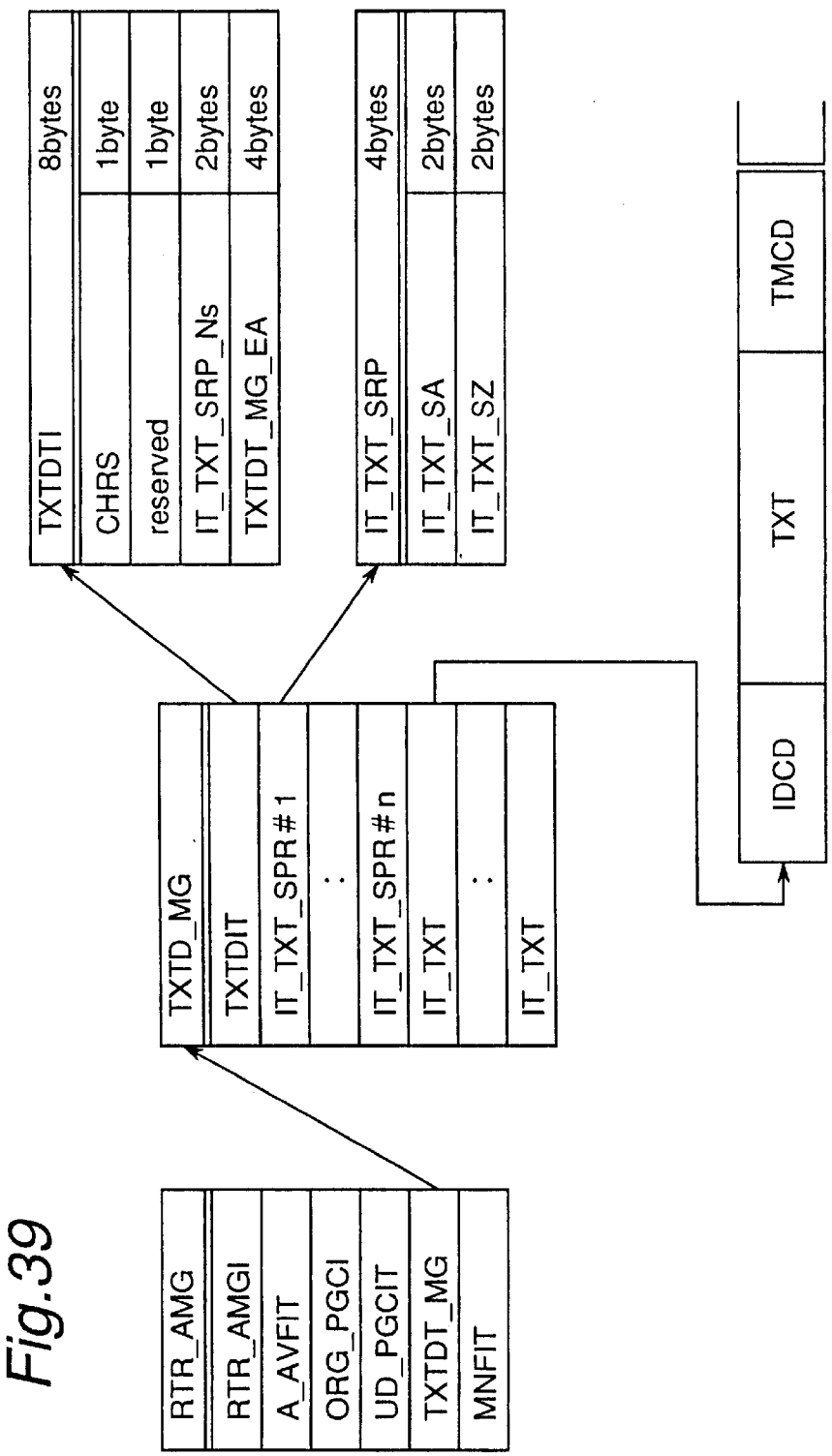
FIG. 39 is a diagram illustrating the structure of TXTDT_MG.

As shown in FIG. 29, AOBUI (AOB unit information) 350 comprises AOBU_GI (AOB unit general information) 360 to be header information and AOBU_ENT (AOBU entry) 370 which exists as many as the number of the AOBUs. It is noted that AOBU_ENT (370) exists only when the stream of the AOB to be designated has the variable bit rate (VBR), while the AOBU_ENT (370) does not exist when the stream of the AOB to be designated has the constant bit rate (CBR). That is, the AOBUI has the structure of the AOBUI (350') in the case of the constant bit rate (CBR). Thus, the AOBUI has two kinds of table structures. The one of the table structures is referenced when the audio object has the variable bit rate, and the other is referenced when the audio object has the constant bit rate method.

AOBU_GI (AOB unit general information) 360 to be header information includes AOBU_PB_TM (AOB unit playback time length) 361, AOBU_SZ (AOB unit size) 362, L_AOBU_PB_TM (last AOB unit playback time length) 363, L_AOBU_SZ (last AOB unit size) 364, AOBU_ENT_Ns (number of AOB unit entries) 365, and AOB_SA (AOB start address) 366. Respective fields are as follows.

AOBU_PB_TM (AOB unit playback time length) 361 records a playback duration for one unit which is common to each unit excluding the last AOB unit in the AOB. It is noted that the playback time lengths of the AOB units other than the last AOB unit in the AOB have a predetermined value indicated by this field. In other words, the value indicates the time precision of the map information. The disc reproducing apparatus can give access to the partial interval of the AOB with this precision.

AOBU_SZ (AOB unit size) 362 records the size of the AOB unit. In the case where an audio stream included in the AOB to be designated is audio data with the VBR (variable bit rate), the size of each AOB unit is not constant, and thus 0 is therefore recorded to the AOBU SZ (362).

L_AOBU_PB_TM (last AOB unit playback time length) 363 stores the playback time length (duration) of the last AOB unit in the AOB. The playback duration of the AOB is not always a multiple of a constant AOB unit playback duration. In such a case, adjustment is performed with the (363) stores the playback duration of this last AOB unit. L_AOBU_PB_TM (363) stores the playback duration of this last AOB unit.

L_AOBU_SZ (last AOB unit size) 364 stores the size of the last AOB unit in the AOB. As described above, since the last AOB unit does not always have constant playback duration, recording size is not fixed. In a case where the audio stream included in AOB is audio stream with VBR (variable bit rate), 0 is recorded to this field which is the same as that in AOBU_SZ (364).

AOBU_ENT_Ns (number of AOB unit entries) 365 stores the number of AOB unit entry fields (AOBU_ENT) described below. In the case in which an audio stream included in the AOB is audio data with the CBR (constant bit rate) system, the conversion from a time stamp to an except for the last AOBU in the AOB are the same. Thus, AOBU_ENT is not recorded in the CBR format, and 0 is recorded to the AOBU_ENT_Ns.

AOB_SA (AOB start address) 366 stores the offset value of the address in the head AV file of the AOB.

Next, AOBU_ENT (AOBU entry) 370 is described.

AOBU_ENT (AOBU entry) 370 stores AOBU_SZ (AOBU size) 371 indicative of the data amount of the corresponding AOBU, as shown in FIG. 30. To calculate a sector address corresponding to a time stamp to be accessed, the data amount from the head of the AOB can be calculated by summing up sequentially AOBU_SZ from the head of AOBU_ENT to the AOBU_ENT to which the time stamp corresponds. Then address information corresponding to a desirable time stamp can be obtained by adding the data amount thus calculated to the head sector address of the AOB.

1.4 Management Information File

AOBI (AOB information) described above is stored in the management information file "AR_MANGR.IFO" 20. Other fields included in the management information file "AR_MANGR.IFO" 20 are described below with reference to FIGS. 18 to 44.

"RTR_AMG" (FIG. 18)

Management information referred to as RTR_AMG (real time recording audio management) is recorded in the AR_MANGR.IFO file. The RTR_AMG comprises six tables of RTR_AMGI, A_AVFIT, ORG_PGCI, UD_PGCIT, TXTDT_MG and MNFIT.

The RTR_AMGI stores the management information related to the whole directory of DVD-RTAV such as a pointer to a succeeding table and the like. Moreover, A_AVFIT stores attribute information related to a coding mode, an audio file, a still picture file or the like. Furthermore, ORG_PGCI and UD_PGCIT store information related to a reproducing path for AOB comprised in the audio file and ASVOB comprised in the still picture file. TXTDT_MG stores management information related to a text and the MNFIT stores original definition information determined separately by the manufacture of the audio recorder.

Next, the details of each table comprised in the RTR_AMG is described.

1.4.1 RTR_AMGI table

RTR_AMGI (real time recording audio management information) is the first table of the management information RTR_AMG and comprises AMGI_MAT and PL_SRPT.

First of all, the AMGI_MAT including in RTR_AMGI is described.

Figure 19:
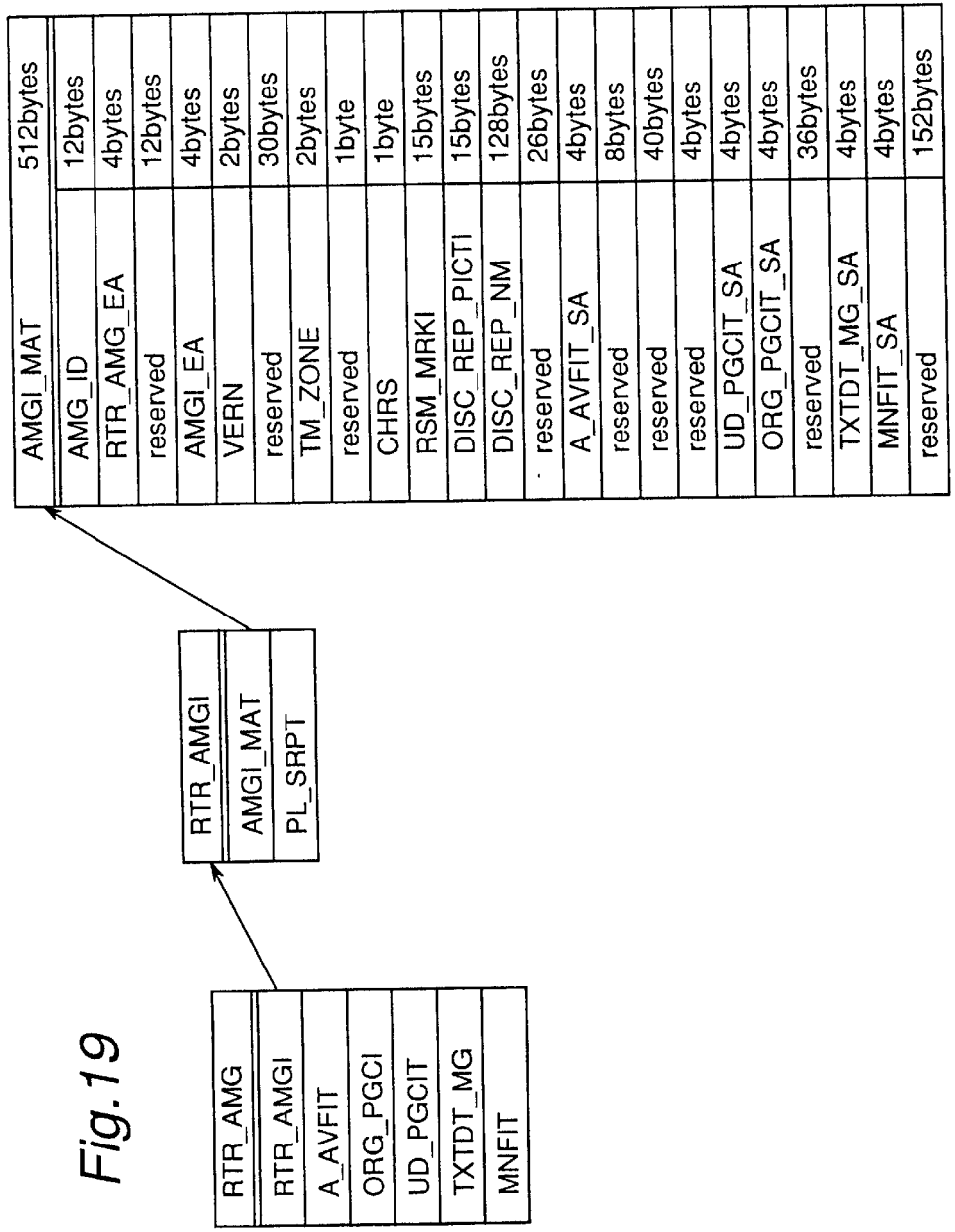
FIG. 19 is a diagram illustrating the structure of RTR_AMGI.

AMGI_MAT (audio management information management table) of the RTR_AMGI stores, as information related to whole disc, AMG_ID, RTR_AMG_EA, AMGI_EA, VERN, TM_ZONE, CHRS, RSM_MRKI, DISC_REP_PICTI, DISC_REP_NM, A_AVFIT_SA, UD_PGCIT_SA, ORG_PGCI_SA, TXTDT_MG_SA and MNFIT_SA, as shown in FIG. 19.

AMG_ID as the first information stores an audio management identifier. In the present invention, an identifier "DVD_RTR_AMGO" indicating that audio recording data are recorded is recorded in this disc.

RTR_AMG_EA as the second information stores an end address for RTR_AMG.

AMGI_EA as the third information records an end address for AMGI.

VERN as the fourth information records the recording data in accordance with a format shown in FIG. 20A.

TM_ZONE as the fifth information records a time zone to be used by full time and date information recorded in the disc in a format shown in FIG. 20B. TM_ZONE comprises TZ_TY (time zone type) indicating whether the Greenwich mean time which is a universal time or a local standard time is used for the reference of the date and time information, and TZ_OFFSET (time zone offset) for recording a time difference from the Greenwich mean time.

CHRS as the sixth information records a character set code for a primary text which is described below.

Figure 21:
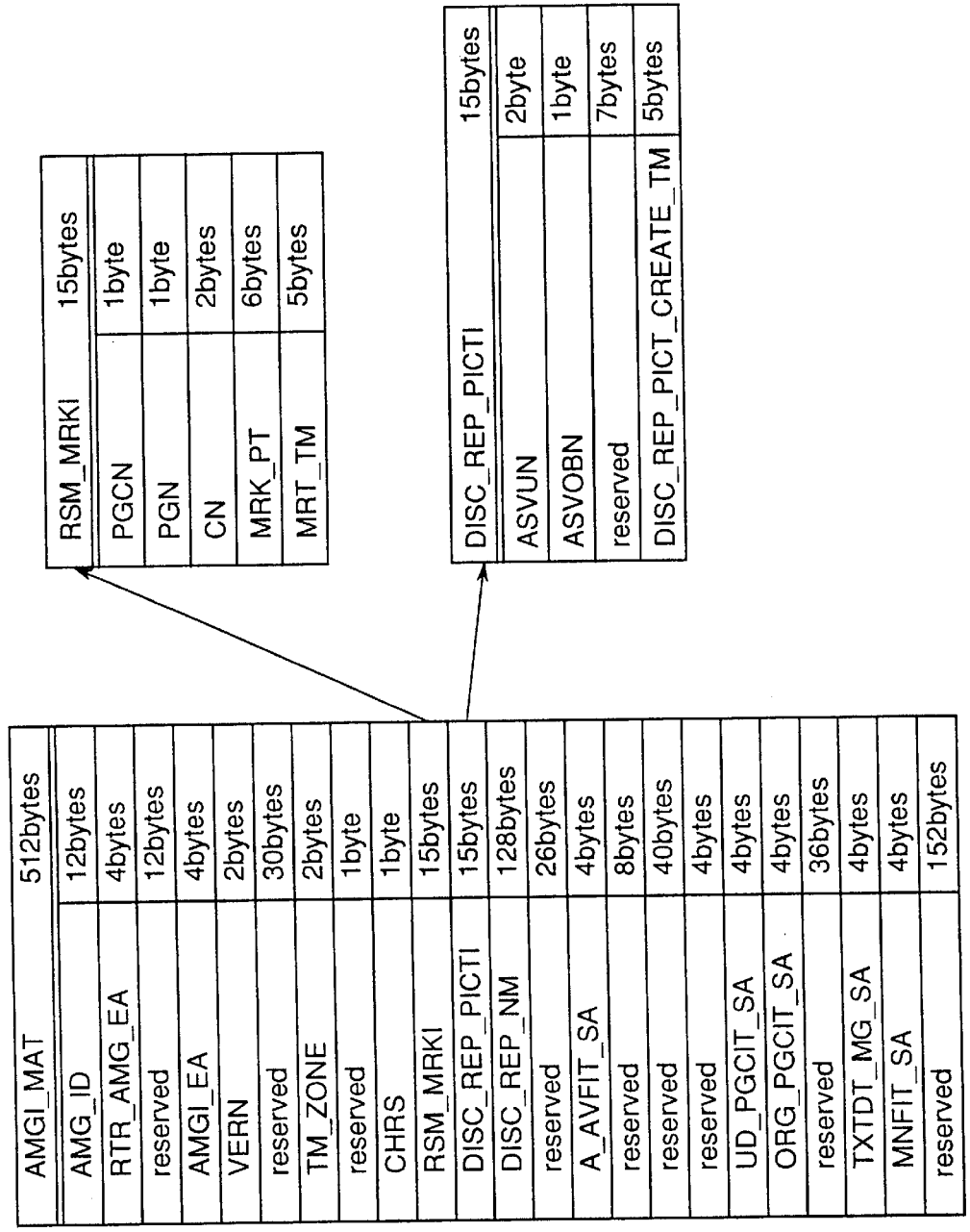
FIG. 21 is a diagram illustrating the structures of RSM_MRKI and DISC_REP_PICTI.

RSM_MRKI as the seventh information records resume information for starting playback from a point at which a user suspends the playback, in a format shown in FIG. 21. As shown in FIG. 21, RSM_MRKI comprises PGC number, PG number, a cell number, MRK_PT and MRK_TM, which are related to the point at which playback is suspended. MRK_TM indicates a time at which resume marker information is created in a description format shown in FIG. 23.

DISC_REP_PICTI as the eight information records disc representative still picture information.

DISC_REP_NM as the ninth information records text information indicative of the contents of the disc. The text information comprises a field for an ASCII code and a field for a character code set specified by the above mentioned CHRS.

A_AVFIT_SA as the tenth information records the start address of A_AVFIT. UD_PGCIT_SA as the eleventh information records the start address of UD_PGCIT. ORG_PGCI_SA as the twelfth information records the start address of ORG_PGCI. TXTDT_MG_SA as the thirteenth information records the start address of TXTDT_MG. MNFIT_SA as the fourteenth information records the start address of MNFIT.

A player and a recorder can obtain rough structure information of the disc by first reading the AMGI_MAT.

Next, PL_SRPT composing the RTR_AMGI is described.

Figure 22:
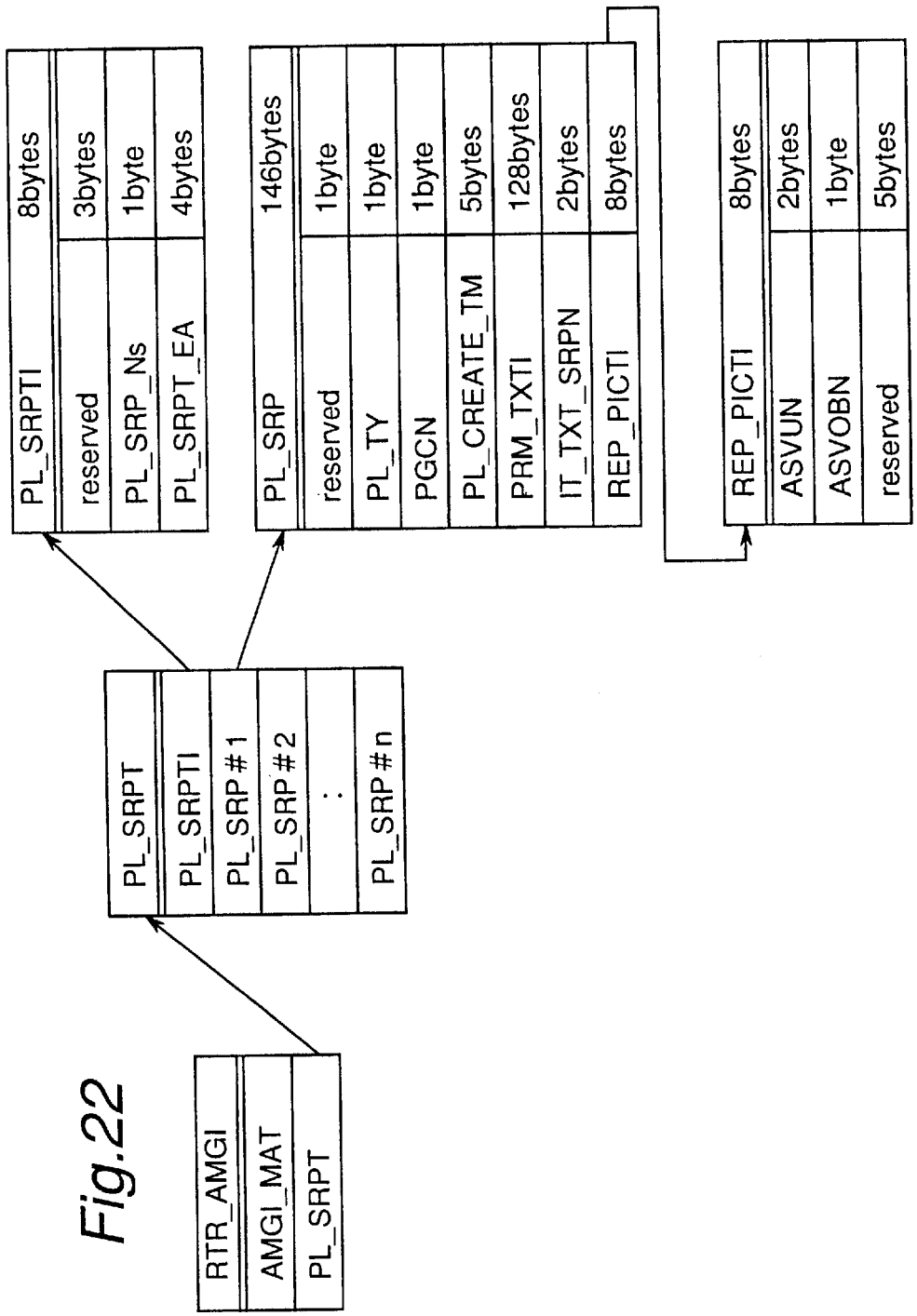
FIG. 22 is a diagram illustrating the structure of PL_SRP.

PL_SRPT (play list search pointer table) of RTR_AMGI stores access information to each play list. RTR_AMGI has a table comprising PL_SRPTI and n PL_SRPs as shown in FIG. 22.

PL_SRPTI (play list search pointer table the PL_SRPs and PL_SRPT_EA indicative of the end address of PL_SRPT in order to give access to the PL_SRP. Moreover, PL_SRP (play list search pointer) stores six information of PL_TY (play list type), PGCN (PGC number), PL_CREATE_TM (play list recording date and time), PRM_TXTI (primary text information), IT_TXT_SRPN (IT_TXT_SRP number) and REP_PICTI (representative still picture information).

PL_SRP (play list search pointer) which is the first information stores the following information for giving access to the user defined PGC to be the actual data of the play list.

PL_TY (play list type) which is the second information stores any of the following information as a value for identifying the type of the play accordance with the format described in FIG. 23.

1000b: only audio data (including a still picture which is displayed together with the audio data)

PGCN (PGC number) which is the third information stores the number of the PGC corresponding to the play list. The PGC number indicates the recording order of the PGC information in UD_PGCIT which is described below.

The PL_CREATE_TM (play list recording date and time) which is the fourth information stores date and time when the play list is created in accordance with the description format shown in FIG. 23.

PRM_TXTI (primary text information) which is the fifth information is used to record text information indicative of the contents of the play list. For example, when a television program is recorded, the name of the program is recorded to this field. Moreover, the primary text information comprises a field for the ASCII code and a field for a character code set specified by the CHRS which is described above.

IT_TXT_SRPN (IT_TXT_SRP number) which is the IT_TXT_SRP as link information to the IT_TXT which is recorded in the TXTDT_MG when information indicative of the contents of the play list is optionally recorded as the IT_TXT in addition to the above-mentioned primary text. The IT_TXT SRP number indicates a recording order in the TXTDT_MG which is described below.

REP_PICTI (representative still picture information of a still picture which is representative of the play list.

1.4.2 A AVFIT Table

A_AVFIT is the second table of the management information RTR_AMG.

A_AVFIT (audio AV file information table) is used to record management information corresponding to an audio file "AR_AUDIO.ARO" and an audio still video file "AR_STILL.ARO", respectively.

A_AVFITI which is header information, AUD_STI which is the management information of a stream included in the audio file and AUDFI which is the management information included in the audio file are recorded as the management information for the audio file.

Moreover, ASV_STI and ASVFI are recorded as the management information for the audio still video file.

First of all, the A_AVFITI which is the header information is described.

Figure 25:
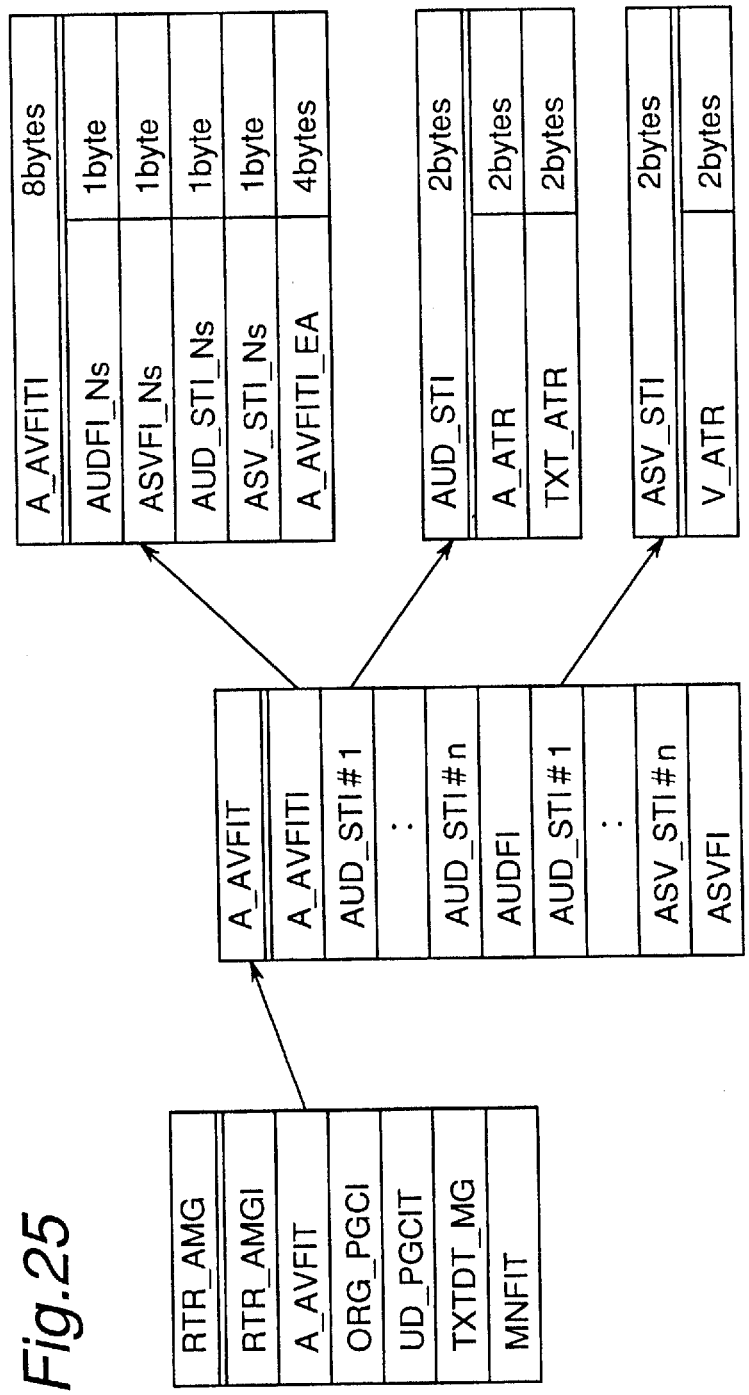
FIG. 25 is a diagram illustrating the structure of A_AVFIT.

A_AVFITI (audio AV file information table information) is the header information. As shown in FIG. 25, information necessary for giving access to the AUD_STI, AUDFI, ASV_STI and ASVFI to be succeeding information are recorded.

More specifically, six information of AUDFI_Ns, ASVFI_s, AUD_STI_Ns, AUD_STI_Ns, ASV_STI_Ns and A_AVFI EA are recorded.

AUDFI_Ns (number of audio file information) which is the first information holds "0" or "1" as the number of AUDFIs. This value also corresponds to the number of audio files, that is, the presence of the AR_AUDIO.ARO file.

ASVFI_Ns (number of ASV file information) which is the second information holds "0" or "1" as the ASVFI number. This value also corresponds to the number of audio still video files, that is, the presence of the AR_STILL.ARO file.

AUD STI_Ns (number of audio object stream information) which is the third information holds the number of AUD_STIs entries which are described below.

ASV STI_Ns (number of audio still video stream information) which is the fourth information records the number of ASV_STI entries which are described below.

A_AVFI_EA (audio AV file information end address) which is the fifth information records the end address of the A_AVFI which is described below.

Next, the MID_STI which is the management information of the streams included in the audio file is described.

AUD_STI indicates the attribute of a stream included in the AOB composing the audio file, in a format shown in FIG. 25. AUD_STI is present by the number of stream included in the AOB. The audio file comprises one or more AOBs. The structure of the stream is common in each of the AOBs. Therefore, the AUD STI stores one set of information which is common in all the AOBs.

AUD_STI (audio stream information) comprises the A_ATR and TXT_ATR. The A_ATR describes the attribute information of the audio data recorded in the AOB, and the TXT_ATR describes the attribute information of the text recorded in the AOB.

A_ATR of AUD_STI (audio stream information) records the five attributes of audio data including Audio coding mode, Quantization/DRC, fs, Number of Audio channels and Bitrate in accordance with a format shown in FIG. 26A.

As the first audio attribute "Audio coding mode", any one of the following values for identifying the coding mode of the audio data are recorded.

| | | |
|---|---|---|
| 000b | : | Dolby AC-3 |
| 001b | : | MPEG audio having no extended stream |
| 010b | : | MPEG audio having extended stream |
| 011b | : | linear PCM |
| 100b | : | MLP |
| 101b | : | AAC |
| 110b | : | ADPCM |

The linear PCM is a non-compressed coding mode, and the others are compressed coding modes. In the compressed coding mode, the Dolby AC-3, the MPEG audio having no extended stream and the MPEG audio having extended stream are compressed at the constant bit rate (CBR), and the MLP is compressed at the variable bit rate (VBR).

As the second audio attribute "Quantization/DRC", DRC (dynamic range control) is recorded when the MPEG audio is used, or a value for identifying Quantization is recorded when the LPCM audio is used.

During the use of the MPEG audio, any one of the following values is recorded as a value for identifying the presence of the DRC (dynamic range control) information.

| | | |
|---|---|---|
| 00b | : | DRC data are not included in the MPEG stream. |
| 01b | : | DRC data are included in the MPEG stream. |

Moreover, during the use of the LPCM audio, any one of the following values for identifying the Quantization is recorded.

| | | |
|---|---|---|
| 00b | : | 16 bits |
| 01b | : | 20 bits |
| 10b | : | 24 bits |

As the third audio attribute "fs", the following values for identifying a sampling frequency are recorded.

| | | |
|---|---|---|
| 00b | : | 48 Khz |
| 01b | : | 96 Khz |
| 10b | : | 192 Khz |

As the fourth audio attribute "Number of Audio channels", any one of the following values the number of audio channels is recorded.

| | | |
|---|---|---|
| 0000b : | | 1 channel (monoral) |
| 0001b : | | 2 channels (stereo) |
| 0010b : | | 3 channels |
| 0011b : | | 4 channels |
| 0100b : | | 5 channels |
| 0101b : | | 6 channels |

As the fifth audio attribute "Bitrate", any one of the following values for identifying the bit rate is recorded.

| | | |
|---|---|---|
| 0000 0001b | : | 64 kbps |
| 0000 0010b | : | 89 kbps |
| 0000 0011b | : | 96 kbps |
| 0000 0100b | : | 112 kbps |
| 0000 0101b | : | 128 kbps |
| 0000 0110b | : | 160 kbps |
| 0000 0111b | : | 192 kbps |
| 0000 1000b | : | 224 kbps |
| 0000 1001b | : | 256 kbps |
| 0000 1010b | : | 320 kbps |
| 0000 1011b | : | 384 kbps |
| 0000 1100b | : | 448 kbps |
| 0000 1101b | : | 768 kbps |
| 0000 1110b | : | 1536 kbps |

In the case in which the corresponding audio stream is the MPEG audio stream having an extended stream, only the bit rate of a basic stream except for the extended stream is recorded. The reason is why the extended stream cannot be represented with the above-mentioned constant bit stream because compression is carried out using the variable bit rate method.

TXT_ATR of AUD_STI (audio stream information) describes the attribute information of two texts including validity and CHRS in accordance with a format shown in FIG. 26B.

As the first text attribute "validity", a value indicating whether the text information is described in the RTI_PCK is recorded in the following manner.

| | | |
|---|---|---|
| 0b | : | RTI_PCK has no valid text information. |
| 1b | : | RTI_PCK has valid text information. |

As the second text attribute "CHRS", any of the following values for identifying the character code of the text information recorded in the RTI_PCK is recorded.

| | | |
|---|---|---|
| 00h | : | ISO/IEC 646 : 1983 (ASCII) |
| 11h | : | ISO 8859-1 : 1987 |
| 15h | : | Music Shift JIS |

Next, description is given the AUDFI indicative of respective management information of one or more AOBs included in the audio file.

Figure 27:
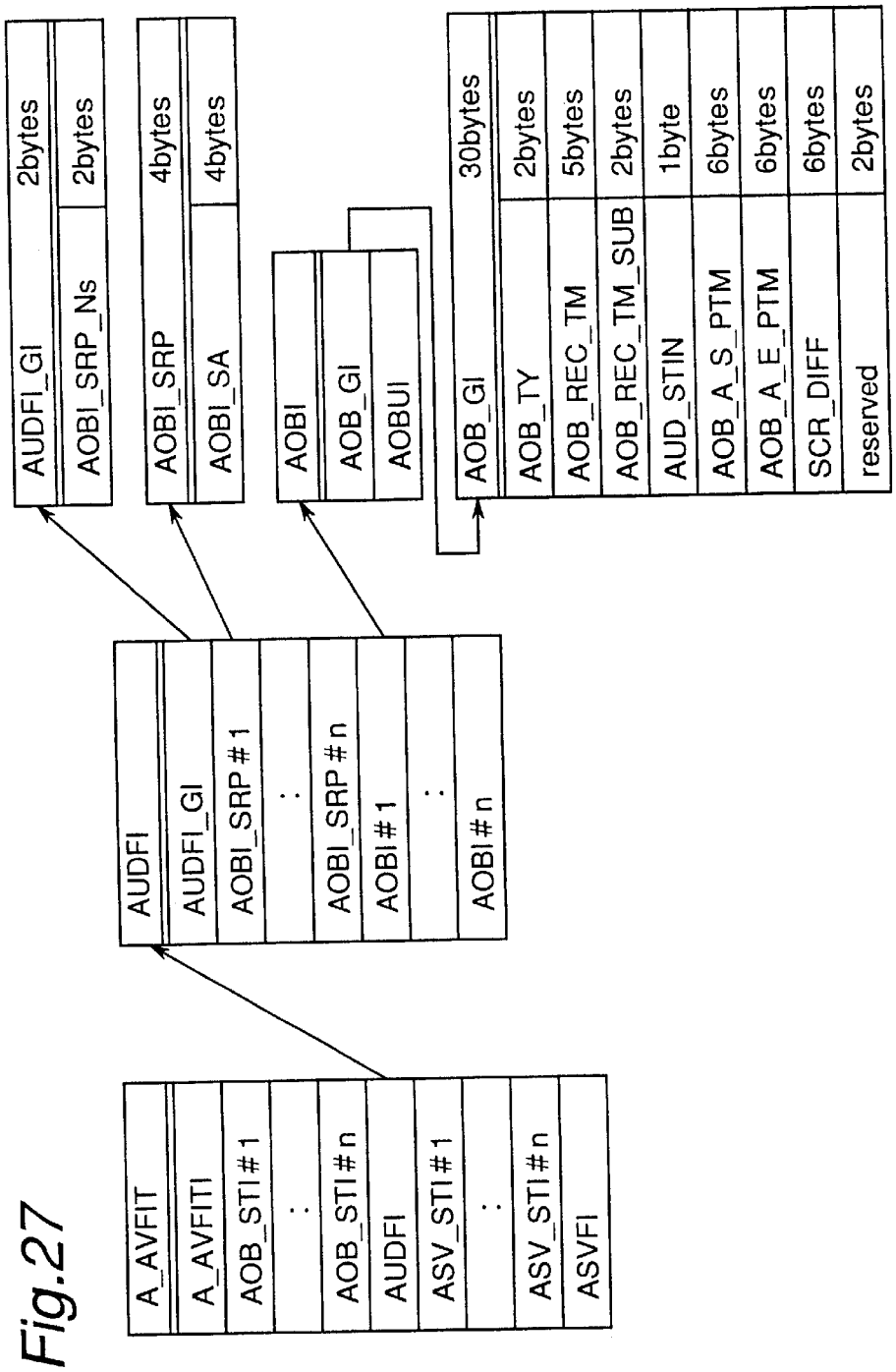
FIG. 27 is a diagram illustrating the structure of AUDFI.

AUDFI (audio file information) comprises information necessary for giving access to the AOB which includes AUDFI_GI, AOBI_SRP and AOBI in a format shown in FIG. 27.

AOBI is the management information and exists in as many as the number of AOBs composing the audio file. AOBI_SRP is pointer information to AOBI, and the start address of the corresponding AOBI is indicated as AOBI_SA. Furthermore, AUDFI_GI indicates the number of AOBI_SRPs.

The details of a data structure for AOBI is described below.

AOBI comprises AOB_GI which is general information, and AOBUI which is map information as shown in FIG. 27.

AOB_GI (AOB general information) records the following seven information as the general information of the AOB.

AOB_TY (AOB type) which is the first general information records TE and MT_FLG in accordance with a format shown in FIG. 28.

TE records any of the following values for identifying the state of the AOB.

| | |
|---|---|
| 0b | : normal state |
| 1b | : temporary erasing state |

Moreover, MT_FLG records any of the following values for identifying that the AOB is reproduced without sound snatches from the last AOB.

0b : A soundless interval might be inserted after the reproduction of the last AOB is ended and before the reproduction of the AOB is started.

1b : A soundless interval should not be inserted after the reproduction of the last AOB is ended and before the reproduction of the AOB is started.

AOB_REC_TM (AOB recording time and date) which is the second general information holds the time and date when the AOB is recorded in the same format as that of the PL_CREATE_TM shown in FIG. 23B. It is important that the recording time and date represents the recording time and date as to the presented audio frame in the head of the AOB, and that the AOB_REC_TM should also be modified when the AOB head audio frame is replaced through edit or partial erasure.

AOB REC_TM_SUB which is the third general information (AOB recording time and date difference information) is a field storing information for absorbing the error of the AOB_REC_TM which is to be modified when the AOB head audio frame is replaced through the edit or partial erasure on the AOB. AOB_REC_TM has only information year, month, day, hour, minute and second as shown in FIG. 23B. Therefore, if the edit or the erasure is carried out with frame or field precision, sufficient recording precision cannot be obtained with only the AOB_REC_TM. Therefore, a fraction is recorded by using this field.

AUD_STIN (AUD_STI number) number which is the corresponding to AOB. AUD_STI number described herein indicates a recording order in the above-mentioned AUD_STI table.

AOB_A_S_PTM (AOB audio start PTM) which is the fifth general information records the presentation start time of the AOB in the same reference time as the time stamp in the stream.

AOB_A_E_PTM (AOB audio end PTM) which is the sixth general information records the presentation end time of the AOB in the same reference time as the time stamp in the stream. It should be noted that while the time stamp in the stream indicates the presentation start time of the frame, the AOB_A_E_PTM holds the presentation end time, that is, a time obtained by adding the frame presentation period to the presentation start time of the frame.

SCR_DIFF (SCR difference) which is seventh general information describes a value obtained as the following calculation in AOB in question and AOB adjacent before the AOB in question.

SCR_Diff=((P_PTS+PTS1)−(P_SCR+SCR1))−(S_PTS−S_SCR)

PTS: PTS of the final audio frame of the adjacent-before AOB
P_SCR: SCR of the final pack of the adjacent before AOB
PTS: PTS of the first audio frame of the AOB in question
SCR: SCR of the first pack of the AOB in question
PTS1: the playback time length of one audio frame
SCR1: the time required for reading one pack Since the AOBUI has been described in (1.3.2), explanation thereof is omitted.

"ASV_STI" (FIG. 25)
This is described in a second embodiment.
"ASVFI" (FIG. 25)
This is described in the second embodiment.
"UD_PGCIT" (FIG. 31)
UD_PGCIT (user defined PGC information table) comprises UD_PGCITI, UD_PGCI_SRP and UD_PGCI.
"UD_PGCITI" (FIG. 31)
UD_PGCITI (user defined PGC information table information) records the following information comprised in the user defined PGC information table.
UD_PGCI_SRP_Ns (number of user defined PGC information search pointers)
The number of UD_PGCI SRPs is recorded.
UD_PGCI_EA (user defined PGC information table end address)
The end address of the UD_PGCIT is recorded.
"UD_PGCI_SRP (FIG. 31 )"

The UD_PGCI_SRP (user defined PGC information search pointer) records UD_PGCI_SA.
UD_PGCI_SA (user defined PGC information start address)
UD_PGCI_SA records the start address of the UD_PGCI. Seeking until an address in which the PGCI is recorded allows accessing to the PGCI.
"UD_PGCI" (FIG. 31)
The details of the UD_PGCI (user defined PGC information) is described in the following PGCI.
"ORG_PGCI" (FIG. 18)
The details of the ORG_PGCI (original PGC information) is described in the following PGCI.
"TXTDT_MG" (FIG. 18)
This is described in the second embodiment.
"PGCI" (FIG. 32)
PGCI (PGC information) has a data structure common to the ORG_PGCI and UD_PGCI, and comprises PGC_GI, PGI, CI_SRP and CI.
"PGC_GI" (FIG. 32)
PGC_GI (PGC general information) comprises PG_Ns and CI_SRP_Ns as PGC general information. Individual fields are as follows.
PG_Ns (number of programs)
The number of programs in the PGC is recorded. In the case of the user defined PGC, there no program. Therefore, "0" is recorded in this field.
GI_SRP_Ns (number of GI SRPs)
The number of GI_SRPs which is described below is recorded.
"PGI" (FIG. 32)
The PGI (program information) comprises PG_TY, C_Ns, PRM_TXTI, IT_TXT_SRPN, and REP_PICTI. Individual fields are as follows.
PG_TY (program type)
The following information indicative of the state of this program is recorded by using a format shown in FIG. 33.
Protect (protect)

| 0b: normal state |
| 1b: protecting state |

C_NS (cell number)
The number of cells in this program is described.
PRM_TXTI(primary text information)
Text information indicative of the contents of this program is recorded. The details are the same as those of the above-mentioned PRM_TXT.
IT_TXT_SRPN (IT_TXT_SRP number)
This is described in the second embodiment.
REP_PICTI (representative still picture information)
This is described in the second embodiment.
"CI_SRP" (FIG. 34)
CI_SRP (cell information search pointer) records address information for giving access to the cell information.
CI_SA (cell information start address)
The start address of this cell information is recorded. To access to this cell, seed should be carried out until this address.
"CI" (FIG. 34)
The CI (cell information) comprises C_GI and C_EPI.
"C_GI" (FIG. 34)
C_GI (cell general information) has the following basic information comprised in the cell.

C_TY (cell type)

Figure 35:
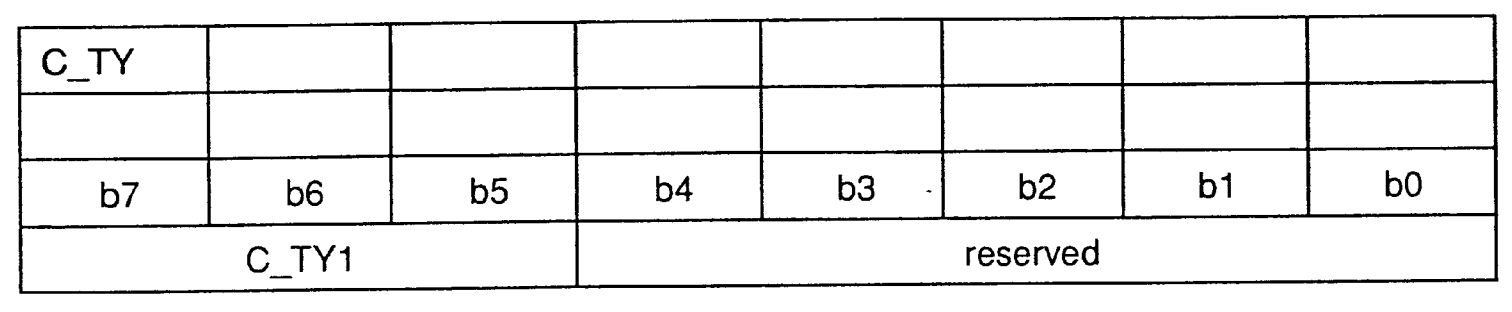

The following information for identifying an audio cell is recorded in a format shown in FIG. 35.

C_TY1

010b: audio cell

AOBI_SRPN (AOB information search pointer number)

The search pointer number of the AOB information to which this cell corresponds is recorded. When accessing to stream data to which this cell corresponds, access is first given to the AOB information indicated by this field.

ASVUI_SRPN (ASV unit information search pointer number)

This is described in the second embodiment.

ASV_DMOD (ASV display mode)

This is described in the second embodiment.

C_EPI_Ns (number of cell entry point information)

This is described in the second embodiment.

C_A_S_PTM (cell audio start time)

The playback start time of this cell is recorded in the format shown in FIG. 24.

C_A_E_PTM (cell audio end time)

The playback end time of this cell is recorded in the format shown in FIG. 24. By using the C_A_S_PTM and the C_A_E_PTM, the valid interval of the cell in the AOB to which the cell corresponds is specified.

"C EPI" (FIG. 34)

This is described in the second embodiment.

1.5 DVD Decoder 1.5.1 Structure of DVD Recorder

Figure 14:
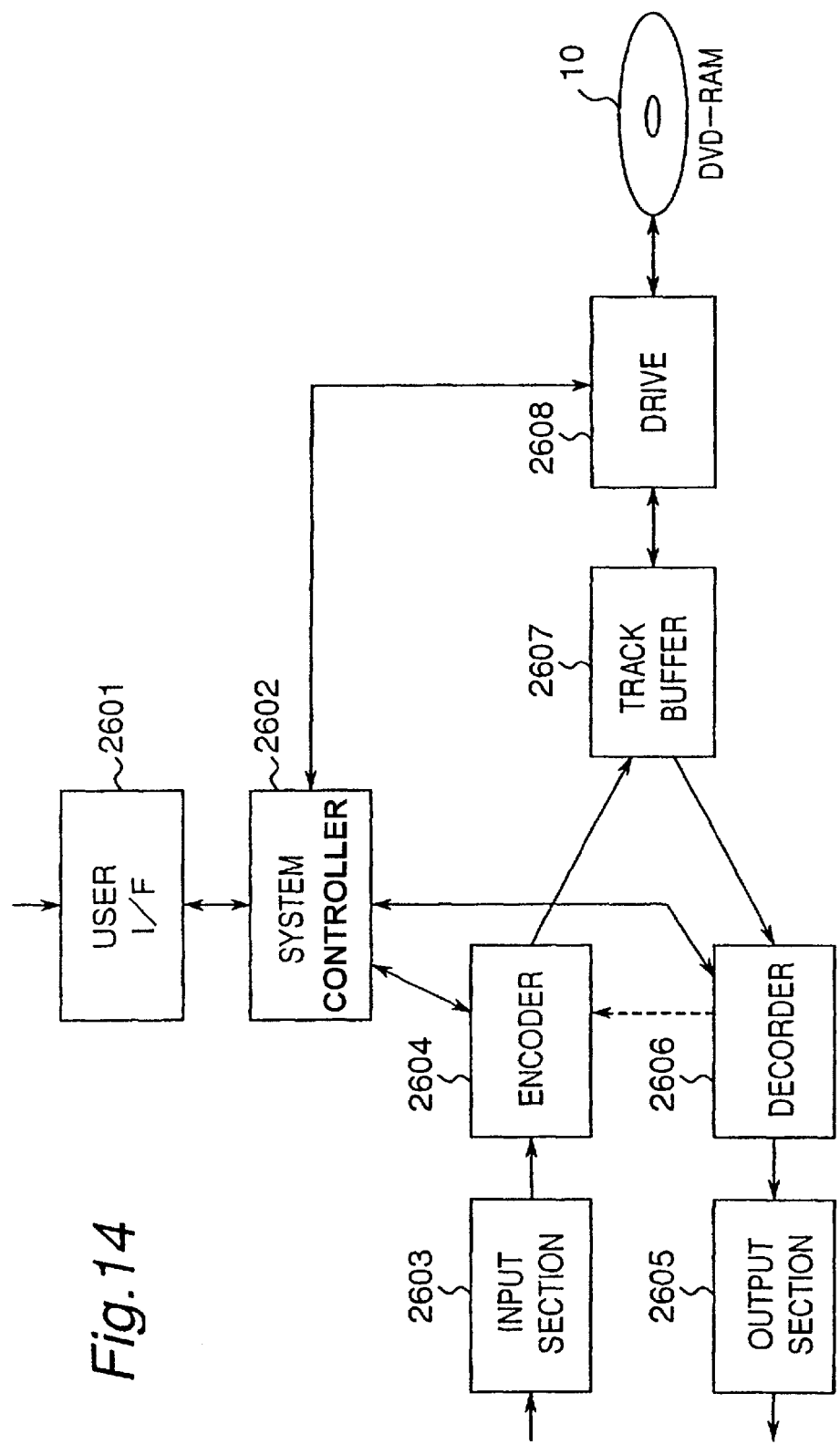
FIG. 14 is a diagram showing the structure of a DVD recorder according to the present invention.

FIG. 14 shows the structure of a DVD recorder for recording and reproducing data for the optical disc according to the present invention. The DVD recorder comprises a user interface section 2601 for displaying to a user and accepting a request from the user, a system controller 2602 for managing and controlling the operation of each component of the apparatus, an input section 2603 for inputting video and audio data which includes an AD converter, and encoder 2604, an output section 2605 for outputting the video and audio signal, a decoder 2606 for decoding an MPEG stream, a track buffer 2607, and a drive 2608 for reading/writing data from/to the optical disc.

1.5.2 Reproducing Operation of DVD Recorder

Data on the DVD-RAM which are recorded by the DVD recorder are read to be reproduced. The reproducing operation is described below.

The DVD recorder first reads an AR_MANGR.IFO file storing management information recorded in the ROOT directory of an optical disc 10 upon receipt of request to start reproduction from the user through the user interface section 2601. The system controller 2602 loads the contents of the read AR_MANGR.IFO file into an internal memory. Next, the system controller 2602 checks AMG_ID and different information from the information which should originally been stored in these locations has been recorded, the system controller 2602 decides that the disc cannot be reproduced by the DVD recorder and does not carry out the reproduction.

Next, the system controller accesses the ORG_PGCI with reference to the ORG_PGCI_SA. Since the ORG_PGCI_SA stores the recording position of the ORG_PGCI, the ORG_PGCI can be referred by referring to a specified address in the management information which has previously been read.

1.5.3 Reproducing (playback) Operation in accordance with PGCI

The system controller 2602 reproduces a series of audio data by referring to the PGCI. The operation to be carried out for the reproduction using the PGCI is described below.

First of all, the system controller 2602 refers to the PG Ns described in the PGCI_GI. The PG_Ns describes the number of PGs which is coincident with number of PGIs included in the PGCI. The data length of the PGI is constant. Therefore, the number of PGs multiplied by the data length of the PGI can provide the data length of the whole PGI. Consequently, skipping PGC_GIs and PGIs which have constant lengths by data length of the PGI from the head of the PGCI can provide the head address of GI_SRP. Moreover, the PGI describes the number of the cells included in the PG. There is a condition that one cell is always included in only one PG, and the description order of the information related to the cell is equal to description order of the PG included in the cell. Due to that condition, it is possible to access CI_SRP corresponding to each PGI. Furthermore, CI_SRP describes CI_SA necessary to access the CI. Therefore based on this information, the system controller can refer to the CI. In the case of the UD PGCI, the PG_Ns should be 0. Therefore, it is easier to acquire the head address of the CI_SRP.

The system controller first refers to the first described CI information. CI comprises C_GI and C_EPI. ASVFI_SRPN included in the C_GI is first referred. When 0 is described therein, a processing is not particularly carried out. On the other hand, when a value other than 0 is described, a processing of reading the ASVU (Audio Still Video Unit) is carried out.

1.5.4 AOB Reproducing Processing

In the reproduction of AOB, temporarily storing different from the case of ASVU, but reading from the optical disc (medium) 10 is carried out to reproduce sequentially the read data. To do this, the system which data is read and the end position to reproduction is continued.

Therefore, AOBI_SRPN, C_A_S_PT and C_A_E_PTM in the C_GI are used. The system controller 2602 first refers to the AUDFI stored in the memory. A processing necessary for referring to the AUDFI is the same as in the method used for referring to the ASVFI. After access is thus given to the AUDFI, AOBI_SRP in the AUDFI is referenced. Herein, referenced is AOBI_SRP having a number indicated by the AOBI_SRPN in a plurality of AOBI_SRPs. Since the AOBI_SA is described therein, it is possible the AOBI. Next, the system controller 2602 refers to the C_A_S_PTM, and determines based on this information an address from which reproduction is started in the AR_AUDIO.ARO file.

Figure 15:
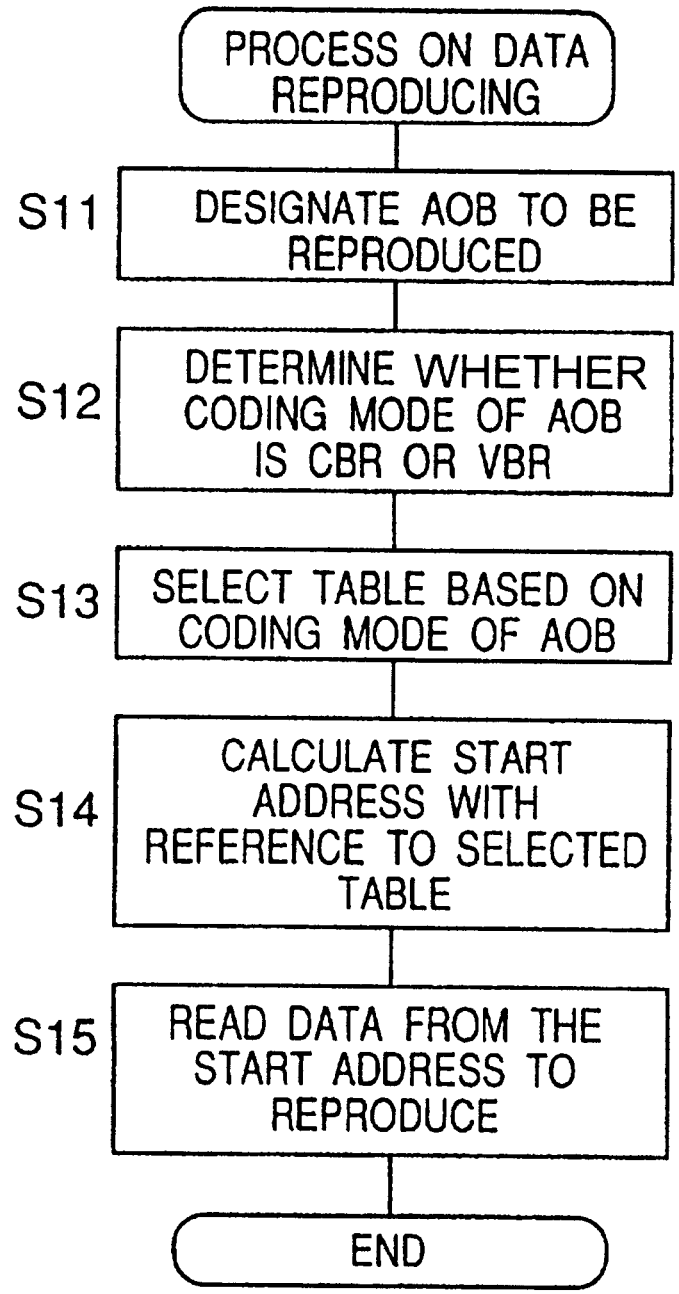
FIG. 15 is a flowchart showing the summary of a processing during the reproduction processing of the DVD recorder according to the present invention.

With reference to a flowchart shown in FIG. 15, the data reproducing operation on the optical disc is specifically described.

First of all, the AOB to be reproduced and the reproducing interval of the AOB are specified for the interface 2601 (Step S11). The AOB to be reproduced and the reproducing interval of the AOB may be specified in accordance with the PGCI. The system controller 2602 decides whether the coding mode of the specified AOB is constant bit rate system or a variable bit (Step S12). It is possible to decide coding mode by referring to Audio Coding Mode (FIG. 25 and FIG. 26A) of the A_ATR. Next, the table structure of the AOBUI is decided according to the coding mode of the AOB (Step S13). More specifically, in the case in which the coding mode is the variable bit rate mode, it is decided that the AOBUI is mode is the constant bit rate mode, it is decided that the AOBUI is AOBUI 350' having such a table structure as to have no entry. In accordance with the table of the AOBUI thus decided, information necessary for a unit size or the like is read from the AOBUI and a start address on the disc 10 of the audio data is determined (Step S14). The system controller 2602 controls the drive 2608 to read data from the obtained start address. The read data are reproduced through the decoder 2606 and the output section S15).

Figure 16:
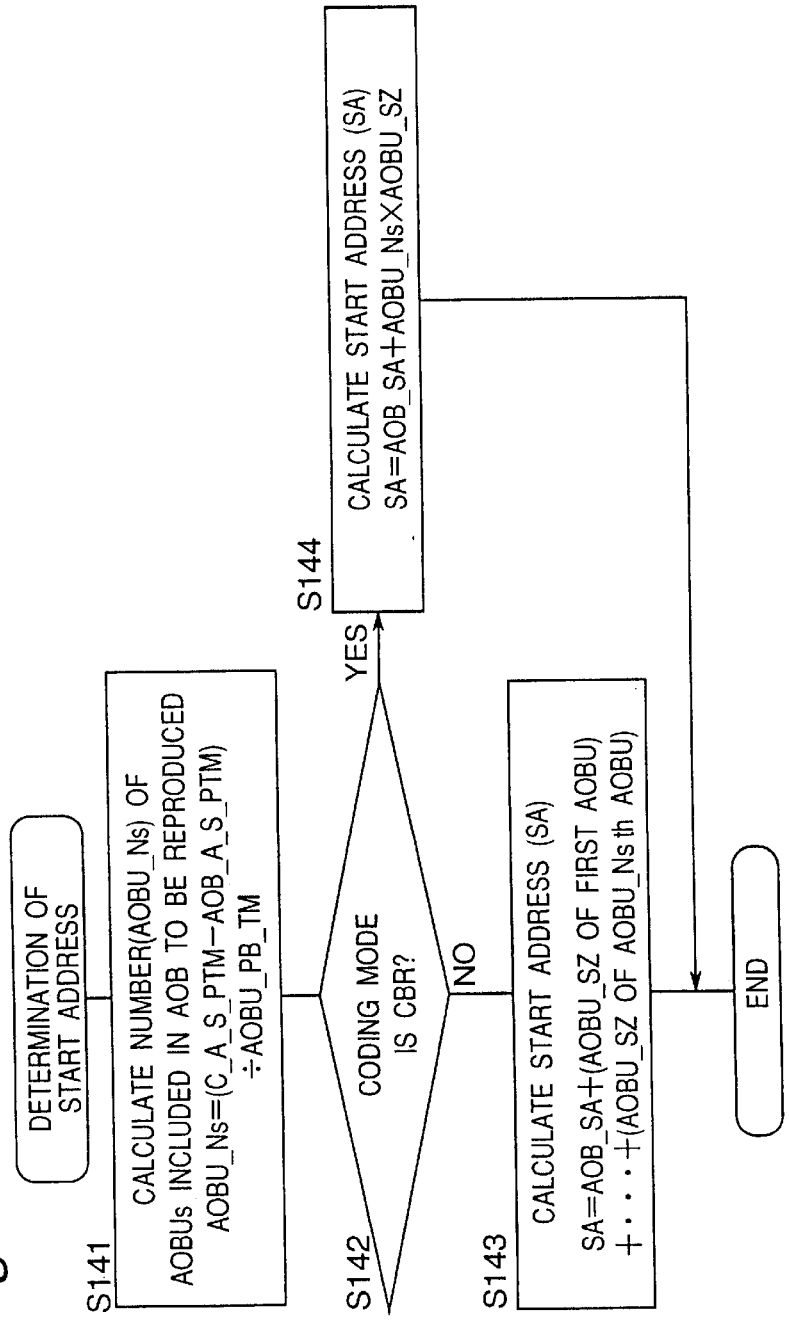
FIG. 16 is a flowchart showing the summary of a processing for acquiring a reproduction during the reproduction processing.

With reference to a flowchart shown in FIG. 16, the method of determining a start address at the Step S14 is specifically described.

First of all, the number of the AOBU comprised in the AOB to be reproduced is obtained (Step S141). More specifically, a difference between the C_A_S_PTM (cell audio start time) and the AOB_A_S_PTM (AOB audio start PTM) described in the AOB_GI is calculated. The difference thus calculated is divided by the AOBU_PB_TM (AOB unit playback time length) described in the AOBU_GI. The quotient thus obtained is set to the number of the AOBUs (AOBU_Ns).

Next, the reading start address of the audio data is obtained by a method corresponding to the coding mode of the audio data included in the AOB to be processed, in accordance with the result of the decision at the step S12 (steps S142 to S144).

In the case where the coding mode of the audio data is the variable bit rate mode, the data size of each AOBU comprised in the AOB to be reproduced is obtained, each data size thus obtained is summed and the offset address value of the AOB to be reproduced is added to the summed value. Thus, the start address (SA) is obtained (Step S143). More specifically, the sizes of the first AOBU to AOBU placed in AOBU_Ns-th are read and summed. In other words, by referring to the AOBUI (350) (FIG. 29) having the structure of the variable bit rate mode, summed are the values of the AOBU_SZ (371)(FIG. 30) from the first AOBU_SZ to the AOBU_Ns-th AOBU_SZ in AOBU_ENT #n (n =1, 2, 3 . . . ) 370 described in the AOBUI. A value obtained by adding the summed value to the value of the offset address (AOB_SA (366)) of the AOB is the start address of the AOBU including the C_A_S_PTM.

In the case in which the coding mode of the audio data is the constant bit rate mode, the data size of a unit which is common to each unit other than the last unit is obtained. The obtained data size is multiplied by the number (AOBU_Ns) of the units comprised in the AOB to be reproduced. The offset address value of the AOB to be reproduced is added to the multiplied value to obtain the start address (Step S144). More specifically, by referring to the AOBUI (350') (FIG. 29) having the structure of the constant bit rate mode, the AOBU_Ns obtained previously is multiplied by the AOBU_SZ (362) described in the AOBU_GI. The AOBU_SA (366) is added to a value thus obtained by the multiplication. A value thus obtained is the start address of the AOBU including the C_A_S_PTM to be desired. As described above, the address from which the reproduction is to be started can be obtained.

When the reproduction is started at the start address of the AOBU thus obtained, a temporal error of which maximum size is equal to size of the AOBU_PB_TM is generated. In order to avoid the generation of the error, it is necessary to skip audio frames corresponding to the error between the head PTS of the AOBU to the C_A_S_PTM to reproduce data.

It is possible to accurately determine the reproducing start point of the AOB by the above-mentioned method. Similarly, it is also possible to the reproduction end point of the AOB by using the C_A_E_PTM. Data are read sequentially from the obtained reproduction start address to the obtained reproduction end address to be sequentially sent to the audio output section. The audio output section 2605 receives these data and determines the attribute of the received data based on the information of the AUD_STI passed from the system controller 2602 to reproduce the data. A method of acquiring the AUD_STI is the same as the method used for the acquirement of the ASV_STI.

1.5.5 AOB Recording Processing

Figure 17:
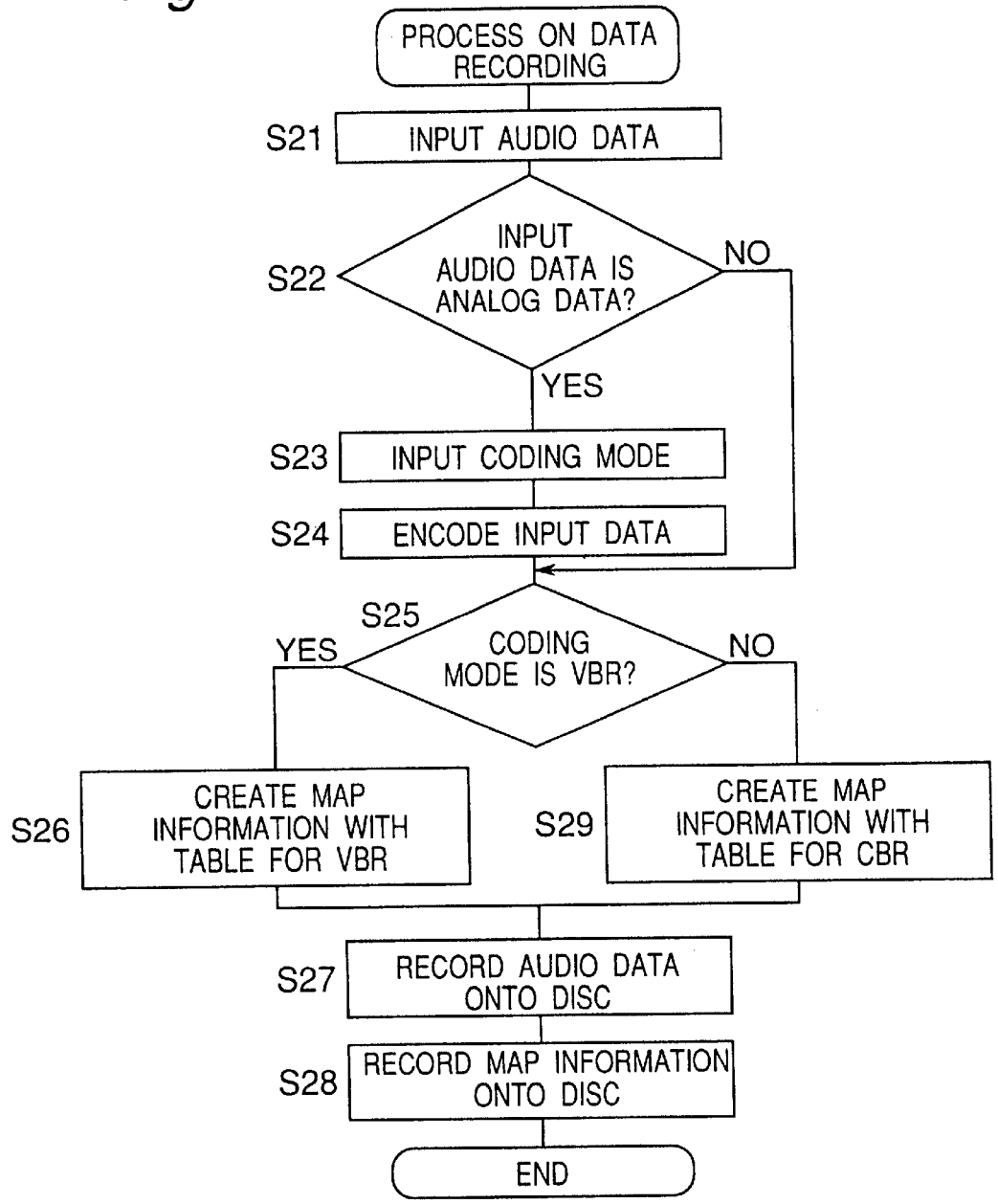
FIG. 17 is a flowchart showing the summary of a processing during the recording processing recorder according to the present invention.
Figure 18:
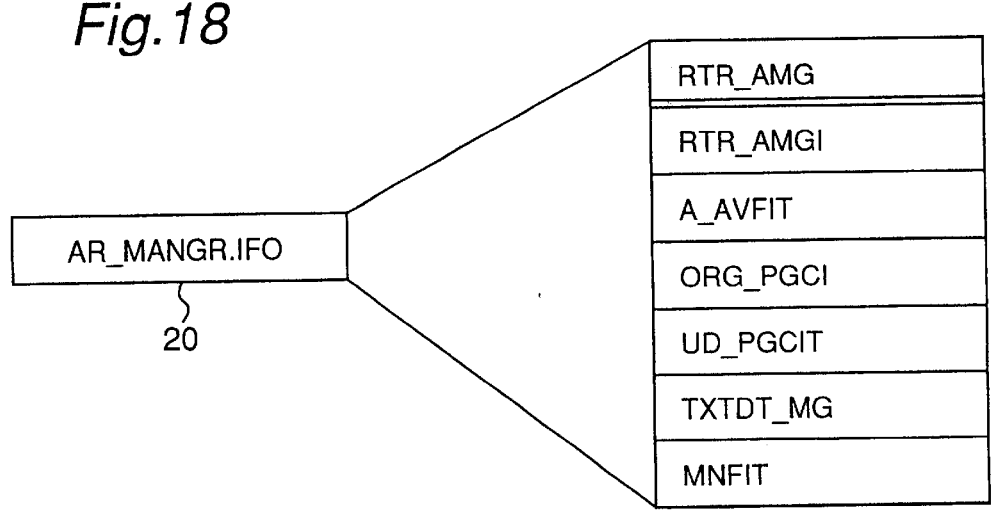
FIG. 18 is a diagram showing the structure of RTR_AMG.

With reference to a flowchart shown in FIG. 17, a processing of recording the AOB on the optical disc is described.

First of all, audio data to be recorded on the optical disc 10 arc input through the input section 2603 (Step S21). The system controller 2602 decides whether or not the input audio data are analog data (Step S22). When the input data are the analog data, a coding mode is input through the user interface 2601 (Step S23). The system controller 2602 notifies the encoder 2604 of the information about the coding mode, and the encoder 2604 encodes the input audio data according to the coding mode (Step S24). The audio data thus encoded (or the input audio data when the data are not encoded) are temporarily stored in the track buffer 2607 before written to the disc 10. Next, the system controller 2602 decides whether the coding mode of the audio data is a coding mode at the variable bit rate (VBR) or a coding mode at the constant bit rate (CBR) (Step S25).

When the coding mode is the variable bit rate coding mode, map information having the table structure for the variable bit rate mode, that is, the AOBUI is create (Step S26). In other words, created is the AOBUI (350) for the variable bit rate mode shown in FIG. 29, in which the data size of AOB unit is recorded for each AOB unit comprised in the audio data. In the AOBUI (350) for the variable bit rate mode, the data size of each unit is recorded in the AOBU_SZ (371) (FIG. 30) of the AOBU_ENT #n (n=1, 2,3, . . . ), respectively. In the AOBU_GI (360), moreover, the playback time of the AOB is recorded in the AOBU_PB_TM (361) and the start address of the AOBU is recorded in the AOBU_SA (366).

On the other hand, when the coding mode is the constant bit rate coding mode, the AOBUI having the table structure for the constant bit rate mode is created (Step S29). More specifically, the AOBUI (350') for the constant bit rate mode shown in FIG. 29 is created. In the AOBUI (350') for the constant bit rate mode, the data size of the last unit in the units comprised in the audio data is recorded in the L_AOBU_SZ (364), and the unit data size which is common to sizes of the units other than the last unit is recorded in the AOBU_SZ (362). At this time, in the AOBU_GI, the playback time of the first AOB unit is recorded in the AOBU_PB_TM (361), the playback time of the last AOB unit is recorded in the L_AOBU_PB_TM (363), and the start address of the AOBU is recorded in the AOBU_SA (366).

Then, the system controller 2602 controls the drive 2608 to record the coded audio data and the created AOBUI and the like in the disc 10 (Step S27, S28).

Second Embodiment

In the present embodiment, a home audio recorder is described, to which the present invention is applied. The physical structure and logical structure of the optical disc and AV data in the present embodiment are the same as those in the first embodiment.

2.1 Management Information File

With reference to FIGS. 36 to 45 and FIGS. 18 to 35 used for the description of the first embodiment, the contents of management information file "AR_MANGR.IFO" are described below.

"RTR_AMG" (FIG. 18)

This is the same as that in the first embodiment.
"RTR_AMGI" (FIG. 19)
This is the same as that in the first embodiment.
"AMGI_MAT" (FIG. 19)

AMG_ID (audio management identifier)
RTR_AMG_EA (RTR_AMG end address)
AMGI_EA (AMGI end address)
VERN (version number)
TM_ZONE (time zone)
RSM_MRKI (resume marker information)

These are the same as those in the first embodiment.

DISC_REP_PICTI (disc representative still picture information)

This field records information about a picture which is used, as a representative still picture of the disc, when the contents of the disc are presented through a menu or the like. As shown in FIG. 21, the field comprises an ASVU number (ASVUN), an ASVOB number (ASVOBN) and DISC_REP_PICT_CREATE_TM in which the still picture is recorded. The DISC_REP_PICT_CREATE_TM indicates a time at which the still picture to be designated is created, and has a description format shown in FIG. 23B.

DISC_REP_NM (disc representative name)
A_AVFIT_SA (A_AVFIT start address)
UD_PGCIT_SA (UD_PGCIT start address)
ORG_PGCI_SA (ORG_PGCI start address)
TXTDT_MG_SA (TXTDT_MG start address) and
MNFIT_SA (MNFIT start address)

are the same as those in the first embodiment.
"PL_SRPT" (FIG. 22)
This is the same as that in the first embodiment
"PL_SRPTI" (FIG. 22)
This is the same as that in the first embodiment.
"PL_SRP" (FIG. 22)
This is the same as that in the first embodiment except for REP_PICTI.
"REP_PICTI" (FIG. 22)

The REP_PICTI records the following information indicative of the position of the representative still picture.

ASVUN (ASV number)

An ASVU number including the representative still picture is recorded. The ASVU number indicates a recording order in an AR_STILL.ARO file.

ASVOBN (ASVOB number)

An ASVOB number including the representative still picture is recorded. The ASVOB number indicates a recording order in the ASV.

"A_AVFIT" (FIG. 25)

This is the same as that in the first embodiment and ASV_STI and ASVFI are described in detail.

"A_AVFITI" (FIG. 25),
"AUD_STI" (FIG. 25),
"AUDFI" (FIG. 27),
"AUDFI_GI" (FIG. 27),
"AOBI_SRP" (FIG. 27),
"AOBI" (FIG. 27),
"AOB_GI" (FIG. 27),
"AOBUI" (FIG. 29),
"AOBU_GI" (FIG. 29) and
"AOBU_ENT" (FIG. 30)

These are the same as those in the first embodiment.
"ASV_STI" (FIG. 25)

The ASV_STI (ASV stream information) records the following information as ASV stream information.

V_ATR (video attribute)

The following video attribute information is recorded in accordance with a format shown in FIG. 36.

"Video compression mode"

Any of the following values for identifying a video compression mode is recorded.

00b: MPEG-1
01b: MPEG-2

"TV system"

Any of the following values for identifying a television system is recorded.

00b: 525/60 (NTSC)
01b: 625/50 (PAL)

"Aspect ratio"

Any of the following values for identifying a resolution ratio is recorded.

00b: 4 × 3
01b: 16 × 9

"Video resolution"

Any of the following values for identifying a video resolution is recorded.

000b: 720 × 480 (NTSC), 720 × 576 (PAL)
001b: 704 × 480 (NTSC), 704 × 576 (PAL)
010b: 352 × 480 (NTSC), 352 × 576 (PAL)
011b: 352 × 240 (NTSC), 352 × 576 (PAL)

"ASVFI" (FIG. 37)

ASVFI (audio still video file information) comprises ASVFI_GI, ASVUI_SRP and ASVUI which are necessary to access ASVU.

"ASVFI_GI" (FIG. 37)

ASVFI_GI (audio still video file information general information) records ASVUI_SRP_Ns.

ASVUI_SRP_Ns (number of ASV unit search pointers)

The number of ASVUI_SRP fields described below is recorded.

"ASVUI_SRP" (FIG. 37)

ASVUI_SRP (ASV unit information search pointer) records ASVUI_SA.

ASVUI_SA (ASV unit information start address) records the start address of ASVUI.

"ASVUI" (FIG. 37)

ASVUI (ASV unit information) comprises ASVU_GI and ASVOB_ENT which are the management information of ASVOB.

"ASVU_GI" (FIG. 37)

ASVU_GI (ASV unit general information) records the following information) records the following information as the general information of the ASV unit.

ASVOB_Ns (number of ASVOBs)

The number of ASVOBs in the ASV unit is recorded,

ASV_STIN (ASV_STI number)

The number ASVOB_STI recording the stream information of the ASVOB is recorded. The ASVOB_STI number indicates a recording order in the above-mentioned ASVOB_STI table.

FIRST_ASVOB_REC_TM (head ASVOB picture recording date and time)

Information of video recording date and time of the head ASVOB in the ASV unit is recorded.

LAST_ASVOB_REC_TM (final ASVOB video recording data and time)

Information of video recording date and time of the last ASVOB in the ASV unit is recorded.

ASVU_SA (ASV unit start address)

The start address of the ASV unit in the AR_STILL.ARO file is recorded.

"ASVOB_ENT" (FIG. 38A)

ASVOB_ENT (ASVOB entry) corresponds to each ASVOB in the ASV unit and comprises ASVOB_ENT_TY and ASVOB_SZ.

Each of those fields is as follows.

ASVOB_ENT_TY (ASVOB entry type)

The type information of ASVOB is recorded in format shown in FIG. 38B.

TE

Any of the following values for identifying the state of ASVOB is recorded.

| |
|---|
| 0b: normal state |
| 1b: temporary erasing state |

ASVOB_SZ (ASVOB size)

The data amount of the ASVOB is recorded.

"UD_PGCIT" (FIG. 31)

This is the same as that in the first embodiment.

"UD_PGCITI" (FIG. 31),

"UD_PGCI_SRP" (FIG. 31) and

"UD_PGCI" (FIG. 31)

These are the same as those in the first embodiment.

"ORG_PGCI" (FIG. 18)

This is the same as that in the first embodiment.

"TXTDT_MG" (FIG. 18)

TXTDT_MG (text data management) comprises TXTDTI, IT_TXT_SRP and IT_TXT. Individual fields are as follows.

"TXTDTI" (FIG. 39)

TXTDTI (text data information) comprises CHRS, IT_TXT_SRP_Ns and TXTDT_MG_EA.

CHRS (character set code)

A character set code to be used for the IT_TXT is recorded.

IT_TXT_SRP_Ns (number of IT_TXT search pointers)

The number of IT_TXT_SRPs is recorded.

TXTDT_MG_EA (text data management end address).

The end address of the TXTDT_MG is recorded.

"IT_TXT_SRP" (FIG. 39)

The IT_TXT_SRP (IT_TXT search pointer) records the following information as access information to the corresponding $IT_F\_TXT$.

$IT\_TXT_{SA}$ $(IT\_TXT$ start address)

The start address of IT_TXT is recorded. Seeking until this address allows IT_TXT to be accessed.

IT_TXT_SZ (IT_TXT size)

The data size of IT_TXT is recorded. Reading data by this data size allows IT_TXT to be read out.

"IT_TXT" (FIG. 39)

IT_TXT comprises at least one set of IDCD (identification code), TXT (text) corresponding to the IDCD and TMCD (termination code). If there is no TXT corresponding to the IDCD, IDCD and IMCD may make one set. IDCD is defined as follows.

Genre Code

| |
|---|
| 30h: movie |
| 31h: music |
| 32h: drama |
| 33h: animation |
| 34h: sports |
| 35h: documentary |
| 36h: news |
| 37h: weather |
| 38h: education |
| 39h: hobby |
| 3Ah: entertainment |
| 3Bh: art (play, opera) |
| 3Ch: shopping |

Input Source Code

| |
|---|
| 60h: broadcasting station |
| 61h: camcorder |
| 62h: photograph |
| 63h: memorandum |
| 64h: others |

"PGCI" (FIG. 32)

This is the same as that in the first embodiment, and detailed description for PGI and CI is further added.

"PGCI_GI" (FIGS. 32)

This is the same as that in the first embodiment.

"PGI" (FIG. 32)

PG_TY (program type)

C_Ns (number of cells)

PRM_TXTI (primary text information)

These are the same as those in the first embodiment.

IT_TXT_SPRN (IT_TXT_SRP number)

In the case in which information indicative of the contents of the program is optionally recorded as IT_TXT in addition to the above-mentioned primary text, the number of IT_TXT_SRP recorded in TXTDT_MG is recorded in this field.

REP_PICTI (representative still picture information)

Static image information representative of the program is described. The details of the REP_PICTI are the same as those of the REP_PICTI of the PL_SRPT described above.

"CI_SRP" (FIG. 32)

This is the same as that in the first embodiment.

"CI" (FIG. 34)

CI (cell information) comprises C_GI and C_EPI.

"C GI" (FIG. 34)

C_GI (cell general information) has the following basic information comprised in the cell.

C_TY (cell type)

AOBI_SRPN (AOB information search pointer number)

These are the same as those in the first embodiment.

ASVUI_SRPN (ASV unit information search pointer number)

The search pointer number of the ASVU information to which the cell corresponds is recorded. When the cell accesses the corresponding stream data, ASVU information first. If there is no corresponding ASVU, 0 is recorded.

ASV_DMOD (ASV display mode)

The display timing mode and the display order mode of ASV in the cell are recorded in a format shown in FIG. 40.

"Display Timing Mode"

| |
|---|
| 00b: slide show mode |
| 01b: browsable mode |

"Display Order Mode"

| |
|---|
| 00b: sequential |
| 01b: random |
| 10b: shuffle |

C_EPI_Ns (cell entry point information number)

The number of entry points present in the cell is recorded.

C_A_S_PTM (cell audio start time)

The reproduction start time of the cell is recorded in the format shown in FIG. 21.

C_A_E_PTM (cell audio end time)

The reproduction end time of the cell is recorded in the format shown in FIG. 21. By using C_A_S_PTM and C_A_E_PTM, the valid interval of the cell in the AOB to which the cell corresponds is specified.

"C_EPI" (FIGS. 41-A–D and FIGS. 42A–D)

The C_EPI (cell entry point information) is type D according to the purpose. The type A is used for specifying a place corresponding to the head of a music. The type B is used for specifying a switching point of index in the music. The type C is used for specifying a spotlight portion which is a particularly characteristic interval in the music. The type D is used for relating audio data (AOB) to a still picture (ASV). Moreover, each type further has two subtypes. In each of types A1, B1, C1 and D1, a data area for the primary text to hold a name for the specified place is added. In the type A1, the primary text is mainly used for holding the name of the music. In the type B1, the primary test is mainly used for holding the name of an index. In the type C1, similarly, the primary text is used for the name of the spotlight. In the type D1, the primary text is used for, for example, the explanation of the still picture displayed in this position. The primary text is mainly set by a user. Therefore, the using method is left to the user.

"C EPI (type A)" (FIGS. 41A and B)

C_EPI (type A) comprises the following information indicative of an entry point.

EP_TY (entry point type)

The following information for identifying the type of the entry point is recorded in accordance with the format shown in FIG. 43.

EP_TY1

| |
|---|
| 00b : The primary text is added. |
| 01b : The primary text is not added. |

EP_TY2

| |
|---|
| 00b : type A |
| 01b : type B |
| 10b : type C |
| 01b : type D |

EP_PTM (entry point time)

A time that the entry point is placed is recorded in accordance with the format shown in FIG. 24. In the cell of the type A, this value should be equal to that of C_A_S_PTM of the cell.

PRM_TXTI (primary text information)

In the type A1, the text information indicative of the contents of a place indicated by the entry point is recorded. The details are the same as those of the above-mentioned PRM_TXTI.

"C_EPI (type B)" (FIGS. 41C and D)

A_C_EPI (type B) has the following IDXN in addition to EP_TY and EP_PTM which are included in the type A. Moreover, the type B1 also has the PRI_TXT in the same manner as the type A1.

IDXN (index number)

The number of an index indicated by the entry point is recorded.

"C_EPI (type C)" FIGS. 42A and B)

A_C_EPI (type C) has the following END PTM in the type A. Moreover, the type C1 also has the PRI_TXT in the same manner as the type A1.

END_PTM (end time)

The end time for the spotlight is recorded in accordance the format shown in FIG. 24. The start time of the spotlight is given with the EP_PTM.

"C_EPI (type D)" (FIGS. 42C and D)

A_C_EPI (type D) has the following ASVOB_ENTN, S_EFFECT, E_EFFECT, MAX_DUR, and MIN_DUR in addition to the EP_TY and EP_PTM in the type A. With regard to the EP_PTM, moreover, the format is identical and the using method is partially different. Furthermore, the type D1 also has the PRI_TXT in the same manner as the type A1.

EP_PTM (entry point time)

A time that the entry point is placed is recorded in accordance with the format shown in FIG. 24. When the Display Timing Mode of ASV_DMOD of the correspond ing cell is the browzable mode, a value indicative of 0 is recorded as the PTM.

ASVOB_ENTN (ASVOB entry number)

The number of the ASVOB to be displayed at the timing indicated by the entry point is recorded. In the case in which the Display Order Mode of the ASV DMOD of the corresponding cell is random or a shuffle mode, 0 is recorded.

S_EFFECT (start effect)

The kind and time of the effect on the start of the display of the ASVOB to be displayed at the timing of the entry point is recorded in accordance with a format shown in FIG. 44A. In the case in which the ASVOB has been displayed in the timing of the entry point, Start Effect Mode is also indicative of the effect for ending the display of the ASVOB which is being displayed. In the following table, the effect shown in parentheses indicates an effect for ending the display of the ASVOB which is being displayed.

Start Effect Mode

| | |
|---|---|
| 0000b : | Cut In (Cut Out) |
| 0001b : | Fade In (Fade Out) |
| 0010b : | Dissolve (Dissolve |
| 0011b : | Wipe from Top (Wipe from Bottom) |
| 0100b : | Wipe from Bottom (Wipe from Top) |
| 0101b : | Wipe from Left (Wipe from Right) |
| 0110b : | Wipe from Right (Wipe from Left) |
| 0111b : | Wipe diagonal left (Wipe diagonal right) |
| 1000b : | Wipe diagonal right (Wipe diagonal left) |
| 1001b : | Random (Effect corresponding to predetermined effect classification) |

Start Effect Period

An effect time length or period is described in the following format.

Time length=Start Effect Period x
  Video Frame x 8
one Video Frame implies 1/29.97 second with the TV System 525/60, or 1/25 second with the TV System 625/50.

E_EFFECT (end effect)

The kind and time of the effect at the display end time are recorded in accordance with a format shown in FIG. 44B, in the case where the display of the ASVOB to be displayed in the timing of the entry point is ended and there is no ASVOB to be reproduced next.

End Effect Mode

| | |
|---|---|
| 0000b : | Cut Out |
| 0001b : | Fade Out |
| 1001b : | Random |

End Effect Period

The effect period is described in the following format.

Period=End Effect Period x Video Frame x 8

One Video Frame implies 1/29.97 second with the TV System 525/60, or 1/25 second with the TV System 625/50.

MAX_DUR (maximum playback duration)

The maximum duration for displaying a still picture corresponding to the entry point is described in the following format.

Duration=MAX_DUR x Video Frame

One Video Frame implies 1/29.97 second with the TV System 525/60, or 1/25 second with the TV System 625/50. Moreover, in the case where the playback duration is to be infinite, 0 is recorded. When the Display Timing Mode of the ASV DMOD of the corresponding cell is the slide show mode, 0 is recorded.

MIN_DUR (minimum playback duration)

The minimum duration for displaying a still picture corresponding to the entry point is described in the following format.

Duration=MIN DUR x Video Frame

One Video Frame implies 1/29.97 second with the TV System 525/60, or 1/25 second with the TV System 625/50. Moreover, in the case where the playback duration is to infinite, 0 is recorded. When the Display Timing Mode the ASV_DMOD of the corresponding cell is the slide show mode, 0 is recorded.

2.2 DVD recorder 2.2.1 Structure of DVD Recorder

The structure of the DVD recorder according to the present embodiment is the same as that in the first embodiment.

2.2.2 Reproducing Operation of DVD Recorder

Data on a DVD-RAM which are recorded by the DVD recorder can be read and reproduced through the DVD recorder.

When receiving a request for the operation of the first reads the AR_MANGR.IFO file storing the management system controller stores the contents of the AR_MANGR.IFO file thus read in an internal memory. Next, the system controller confirms the AMG_ID and the VERN in the AMGI_MAT shown in FIG. 19. When information different from the information which originally has to be stored is recorded in these locations, the DVD recorder determines that the disc cannot be reproduced by the recorder, and does not reproduce data from the disc.

Next, the system controller accesses the ORG_PGCI by referring to the ORG_PGCI_SA. The ORG_PGCI_SA stores the recording position of the ORG_PGCI. Therefore, it is possible to refer to the ORG_PGCI by referring to a specified address in the management information which has previously been read.

2.2.3 Reproducing Operation according to PGCI

This is the same as that in the first embodiment.

2.2.4 ASVU Reading Processing

When a value other than 0 is recorded in the ASVUI_SPRN in the above-mentioned C_GI information, a processing of reading the ASVU is carried out. Some DVD recorders include 2 MB buffers for ASVU reading, and carry out a processing of reading the ASVU data into the buffer for the ASVU before the reproduction of Cell is started.

Therefore, the system controller refers to the A_AVFIT_SA information based on the AMGI_MAT information stored in a memory. The head address of the A_AVFIT is described therein and it is possible to access the A_AVFIT by using the information. Next, by referring to the A_AVFIT based on the information thus obtained, AUD_STI_Ns and ASV_STI_Ns in the A_AVFITI described in the head of the A AVFIT are acquired. Since AUD_STI and ASV_STI to those are of a constant length, it is possible to obtain the data length of the whole AUD_STI by multiplying the data length of the AUD_STI by the number of AUD_STIs. Consequently, the head of the ASV_STI becomes known. With respect to the AUDFI and the ASVFI, the ASVFI_SA and the ASVFI_SA are recorded in the A_AVFITI. Therefore, it is easy to refer to AUDFI and the ASVFI.

Based on the information thus obtained, ASVFI is referred. First ASVUI_SRP in the ASVFI is referred.

Herein, ASVUI_SRP corresponding to the ASVUI_SRPN in the above-mentioned CI is referred. For this purpose, utilized is the fact that a reference destination can easily be gained when the ASVUI_SRP has a constant length and a recording number becomes known. By thus referring to the ASVUI_SRP, since the ASVUI_SA is recorded therein, it is possible to access the ASVUI to be desired.

Next, the system controller opens the AR_STILL.ARO file, and further seeks from the head of the file to a predetermined address. In this case, the ASVU_SA is used as the predetermined address. The system controller reads the AR_STILL.ARO file from this position and stores data in the buffer for the ASVU described above. In order to determine a size for reading, the system controller further refers to ASVOB_Ns and the ASVOB_ENT. First of all, ASVOB Ns is referred and then ASVOB_ENTs are referred by the number described in ASVOB_Ns. The size of each ASVOB is described in each ASVOB_ENT. By summing all of them, the total size of the ASVOB included in the ASVU becomes known. The system controller thus calculates the total size of the ASVU and reads the data from the AR_STILL.VRO file by the size.

Furthermore, the system controller refers to the ASV_STIN in the ASVU_GI. Herein, the number of the ASV_STI is described. Based on the information, information about the display attribute of the ASV is acquired from the ASV_STI described above. For this purpose, by utilizing the fact that the ASV_STI has a constant length, referred to is a place having an address obtained by adding an address which is obtained by multiplying the fixed length by the ASV_STI number to the head address of the ASV_STI. Consequently, the system controller can acquire information necessary for controlling a video output section when displaying the ASV.

The processing of reading the ASVU described above is carried out every time the reproduction is started in accordance with a new Cell in principle. In the Cell which is being reproduced and the Cell which is to be next reproduced, it can also be supposed that the same ASVU is referred to in some cases. This can become known by a comparison of the ASVUI_SRPN in the C_GI for both of them. In this case, the ASVU which has already been stored in the buffer is reused without reading the ASVU again. Consequently, it is possible to minimize a time for interruption of the reproduction of the AOB during transition to a new Cell.

2.2.5 ASVOB Display Processing

A method of displaying the ASVOB by using ASVU thus acquired is described below. The ASVU comprises a plurality of ASVOBs. A method of displaying an nth ASVOB is generally described below.

For this purpose, the above-mentioned ASVOB_ENT is referred. The size of the nth ASVOB is described in the ASVOB_SZ of the nth ASVOB_ENT. Based on this information, the size of the ASVOB can be acquired. Moreover, it is possible to know where the target ASVOB is recorded in the ASVU by summing the first to (n−1)th ASVOB_SZ. Based the information thus obtained, it is possible to acquire the ASVOB recorded in the buffer for the ASVU.

The data of the ASVOB thus obtained are sent to the video output section by the system controller. At the same time, the system controller controls the video output outputting an actual video from the ASVOB data is not related to the scope of the present invention, description thereof is omitted.

It can be supposed that the buffer for the ASVU is not mounted in a particularly inexpensive DVD recorder. In this case, the data of the ASVOB cannot be acquired from the buffer. Accordingly, it is necessary to access a media one by one to read the data of the ASVOB where the data of the ASVOB is required. In this case, audio data is interrupted during the reproduction every time when the ASVOB is displayed. In order to avoid such trouble, it is required that only the ASVOB to be first displayed is displayed in the corresponding cell and the succeeding ASVOBs are not displayed.

2.2.6 AOB Reproduction Processing

This is the same as that in the first embodiment.

2.2.7 Music Skipping Processing

Description is given to a processing to be carried out when the user of the apparatus skips a music by utilizing a remote control or the like in the DVD recorder according to the present embodiment.

Conventionally, a compact disc (CD) player or the like has a structure in which music data are recorded in a unit of a track and one track generally corresponds to one music (song). The CD player is provided with the function of skipping a music. When the user of the apparatus utilizes the remote control or the like to execute the skip processing, the CD player stops the reproduction of the again from the head of the next track. Of course, it can also be supposed that the function of a transition to the previous track, the head track and an nth optional track as well as the transition to the next track.

Corresponding to the fact that the conventional CD player has such a function, it is desirable that the same function is mounted in the-DVD recorder. However, the head of the Cell is not always the head of the music as described in the description of the problem. Therefore, another data structure is employed to represent the head of the music. This is an entry point (Entry Point). There are four types of entry points, which include one representing the head of the music, one representing the break of an index, one representing a spotlight interval and one indicating a link relationship with a still picture. The relationship with PGC/PG/Cell is shown in FIGS. 45 and 46.

Figure 45:
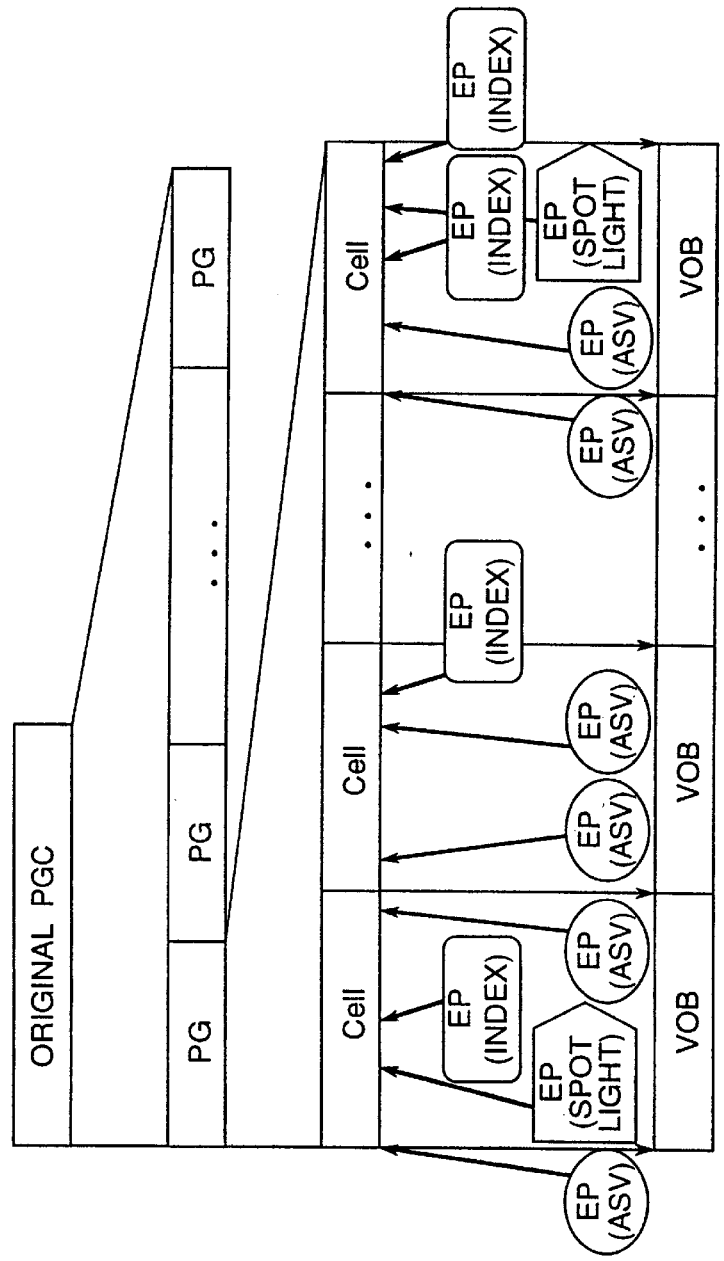
FIG. 45 is a diagram showing the relationship among PGC, PG, Cell and an entry point in original PGC.

FIG. 45 shows the case of the original PGC (Original PGC) which is characterized in that the entry point representing the head of the music is not described. The reason is that the PG should correspond to one music and hence the head of the music does not need to be represented by the entry point.

Figure 46:
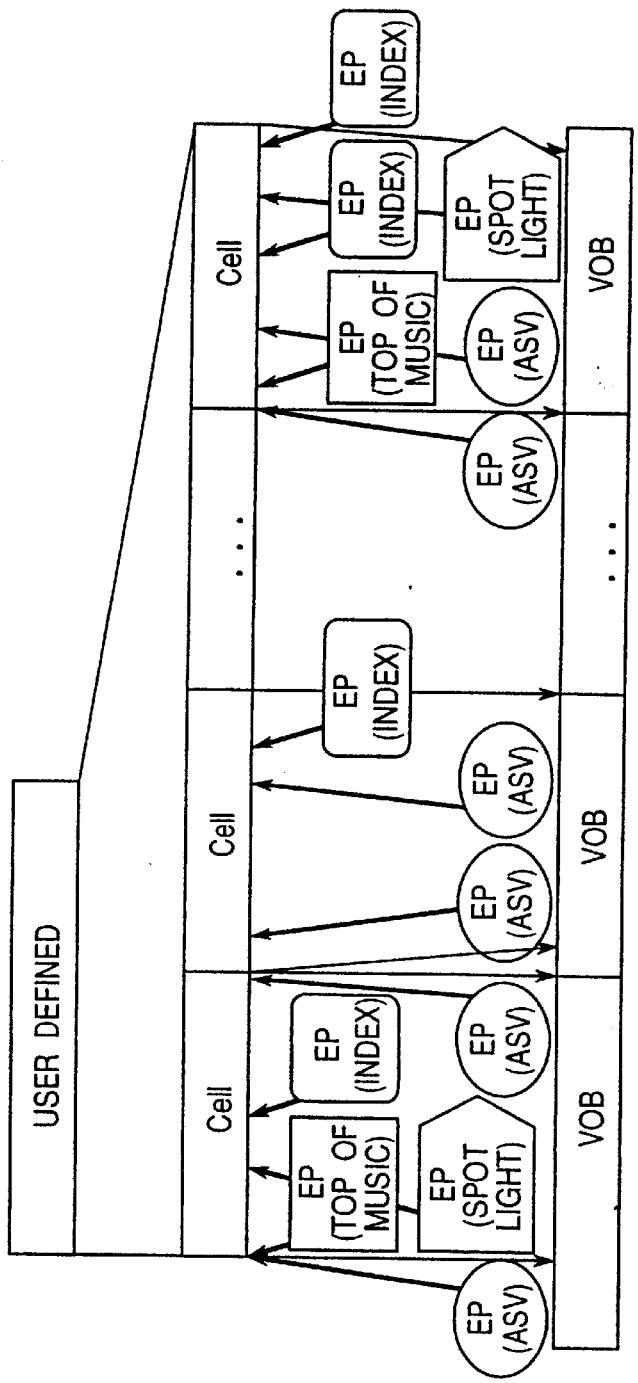
FIG. 46 is a diagram showing the relationship among PGC, PG, Cell and an entry point in user defined PGC.

On the other hand, FIG. 46 shows the case of the user defined PGC and is different in that there is no hierarchy of PG and the Cell might refer to the partial interval of the AOB. Moreover, in the case of the user defined PGC (User Defined PGC), there is a possibility that an entry point indicative of the head of the music might be described.

In the case in which the reproduction is to be carried out via the original' PGC, the processing of skipping a music can be very easy. The reason is that one music is represented by PG. 1n order to reproduce a music next to the music which is being reproduced, the reproduction of PG next to the PG which is being reproduced should be started.

Similarly, in the case in which the reproduction is to be carried out via the user defined PGC, the skip processing is carried out by referring to the entry point of the type A which is indicative of the head of the music. There is a possibility that the entry point of the type A might be stored only in a first entry point table of each cell. In other words, the entry point is recorded as a first one or is not recorded at all. The system controller always grasps the number of the Cell which is being reproduced. When a next skip button is pressed down, a position corresponding to the head of the music is searched from the Cell next to the Cell which is being reproduced. If the Cell which is being reproduced is the last cell in the PGC, the nest skip processing is not carried out. In other cases, the Cell is sequentially searched to find out the Cell having the entry point of the type A on the head of the entry point table. If the Cell cannot be found, the next skip processing is not carried out. On the other hand, if the Cell can be found, the reproduction is started from the head of the Cell including the entry point.

2.2.8 Slide Show Display Processing

A still picture reproducing function in a slide show mode for sequentially switching the ASVOB synchronously with the reproduction of the AOB is ASVU. The still picture display processing in the slide show mode is performed only when in A C GI a value other than 0 is set to the ASVU_SRPN and a value indicative of the slide show mode is set to the ASV_DMOD.

As described above, the system controller always records the number of the Cell which is being reproduced and a time passed from the head of the Cell. In addition, the system controller grasps the number of the A_C_EPI of the entry point corresponding to the ASVOB to be next displayed. For this purpose, the following processing is carried out. When the reproduction of a certain Cell is retrieval from the first A_C_EPI and records the number of the A_C_EPI of the type D which is first present. If there is no A_C EPI of the type D, the display switching of the still picture is not carried out for the Cell. If there is the A_C_EPI of the type D, the number thereof is recorded and the EP_PTM of the A_C_EPI is recorded.

In this state, the system controller starts the reproduction of the AOB, and carries out the processing to the EP_PTM. The still picture switching is carried out in accordance with the display processing of the ASVOB described above. At the same time, the system controller searches the A_C_EPI to be next subjected to the ;display switching. For this purpose, the A_C_EPI of the type D is retrieved sequentially from the A_C_EPI next to the A_C_EPI displayed at that time, and when the A_C_EPI is found the number of the A_C_EPI is recorded. By continuing such a processing, it is possible to carry out the processing of sequentially switching the still picture.

In the case in which the ASV_DMOD is random or shuffle, the case is different from the case of sequential in that a random value is used as the value of the ASVOBA_ENTN.

2.2.9 Browsable Picture Display Processing

A still picture reproducing function in a browsable mode for switching the ASVOB through a remote on the DVD recorder having the buffer for the ASVU. Description is given to the still picture display processing in the browsable mode. A still picture is displayed in the browsable mode only when in the A_C_GI a value other than 0 is set to the ASVUISRPN and a value indicative of the browsable mode is set to the ASV_DMOD.

With regard to the browsable picture, the system controller searches the A_C_EPI of the type D of the Cell which first appears, when the reproduction of the Cell is started. The ASVOB is selected and displayed in accordance with the ASVOB_ENTN described in the A_C_EPI. At the same time, the duration required for continuously displaying the ASVOB is determined by referring to the values of the MAX_DUR and MIN_DIR. Moreover, the system controller records the number of the A_C_EPI thus displayed.

While the reproduction of the AOB is thus continued, when user skips the still pictures with the remote control or when a time required for displaying the ASVOB passes, the system controller switches the ASVOBs to be displayed. For this purpose, it is necessary to search the A_C_EPI corresponding to the ASVOB to be next displayed. The system controller records the number of the A_C_EPI displayed at the last time, and sequentially carries out retrieval from the next A_C_EPI to find out the A_C_EPI of the type C which is the first. The A_C_EPI thus retrieved method of displaying the determined ASVOB is implemented in accordance with the above-mentioned ASVOB display processing.

2.2.10 Index Number Display Processing

In the conventional, CD player, a structure referred to as an index is implemented in a lower of the track. The index has a data structure corresponding to first and second words and the like in a music having the words.

Information about the index is described in medium which is reproduced by the DVD recorder. The information is an entry point of the type B. It is supposed that the index information is mainly displayed the like. The contents of the processing for that is almost similar to the processing of displaying the slide show. In other words, the system controller monitors the playback time of the Cell, and updates the index number at a time indicated by the EP_PTM in the A_C_EPI. The index number to be used in this case is recorded as IDXN in the A_C_EPU of the type B.

2.2.11 Selectively Reproducing Processing of Spotlight

A spotlight is a portion corresponding to characteristic part in a music, for example. In DVD-Audio, a spotlight interval is set in a music. In the case in which such contents are copied, the spotlight is automatically set by the recorder. The spotlight is variously used by a player. For example, in a menu that the spotlight interval is reproduced as a representative audio portion together with the display of the representative still picture of the REP_PIC and the music name by the PRI_TXT. A processing of selectively reproducing the spotlight interval is described below example of the use of the spotlight.

The spotlight interval is recorded as the entry point of the type C. When the user designates the spotlight selective reproduction in the player, the out of entry points included in the Cell. If the entry point of the type C is found, the audio reproduction is started in a place indicated as the EP_PTM of the point. In this case, the same processing as the searching at the reproduction start point by the C_A_S_PTM is carried out. The reproduction end time for the spotlight is indicated as END_PTM in the data structure of the entry point. The audio reproduction is ended at the indicated time and the next spotlight interval is searched.

2.2.12 AOB Continuous Reproduction Processing

Figure 47A:
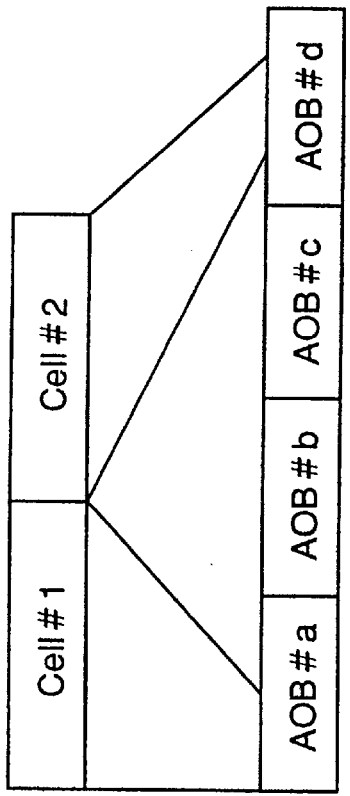
FIG. 47A is a diagram showing the relationship between Cell and AOB in the original PGC.
Figure 47B:
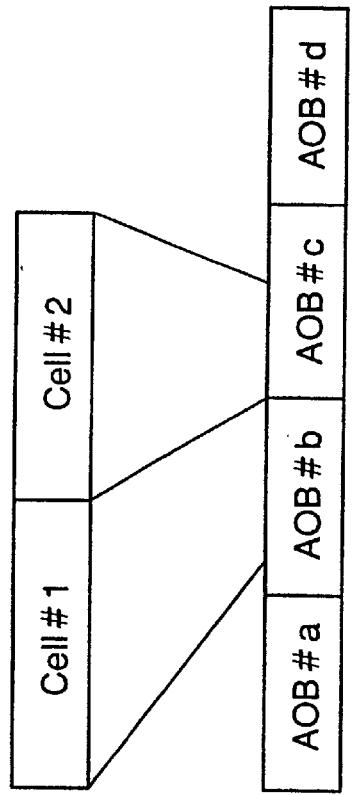
FIG. 47B is a diagram showing the relationship between Cell and AOB in the user defined PGC.
Figure 48:
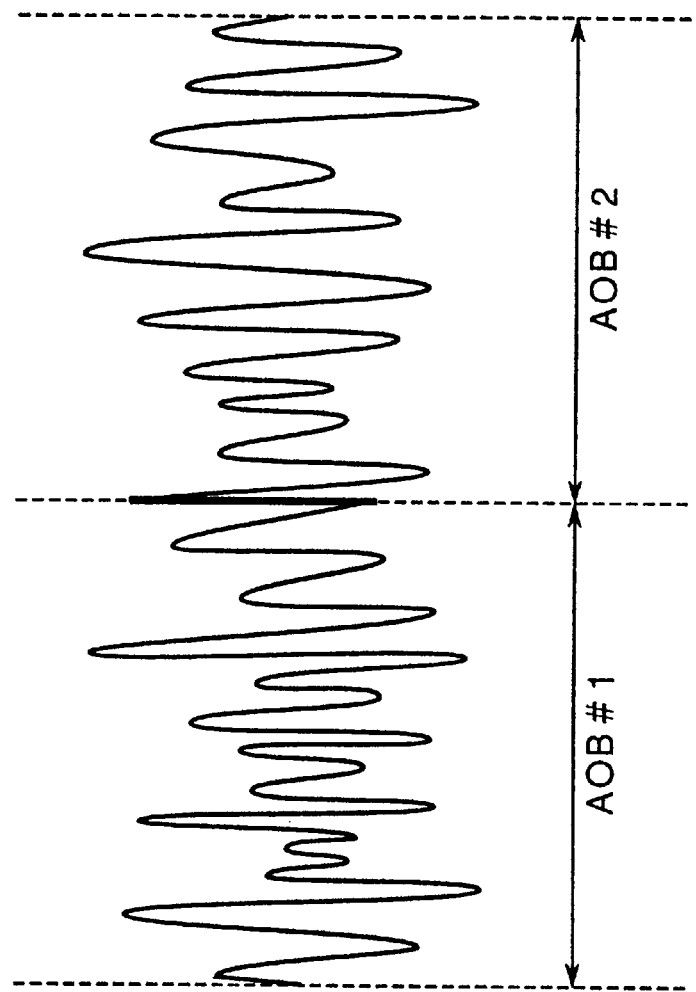
FIG. 48 is a diagram illustrating the discontinuity of an audio waveform in AOB.

In the case in which two AOBs are to be continuously reproduced, a mute is inserted in principle. As shown in FIG. 47A, the AOBs to which two continuous Cells refer are not always located continuously in the logical structure of the disc, and a seek occurs between Cell #1 and Cell #2 so as to generate the mute. On continuous Cells refer are continuously located in the logical structure of the disc as shown in FIG. 47B, continuous reproduction can be carried out in principle. Also in this case, however, there are cases in which the continuous reproduction should not be performed. Such a case is shown in FIG. 48. FIG. 48 shows the waveform of audio data in two continuous AOBs. As shown in this figure, such cases, an abnormal sound occurs at the break portion. In order to avoid such an abnormal sound, it is necessary to positively insert the mute. The player decides the case in which such an abnormal sound might occur based on the value of a mute flag described in the AOB information, and inserts the mute in order to avoid the generation of the abnormal sound. Although a method of carrying out fade-out and fade-in for several seconds before and after the break portion may be applied to the insertion of the mute, other methods may be used. Such an abnormal sound is typically AOB #2 is equivalent to that between audio frames. Therefore, the waveform is smoothly connected so as not to generate an abnormal sound.

Even though PL_TY includes the combination of recording situations, PL_TY may further include a flag which indicates whether user's own creation, or the automatic creation by the apparatus during copying or the like. Particularly, with respect to a play list automatically created by the apparatus during the copying, it might be supposed that the reproduction order thereof or the like cannot be permitted to be changed depending on the copyrighter's request of data on a copy source. In order to prepare for such a case, it is also considered that a flag indicative of a change inhibition is described in the PL_TY. Moreover, there is no problem if the flag can be set to a PGC unit or a lower structure such as PGC_GI in place of the PL_TY.

While both of the AOB and the ASV are managed by the A_AVFIT, it can also be supposed that the A_AVFIT is divided into AOB_AVFIT and ASV_AVFIT to have such data structures as to manage the AOB and the ASV, respectively.

Although all the contents of the AR_MANGR.IFO file are stored in the memory of the system controller when the reproduction is started in the DVD recorder, it can also be supposed that only a part of the contents are stored in the memory, or that the contents are read from the disc as required without being stored in the memory. Selection between the memory storage and the disc reading depends on the trade off relationship between performance and price. The memory storage allows a performance of the recorder to improve because it does not need to read again. However, since more memory is required, the cost of the manufacture of the apparatus is increased.

While the system controller first refers to the ORG_PGCI immediately after the start of the reproduction, the first UD_PGCI may be referred. Moreover, without automatically starting the reproduction immediately after the power is turned on, it is also possible to display any menu by using OSD (On Screen Display) or the like on which user selects the PGCI or PG to be reproduced. Furthermore, it is also possible to provide a data area in the AMGI_MAT for describing the start address of the PGCI or the PGI for newly first starting the reproduction, and to take the PGCI or PGI described therein as the PGCI or PGI to be first reproduced. In this case, it is possible to reproduce the PGCI or PG to be desired by previously setting PGC (=play list) or the PG (=program) into a priority state by the user. Furthermore, a series of PGCI or PGI can be described instead of one PGCI or PGI. Then it is possible to automatically start the reproduction of one PGCI or PGI and to automatically start the reproduction of the next PGCI or PGI after the reproduction of the one PGCI or PGC is ended.

While the buffer for reading the ASVU has 2 MB, a greater buffer size can be applied. Moreover, such a recorder, a special buffer for the ASVU may not be provided but a general purpose buffer may be provided to be used for reading the ASVU as required.

While the specific embodiments of the present invention have been described, the those skilled in the art will appreciate many other variants, modification and uses. Therefore, the present invention is not restricted to the particular disclosure, but can be restricted by the appended claims.

What is claimed is:

1. An optical disc as a recording medium for storing at least one audio object coded in one of a variable bit rate coding mode and a constant bit rate coding mode and management information for managing reproduction of the audio object, wherein a) the audio object comprises a plurality of units each having a predetermined playback duration, each unit having the same playback duration except for a last one of all of the units in the audio object, b) the management information includes
   path information which defines at least one reproducing interval of the audio object specified by time stamp information indicative of a time when the audio object is reproduced, and indicates a reproducing sequence of each reproducing interval,
   coding mode information indicative of a coding mode of each audio object, and
   map information provided for each audio object, the map information for converting the time stamp information specifying the reproducing interval of the audio object into an address on the optical disc storing the unit of the audio object to be reproduced at the time indicated by the time stamp information, and c) the map information comprises information about a data size of the unit, the information about the data size of the unit including
   information about a data size of each unit when the coding mode of the corresponding audio object is the variable bit rate coding mode, and
   only information about a data size of the last one of the units included in the audio object and information about a data size of one of residual units except for the last unit when the coding mode of the corresponding audio object is the constant bit rate coding mode.

2. The optical disc according to claim 1, wherein the map information further comprises information about the playback duration of the unit, the information about the playback duration including only playback duration information for the last one of the units included in the audio object and playback duration information for one of the residual units except for the last unit.

3. The optical disc according to claim 1, wherein the map information further comprises information about the playback duration of the unit, the information about the playback duration including only playback duration information for one of the residual units except for the last unit.

4. The optical disc according to claim 1, wherein the variable bit rate coding mode includes at least one of advanced audio coding (AAC) and meridian lossless packing (MLP).

5. The optical disc according to claim 1, wherein the constant bit rate coding mode includes at least one of linear pulse code modulation (PCM) and audio compression standard 3 (AC-3).

6. An optical disc as a recording medium for storing at least one audio object coded in one of a variable bit rate coding mode and a constant bit rate coding mode and management information for managing reproduction of the audio object, wherein a) the audio object comprises a plurality of units having a predetermined playback duration, each unit having the same playback duration except for at last one of all of the units in the audio object, b) the management information includes
   path information which defines at least one reproducing interval of the audio object specified by time stamp information indicative of a time when the audio object is reproduced, and indicates a reproducing sequence of each reproducing interval, coding mode information indicative of a coding mode of each audio object, and map information provided for each audio object, the map information for converting the time stamp information specifying the reproducing interval of the audio object into an address on the optical disc storing the unit of the audio object to be reproduced at the time indicated by the time stamp information, and c) the map information comprises a first table structure being referred to when the coding mode of the corresponding audio object is the variable bit rate coding mode, and having information about a data size of the unit for each unit as the information about the data size of the unit, and a second table structure being referred to when the coding mode of the corresponding audio object is the constant bit rate coding mode, and having, as information about a data size of a unit, only information about a data size of the last one of the units included in the audio object and information about a data size of one of residual units except for the last unit.

7. The optical disc according to claim 6, wherein the map information further comprises information about the playback duration of the unit, the information about the playback duration including only playback duration information for the last one of the units included in the audio object and playback duration information for one of the residual units except for the last unit.

8. The optical disc according to claim 6, wherein the map information further comprises information about the playback duration of the unit, the information about the playback duration including only playback duration information for one of the residual units except for the last unit.

9. The optical disc according to claim 6, wherein the variable bit rate coding mode includes at least one of advanced audio coding (AAC) and meridian lossless packing (MLP).

10. The optical disc according to claim 6, wherein the constant bit rate coding mode includes at least one of linear pulse code modulation (PCM) and audio compression standard 3 (AC-3).

11. An apparatus for recording audio data in the optical disc according to claim 6, said apparatus comprising:

a section for inputting audio data to be recorded and then deciding whether a coding mode of the input audio data is the variable bit rate coding mode or the constant bit rate coding mode;

a section for creating the map information of the first table when the coding mode is the variable bit rate coding mode as a result of the decision, or creating the map information of the second table when the coding mode is the constant bit rate coding mode; and a section for recording the created map information in the optical disc together with the input audio data.

12. An apparatus for reproducing an audio object from the optical disc according to claim 6, said apparatus comprising:

a section for specifying an audio object to be reproduced;

a section for deciding whether a coding mode of the specified audio object is the variable bit rate coding mode or the constant bit rate coding mode; and a section for selecting a table structure of the map information in accordance with the decided coding mode, reading a size of the unit in the audio object to be reproduced from the map information with the selected table structure, obtaining a start address on the optical disc of the object to be reproduced from the read size of the unit, and reading and reproducing the audio object from the obtained start address.

13. The apparatus according to claim 12, wherein the section for selecting the table structure obtains the start address by, when the decided coding mode is the variable bit rate coding mode, referring to the map information with the first table structure to obtain the data size for each unit, summing the obtained data size, and adding an offset address value of the audio object to be reproduced to the summed value, or when the decided coding mode is the constant bit rate coding mode, referring to the map information with the second table structure to obtain the data size for one of the residual units, multiplying the obtained data size by a number of units in the audio object to be reproduced, and adding an offset address value of the audio object to be reproduced to the multiplied value.

14. A method for recording audio data in the optical disc according to claim 6, said method comprising:

inputting audio data to be recorded and then deciding whether a coding mode of the input audio data is the variable bit rate coding mode or the constant bit rate coding mode;

creating the map information of the first table when the coding mode is the variable bit rate coding mode as a result of the decision, or creating the map information of the second table when the coding mode is the constant bit rate coding mode; and recording the created map information in the optical disc together with the input audio data.

15. A method for reproducing an audio object from the optical disc according to claim 6, said method comprising:

specifying an audio object to be reproduced;

deciding whether a coding mode of the specified audio object is the variable bit rate coding mode or the constant bit rate coding mode; and selecting a table structure of the map information in accordance with the decided coding mode, reading a size of the unit in the audio object to be reproduced from the map information with the selected table structure, obtaining a start address on the optical disc of the object to be reproduced from the read size of the unit, and reading and reproducing the audio object from the obtained start address.

16. The method according to claim 15 wherein in the selecting of the table structure, the start address is obtained by, when the decided coding mode is the variable bit rate coding mode, referring to the map information with the first table structure to obtain the data size for each unit, summing the obtained data size, and adding an offset address value of the audio object to be reproduced to the summed value, or when the decided coding mode is the constant bit rate coding mode, referring to the map information with the second table structure to obtain the data size for one of the residual units, multiplying the obtained data size by a number of units in the audio object to be reproduced, and adding an offset address value of the audio object to be reproduced to the multiplied value.

* * * * *